(12) United States Patent
Suto

(10) Patent No.: US 7,707,279 B2
(45) Date of Patent: Apr. 27, 2010

(54) METHOD FOR SETTING PARAMETER VIA NETWORK AND HOST COMPUTER

(75) Inventor: Hideo Suto, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1100 days.

(21) Appl. No.: 10/739,386

(22) Filed: Dec. 18, 2003

(65) Prior Publication Data

US 2004/0133553 A1 Jul. 8, 2004

(30) Foreign Application Priority Data

Dec. 19, 2002 (JP) .............................. 2002-367808

(51) Int. Cl.
*G06F 15/177* (2006.01)

(52) U.S. Cl. ..................................... 709/221

(58) Field of Classification Search .......... 709/220–222
See application file for complete search history.

(56) References Cited

U.S. PATENT DOCUMENTS

| 6,112,256 | A   * | 8/2000  | Goffinet et al. ................. 710/8 |
| 6,871,221 | B1  * | 3/2005  | Styles ......................... 709/221 |
| 2001/0039590 | A1 | 11/2001 | Furukawa et al. |
| 2002/0049693 | A1 * | 4/2002 | Gase ............... 707/1 |
| 2002/0049837 | A1 * | 4/2002 | Kato ........................ 709/223 |
| 2002/0057455 | A1 * | 5/2002 | Gotoh et al. ............... 358/1.15 |
| 2002/0065806 | A1 * | 5/2002 | Kim .............................. 707/1 |
| 2002/0101604 | A1 | 8/2002 | Mima et al. |
| 2002/0163665 | A1 * | 11/2002 | Iwata et al. ................. 358/1.15 |
| 2002/0174209 | A1 * | 11/2002 | Sesek et al. .................. 709/223 |
| 2002/0196451 | A1 * | 12/2002 | Schlonski et al. ............ 358/1.1 |
| 2003/0053106 | A1 * | 3/2003 | Kuroda et al. .............. 358/1.13 |
| 2003/0135609 | A1 * | 7/2003 | Carlson et al. .............. 709/224 |

FOREIGN PATENT DOCUMENTS

| JP | 2001-285305 | 3/2000 |
| JP | 2000-267831 A | 9/2000 |
| JP | 2000-78169 | 10/2001 |

OTHER PUBLICATIONS

Drukertreiber, "Canon Fax-L280", *Software-user Handbook* retrieved from the internet, pp. 1-68, (2001).

* cited by examiner

*Primary Examiner*—Benjamin R Bruckart
*Assistant Examiner*—David Ampagoomian
(74) *Attorney, Agent, or Firm*—Panitch Schwarze Belisario & Nadel LLP

(57) ABSTRACT

Not only in order to lighten the setting changing operation of a network utility and to shorten the required time of the setting changing operation, but also in order to prevent operation mistakes, a method for setting parameter via network is provided for a plurality of nodes connected with the network. In the method, peculiar information and set items of the nodes are read out, the common set items are selected, and the parameters are transmitted.

8 Claims, 51 Drawing Sheets

Fig.3

| NIC NAME | IP ADDRESS | SUBNET MASK | SERVER NAME | APPLE TALK | FRAME TYPE | ADMIN MAIL ADDRESS | RESOLUTION |
|---|---|---|---|---|---|---|---|
| n1 | 100.100.100.100 | 255.255.255.0 | s1 | Enable | AUTO | mihira@okidata.co.jp | 300×300 |
| n2 | 100.100.100.101 | 255.255.255.0 | s7 | Enable | AUTO | mihira@okidata.co.jp | 600×600 |
| n3 | 100.100.100.102 | 255.255.255.0 | s1 | Enable | AUTO | mihira@okidata.co.jp | 600×600 |
| n4 | 100.100.100.103 | 255.255.255.0 | s1 | Enable | AUTO | mihira@okidata.co.jp | 1200×600 |
| n5 | 100.100.100.104 | 255.255.255.0 | s3 | Enable | AUTO | mihira@okidata.co.jp | 1200×600 |
| n6 | 100.100.100.105 | 255.255.255.0 | s5 | Enable | AUTO | mihira@okidata.co.jp | 300×300 |
| n7 | 100.100.100.106 | 255.255.255.0 | s1 | Enable | AUTO | mihira@okidata.co.jp | 1200×600 |
| n8 | 100.100.100.107 | 255.255.255.0 | s6 | Enable | AUTO | mihira@okidata.co.jp | 600×600 |
| n9 | 100.100.100.108 | 255.255.255.0 | s2 | Enable | AUTO | mihira@okidata.co.jp | 1200×600 |

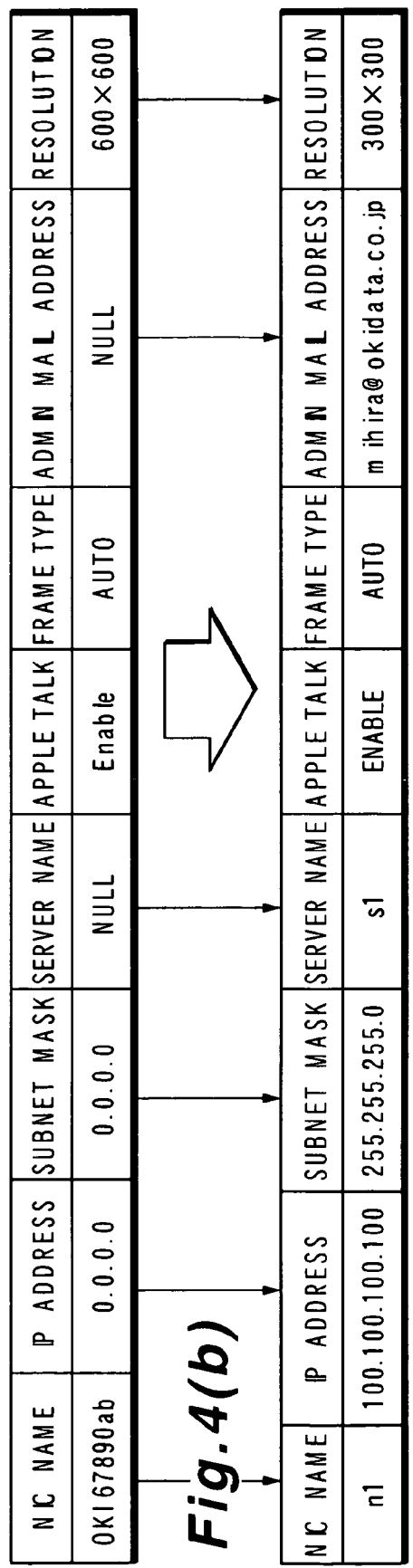

Fig.8

| TCP/IP | NetWare | AppleTalk | NetBEUI | SNMP Trap | E-Mail |
|---|---|---|---|---|---|
| Enable | Enable | Enable | Enable | Enable | Enable |

} ENABLE/DISABLE OF PROTOCOLS

| Frame Type | Frame Type |
|---|---|
| AUTO | AUTO |

} SET ITEMS WHICH CAN BE AUTOMATICALLY SET

| DHCP | BOOTP | RARP |
|---|---|---|
| OFF | OFF | OFF |

} ON/OFF OF ADDRESS SETTING SYSTEMS

| Server1 | Server2 | NetWare Tree |
|---|---|---|
| SV1 | SV2 | NT1 |

} NAMES OF SERVERS WHICH ARE USED IN COMMON

| Subnet Mask | DSN Server1 | DSN Server2 |
|---|---|---|
| 255.255.255.0 | 202.200.100.1 | 202.200.100.2 |

} COMMON ADDRESS SETTINGS

Fig.9

Utility Main Page

| NAME | MAC ADDRESS |
|---|---|
| Printer No.1 | 00 34 1F 56 52 3A |
| Printer No.2 | 00 01 80 A1 2D 59 |
| Printer No.3 | 00 2D 34 1F 01 55 |
| Printer No.4 | 00 01 82 2E C2 3C |
| Printer No.5 | 00 02 25 11 CF CA |
| Printer No.6 | 00 00 0F FE 12 83 |
| Printer No.7 | 00 2D 2E 1F FD 3A |

SETTING CHANGE

STATUS

F/W UPDATE

CONNECTION TEST

Fig.10

```
Available Protocol Settings
  ┌─ TCP IP ─────────────────────────────────────┐
  │  [Enable      ▼]        [Same Value    ▼]    │
  └──────────────────────────────────────────────┘
  ┌─ NetWare ────────────────────────────────────┐
  │  [Enable      ▼]        [Same Value    ▼]    │
  └──────────────────────────────────────────────┘
  ┌─ AppleTalk ──────────────────────────────────┐
  │  [Enable      ▼]        [Same Value    ▼]    │
  └──────────────────────────────────────────────┘
  ┌─ NetBEUI ────────────────────────────────────┐
  │  [Enable      ▼]        [Same Value    ▼]    │
  └──────────────────────────────────────────────┘
  ┌─ SNMPTrap ───────────────────────────────────┐
  │  [Enable      ▼]        [Same Value    ▼]    │
  └──────────────────────────────────────────────┘
```

Fig.11

| Utility Main Page | | TCP/IP | Subnet Mask |
|---|---|---|---|
| Printer No.1 | 00:34:1F:56:52:3A | Enable | 255.255.255.0 |
| Printer No.2 | 00:01:80:A1:2D:59 | Enable | 255.255.255.0 |
| Printer No.3 | 00:2D:34:1F:01:55 | Enable | 255.255.255.0 |
| Printer No.4 | 00:01:82:2E:C2:3C | Enable | 255.255.255.0 |
| Printer No.5 | 00:02:25:11:CF:CA | Enable | 255.255.255.0 |
| Printer No.6 | 00:00:0F:FE:12:83 | Enable | 255.255.255.0 |
| Printer No.7 | 00:2D:2E:1F:FD:3A | Enable | 255.255.255.0 |

Printer Settings

Resolution [ ▼ ] [ Max. Value ▼ ]

Error Notification Settings

Chack Rate [ ▼ ] [ Min. Value ▼ ]

*Fig.24*

| Printer Settings |
| --- |
| ┌─ Resolution ─────────────────┐ |
| │ [300×300  ▼]    [Default  ▼] │ |
| └──────────────────────────────┘ |

| Printer Settings |
| --- |
| ┌─ Power Save shifting time ───┐ |
| │ [60 sec   ▼]    [Default  ▼] │ |
| └──────────────────────────────┘ |

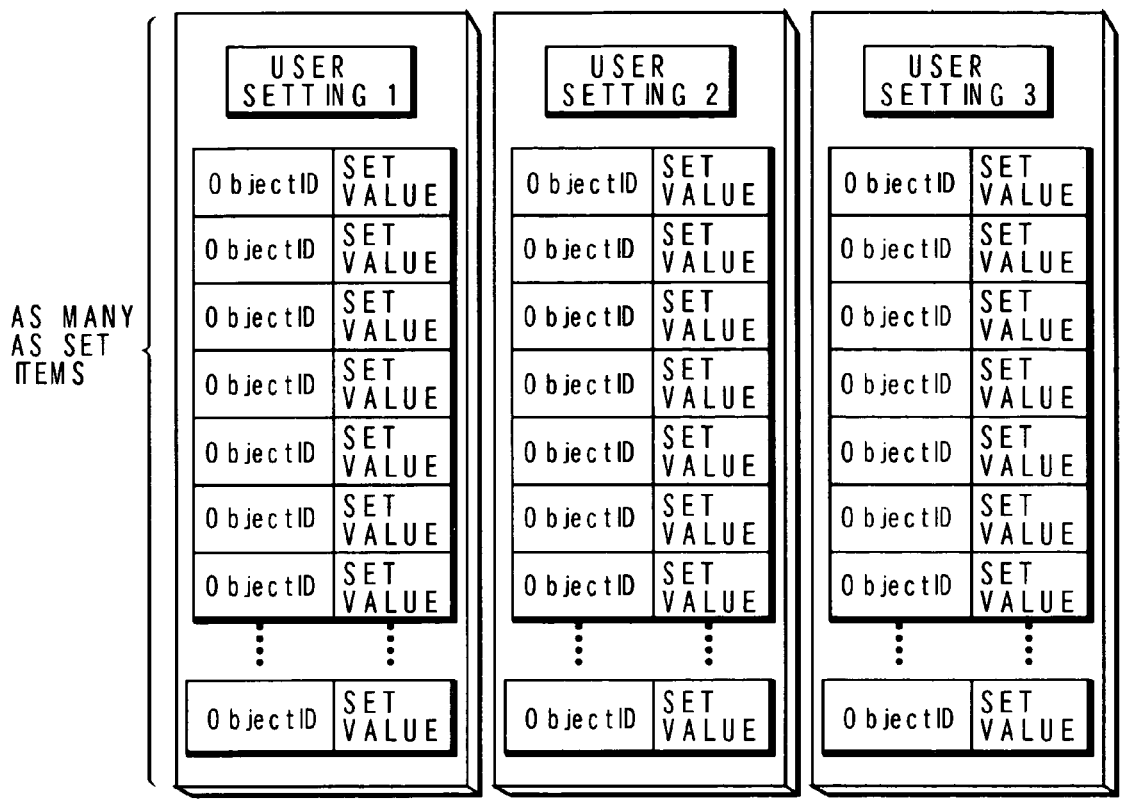

Fig.38

| Group | NAME | MAC Address |
|---|---|---|
| A | Printer No.1 | 00:34:1F:56:52:3A |
| A | Printer No.2 | 00:01:80:A1:2D:59 |
| A | Printer No.3 | 00:2D:34:1F:01:55 |
| B | Printer No.4 | 00:01:82:2E:C2:3C |
| A | Printer No.5 | 00:02:25:11:CF:CA |
| B | Printer No.6 | 00:00:0F:FE:12:83 |
| B | Printer No.7 | 00:2D:2E:1F:FD:3A |

SETTING CHANGE

STATUS

F/W UPDATE

CONNECTION TEST

Utility Main Page

Fig.41

| TCP/P | Net Ware | Apple Talk | Net BEUI | SNMP Trap | E-Mail |
|---|---|---|---|---|---|
| Enable | Enable | Enable | Enable | Enable | Enable |

} ENABLE/DISABLE OF PROTOCOLS

| Frame Type | Frame Type |
|---|---|
| AUTO | AUTO |

} SET ITEMS WHICH CAN BE AUTOMATICALLY SET

| DHCP | BOOTP | RARP |
|---|---|---|
| OFF | OFF | OFF |

} ON/OFF OF ADDRESS SETTING SYSTEMS

| Server1 | Server2 | Net Ware Tree |
|---|---|---|
| SV1 | SV2 | NT1 |

} NAMES OF SERVERS WHICH ARE USED IN COMMON

| Subnet mask | DSN Server1 | DSN Server2 |
|---|---|---|
| 255.255.255.0 | 202.200.100.1 | 202.200.100.2 |

} COMMON ADDRESS SETTINGS

Fig.42

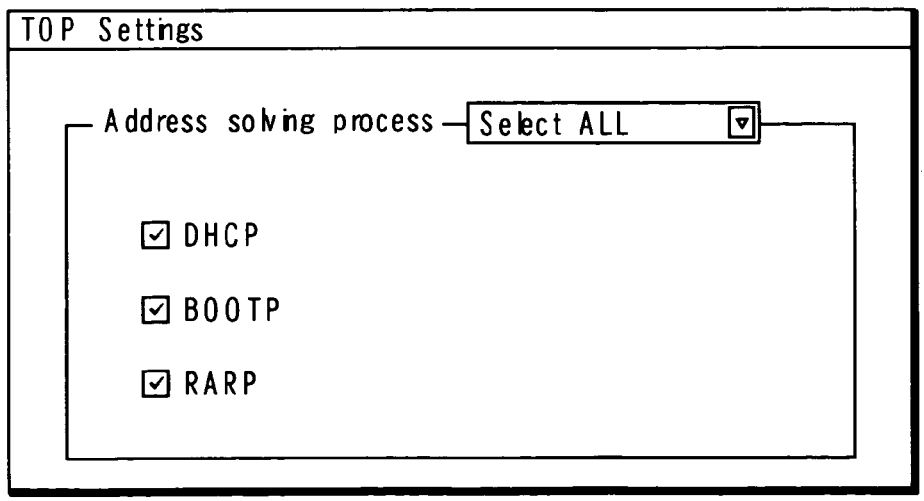

Fig. 45

| Group | NAME | MAC Address | IP Address |
|---|---|---|---|
| Toshiba | Printer No.1 | 00:34:1F:56:52:3 | |
| OKI | Printer No.2 | 00:01:80:A1:2D:5 | |
| HPP | Printer No.3 | 00:2D:34:1F:01:5 | |
| Toshiba | Printer No.4 | 00:01:82:2E:C2:3 | |
| Rexmark | Printer No.5 | 00:02:25:11:CF:C | |
| Rexmark | Printer No.6 | 00:00:0F:FE:12:8 | |
| OKI | Printer No.7 | 00:2D:2E:1F:FD:3 | |

SETTING CHANGE

STATUS

F/W UPDATE

GROUPING KEY
Company

CONNECTION TEST

Utility Main Page

Fig.48

| EXAMPLE OF GROUPING KEYS | INFORMATION WHICH IS USED |
|---|---|
| MANUFACTURING COMPANY OF PRINTER | A CHARACTER TRAIN WHICH HRDEVICE DISCR OF HOST RESOURCE MIB HAS IS EXTRACTED AND CHARACTERS IN A RANGE FROM THE BEGINNING TO THE FIRST SPACE OF THE CHARACTER TRAIN SHOW A COMPANY NAME. |
| COMPANY OF NETWORK CARD | COMPANY CODE OF MAC ADDRESS<br><br>MAC ADDRESS IS EXTRACTED FROM MIB AND BIT-INVERTED EVERY BYTE AND, UPPER 3 BYTES OF THE ADDRESS AFTER THE INVERSION INDICATE THE COMPANY OF THE NIC CARD. |
| COLOR PRINTER OR MONOCHROMATIC PRINTER ? | COLOR PRINTER IN THE CASE WHERE A PLURALITY OF TABLES OF PRINTER MIB MAKER COLORANT GROUP ARE SUPPORTED. |
| PRINTABLE SHEET SIZE (A3 PRINTER OR A4 PRINTER ?) | PROUTPUT MAX DIMFEED DIR(MAX. VERTICAL LENGTH OF SHEET) AND PROUTPUT MAX X DIMFEED DIR (MAX. LATERAL LENGTH OF SHEET) IN THE OUTPUT GROUP OF PRINTER MIB ARE EXTRACTED AND COMPARED WITH THE SIZE OF EACH SHEET, THEREBY DISCRIMINATING. |
| EMULATION OF PRINTER | THREE ITEMS OF PRINTERPRINTER LANG FAMILY, PRINTERPRINTER LANG LEVEL, AND PRINTERPRINTER LANG VERSION IN THE INTERPRETER GROUP OF PRINTER MIB ARE EXTRACTED AND THE EMULATION WHICH IS SUPPORTED IS DISCRIMINATED BY THE THREE INFORMATION. |
| SETTING LOCATION | THE USER STORES THE SETTING LOCATION INTO SYS LOCATION IN THE SYSTEM GROUP OF PRINTER MIB,SO THAT THE GROUPING KEY IS OBTAINED.<br><br>THIS AREA IS A WRITABLE AREA AS AN MIB SPECIFICATION. |

Fig.60

| CASE | SERVER | BEFORE ADDRESS SOLUTION | AFTER ADDRESS SOLUTION | JUDGE |
|---|---|---|---|---|
| EXAMPLE1 | SERVER 1 | ADDRESS OBTAINMENT OK | ADDRESS OBTAINMENT NG | THE PRINTER OBTAINED ADDRESS FROM SERVER 1. |
| | SERVER 2 | ADDRESS OBTAINMENT OK | ADDRESS OBTAINMENT NG | |
| | SERVER 3 | ADDRESS OBTAINMENT OK | ADDRESS OBTAINMENT NG | |
| EXAMPLE2 | SERVER 1 | ADDRESS OBTAINMENT OK | ADDRESS OBTAINMENT NG | THE PRINTER OBTAINED ADDRESS FROM SERVER 2. |
| | SERVER 2 | ADDRESS OBTAINMENT OK | ADDRESS OBTAINMENT NG | |
| | SERVER 3 | ADDRESS OBTAINMENT OK | ADDRESS OBTAINMENT NG | |
| EXAMPLE3 | SERVER 1 | ADDRESS OBTAINMENT OK | ADDRESS OBTAINMENT NG | THE PRINTER OBTAINED ADDRESS FROM SERVER 3. |
| | SERVER 2 | ADDRESS OBTAINMENT OK | ADDRESS OBTAINMENT NG | |
| | SERVER 3 | ADDRESS OBTAINMENT OK | ADDRESS OBTAINMENT NG | |
| EXAMPLE4 | SERVER 1 | ADDRESS OBTAINMENT OK | ADDRESS OBTAINMENT NG | THE PRINTER OBTAINED ADDRESS FROM SERVERS 1 AND 2. IT IS NECESSARY TO REVIEW ENVIRONMENTAL SETTINGS (SERVER 1 AND SERVER 2.) |
| | SERVER 2 | ADDRESS OBTAINMENT OK | ADDRESS OBTAINMENT NG | |
| | SERVER 3 | ADDRESS OBTAINMENT OK | ADDRESS OBTAINMENT NG | |
| EXAMPLE5 | SERVER 1 | ADDRESS OBTAINMENT OK | ADDRESS OBTAINMENT NG | THE PRINTER CANNOT OBTAIN ADDRESSES. IT IS NECESSARY TO REVIEW ENVIRONMENTAL SETTINGS (SERVER WHOSE ADDRESS THE USER WANTS TO OBTAIN). |
| | SERVER 2 | ADDRESS OBTAINMENT OK | ADDRESS OBTAINMENT NG | |
| | SERVER 3 | ADDRESS OBTAINMENT OK | ADDRESS OBTAINMENT NG | |
| EXAMPLE6 | SERVER 1 | ADDRESS OBTAINMENT OK | ADDRESS OBTAINMENT NG | THE PRINTER OBTAINED ADDRESSES FROM SERVER 1 TO SERVER 3. IT IS NECESSARY TO REVIEW ENVIRONMENTAL SETTINGS (SERVER 1 TO SERVER 3). |
| | SERVER 2 | ADDRESS OBTAINMENT OK | ADDRESS OBTAINMENT NG | |
| | SERVER 3 | ADDRESS OBTAINMENT OK | ADDRESS OBTAINMENT NG | |

METHOD FOR SETTING PARAMETER VIA NETWORK AND HOST COMPUTER

BACKGROUND OF THE INVENTION

1. Field of the Invention

The invention relates to a method of setting parameters via network and a host computer.

2. Related Background Art

Hitherto, in the case where an apparatus of a network type such as a printer or the like which is an apparatus having an NIC (Network Interface Card), that is, an NIC apparatus is connected to a network, the NIC apparatus is set as a node connected to the network (for example, refer to JP-A-2000-267831).

FIG. 2 is a diagram showing a procedure which is executed in a conventional setting method. FIG. 3 is a diagram showing an example of conventional set items. FIG. 4 is a diagram showing an example of default values of the conventional set items. FIG. 5 is a diagram showing an example of a conventional network.

First, as shown in FIG. 2, an administrator executes an operation for searching for an NIC apparatus connected to the network from a personal computer PC as an administrator PC which he uses or a workstation WS. In this case, several search packets are transmitted from the administrator PC and the existence of the NIC apparatus is confirmed by the presence or absence of a response to it.

As shown by ① in FIG. 2, the NIC apparatus connected to the network transmits a response packet in response to the search packet, so that the NIC apparatus itself can notify the administrator PC that it is connected to the network. Contents of the search packet and the response packet are changed depending on search means which is used. When the NIC apparatuses connected to the network, that is, the nodes are found, the node whose setting is changed is selected from them and the present set values are read out.

Subsequently, as shown by ② in FIG. 2, change items are selected with reference to the present read-out set values and the set values are changed. For example, if the nodes connected to the network are printers, items as shown in FIG. 3 exist as set items.

In FIG. 3, NIC Name denotes a peculiar name of the NIC apparatus connected to the printer. IP (Internet Protocol) Address denotes an address which has been allocated to each printer and is necessary in the case of making communication by a protocol TCP/IP. Subnet Mask denotes a mask value which is necessary in the case of making communication by the protocol TCP/IP. By masking by such a value, the network can be divided into small subnetworks.

Server Name denotes a server which is used for printing. When the user transmits a job to be printed to the server, the server monitors a state of the printer and transmits the job to the printer. Apple Talk denotes a communication protocol like TCP/IP. The printer can communicate by using Apple Talk and receive print data. In the settings, whether such a protocol is used or not is determined.

Further, Frame Type denotes a lower protocol for dividing the network not physically but logically. Frame Type differs from foregoing Subnet Mask in the following manner. While Subnet Mask presupposes that the network is divided for convenience and communication among the subnets can be made, Frame Type is used in the case where the communication is totally disabled and a plurality of networks which cannot communicate with each other at all even though using a physically identical network are constructed. If such a setting is set to AUTO (automatic), the printers belong to all networks, so that the printing can be performed from any network.

An address at which a message is sent by E-mail in the case where an error occurs in the printer is registered into admin mail address. Resolution denotes print resolution showing how many dots (dot) can be printed in a region of 1 inch (inch). Ordinarily, in the case of the printer, such measurement is used for the resolution in each of the vertical and lateral directions. The resolution is expressed as, for example, 300×300 dpi (dots per inch: dots/inch).

Although the above set values have values (default values) as shown in FIG. 4(a) in the initial state, the settings have to be changed to values as shown in FIG. 4(b) in order to be actually used.

Finally, as shown by ③ in FIG. 2, the changed settings are transmitted to the nodes connected to the network.

By executing such a procedure, the setting of one NIC apparatus as a node serving as a printer can be made.

As shown in FIG. 5, the administrator who manages a plurality of printers Pr1 to Pr5 needs to repeat the setting operation as many times as the number of printers to be managed by using the administrator PC. The operation which requires time and work most among the operations mentioned above is the setting changing operation.

A construction of a network utility will be described here.

FIG. 6 is a diagram showing a construction of a conventional network utility.

As shown in the diagram, a host utility 110 as a network utility comprises: a network communicating unit 118 having a function for communicating with nodes connected to the network by a network protocol; an SNMP (Simple Network Management Protocol) communicating unit 117 for notifying the nodes connected to the network of a kind of action (whether information is obtained or written) in communication by using SNMP as an upper protocol of the network protocol; a device finding unit 114 having a function for finding out unset nodes connected to the network; a set value reading unit 112 for issuing an instruction to read out set information of the nodes connected to the network; a set value writing unit 113 for issuing an instruction to write the set information by the nodes connected to the network; a per-set-item processing unit 115 for discriminating whether the instruction or contents issued by the set value writing unit 113 is/are correct or not; a user I/F unit 111 as an interface with the user; and a set item—MIB corresponding 15 unit 116 for rewriting the instructions issued from the set value reading unit 112 and the set value writing unit 113 into specific parameter numerical values by searching an MIB (Management Information Base) database.

The operation of a process for changing the settings of the nodes connected to the network using the network utility with the above construction will now be described.

FIG. 7 is a flowchart showing the operation for the setting changing process in the conventional network utility.

First, when the host utility 110 as a network utility is activated, it executes an operation (discovery) for finding out the nodes connected to the network, that is, the NIC apparatuses (printers/NICs) as printers.

Subsequently, whether the setting changing operation has been finished with respect to all nodes connected to the network and whose setting change is executed or not is discriminated. If the setting changing operation has been finished, the setting operation is finished. If the nodes which are connected to the network and whose settings are not changed exist, one node which is connected to the network and whose settings are not changed is selected and the present set items are read out by using the network utility. By such an operation, the set items and the present set values of the relevant nodes connected to the network are displayed on the network utility.

The set values displayed on the network utility are changed. At this time, all of the items in which the setting change is necessary are changed.

Subsequently, after confirming that all of the set items have correctly been changed, a "decide button" to transmit the set values which the network utility has to the nodes connected to the network is clicked by a mouse. By such an operation, the changed set values are transmitted to the nodes connected to the network.

In order to distinguish the nodes which are connected to the network and have been set from the nodes which are connected to the network and whose settings are not changed yet, the administrator makes a memo of information each time the setting operation for one printer is finished.

The flowchart of FIG. 7 will now be described.

Step S1: Discovery of the NIC apparatus is made.

Step S2: The presence or absence of the unset NIC apparatuses is discriminated. If there are unset NIC apparatuses, step S3 follows. If there is no unset NIC apparatus, the processing routine is finished.

Step S3: One apparatus is selected and the set items are read out.

Step S4: The set values are changed.

Step S5: The set values are transmitted to the NIC apparatus.

Step S6: The memo of the information is made as a set NIC apparatus and the processing routine is returned to step S2.

However, in the conventional parameter setting method via the network, the administrator who manages a plurality of printers needs to repeat the setting operation as many times as the number of printers to be managed. Therefore, much time has to be spent for managing the nodes connected to the network and it takes a long time to perform the setting changing operation of the network utility. Since the setting changing operation requires a lot of work, a possibility of making a mistake in the operation (erroneous setting) is high.

SUMMARY OF THE INVENTION

It is an object of the invention to provide a method for setting parameter via network, in which the problems of the conventional parameter setting method via the network are solved, the setting changing operation of a network utility is lightened, time which is required for the setting changing operation is shortened, and operation mistakes can be reduced.

For this purpose, there is provided a method for setting parameter via network for a plurality of nodes connected with the network, wherein peculiar information and set items of are read out, the common set items are selected, and the parameters are transmitted.

That is, according to the present invention, there is provided a method for setting parameter via network for nodes connected to the network, comprising the steps of:

reading out peculiar information and set items of a plurality of nodes; and selecting a common set item and transmitting a parameter.

In the method for setting parameter via network, the common set item is selected and a common parameter is transmitted.

Further, the method for setting parameter via network may comprise the steps of:

executing an arithmetic operation to an inputted first set value and forming a second set value;

selecting a common set item of a first node and a second node; and setting the first set value into the first node and setting the second set value into the second node.

Moreover, the method for setting parameter via network may comprise the steps of:

setting a value which is read out from a file designated for the selected set item of the nodes with respect to a same set item of a node connected to another network; and designating different set values to be set with respect to the same set item of the node connected to the another network into the designated file, respectively.

Furthermore, the method for setting parameter via network may comprise the steps of:

obtaining a setting range of each node connected to each network when the same set item is a type having a range of the available set values;

designating a maximum value and a minimum value in the setting range by an administrator, respectively; and setting a maximum value and a minimum value according to each node connected to the network.

Further, the method for setting parameter via network may comprise the steps of:

obtaining a default value of the found node connected to the network at the time of activation of a utility or at a predetermined period after the activation;

designating the default value every the item; and setting the default value when the default value is designated every the set item.

Moreover, the method for setting parameter via network may comprise the steps of:

storing present set contents into a database; and reflecting all settings or the setting stored every setting to the node which has been set to other settings as necessary.

Furthermore, the method for setting parameter via network may comprise the step of selecting the nodes which are connected to the network and to which each setting patterning process is executed.

Further, the method for setting parameter via network may comprise the steps of:

dividing the nodes which are connected to the network and to which each setting patterning process is executed into a plurality of groups;

selecting the node connected to the network serving as a reference in each group; and changing the settings of a plurality of nodes connected to the network every the group.

Moreover, the method for setting parameter via network may comprise the step of setting all of the set items of similar groups to "Enable" or "Disable".

Furthermore, the method for setting parameter via network may comprise the steps of:

dividing the nodes which are connected to the network and to which each setting patterning process is executed into the plurality of groups on the basis of an information table by using information such as node manufacturing company, network card manufacturing company, or the like as a key;

selecting the node connected to the network serving as a reference in each group; and simultaneously changing the settings of a plurality of nodes connected to the network every the group.

Further, the method for setting parameter via network may comprise the steps of:

previously confirming a node side operation such as a dynamic address solving process or the like on a network utility side;

selecting the setting which operates normally on the basis of a result of the confirmation; and executing the selected setting to the nodes connected to the network.

Moreover, the method for setting parameter via network may comprise the steps of:

before the node connected to the network in which a plurality of dynamic address solving processes have been designated operates, discriminating whether the node can obtain an address or not;

after the node connected to the network in which the plurality of dynamic address solving processes have been designated operated, discriminating whether the node can obtain the address or not;

identifying an address solving method used for the connection on the basis of the two discrimination results;

specifying a server in which the node obtained the address; and specifying a portion of a problem which occurs at present in an allocating environment of a dynamic address.

Further, according to the present invention, there is also provided a host computer, comprising:

a device finding unit for finding node connected with network;

a set value reading unit for reading out set information of the node;

a user I/F unit for displaying common set item possessed by plural of the nodes found by the device finding unit, and for receiving the common set item; and a set value writing unit for writing the set information into node connected with corresponding network decided based on the set item received by user I/F unit.

In the host computer, the user I/F unit displays the common set item possessed by plural of the nodes found by the device finding unit, and for receiving the common set item, sets same parameter into the common set item by copying.

Further, the host computer may comprise a per-pattern processing unit. In this case, the device finding unit finds a first and a second node that are connected with network;

the set value reading unit respectively reads out set information of the first node and the second node;

the a user I/F unit displays common set item possessed by the first node and the second node and receives a first set item;

the per-pattern processing unit, after a first set value is received, performs a predeterminate calculation with respect to the first set value and seeks a second set value; and the set value writing unit writes the first set value into the first node and writes the second set value into the second node.

Moreover, the host computer may comprise a per-pattern processing unit. In this case, the user I/F unit displays common set item possessed by plural of the nodes found by the device finding unit, and receives a scope of parameter set possibly into the common set item;

the per-pattern processing unit, with respect to each node, selects different set values in the scope of parameter; and the set value writing unit writes the set information into node connected with corresponding network decided based on pattern selected by the per-pattern processing unit.

Furthermore, the host computer may comprise a default information obtaining unit and a per-pattern processing unit. In this case, the default information obtaining unit respectively reads out default set values of each node from plural of nodes found by the device finding unit;

the user I/F unit displays common set item possessed by plural of the nodes found by the device finding unit, and holds the common set item serving as a receiving item specified to receive the default set value;

the per-pattern processing unit, regarding the receiving item specified to receives the default set value, selects set value obtained by the default information obtaining unit with respect to each node; and the set value writing unit writes the set information into node connected with corresponding network decided based on pattern selected by the per-pattern processing unit.

Further, in the host computer of the present invention, the user I/F unit may display plural of the nodes found by the device finding unit, may divide the displayed nodes into groups by selecting, may display the common set item with respect to each group and may receive the common set item; and the set value writing unit, corresponding to the group, may write the set information into node connected with corresponding network decided based on set item received by the user I/F unit.

Moreover, in the host computer of the present invention, the user I/F unit may display plural of the nodes found by the device finding unit, may select together nodes suitable for the set item, and may receive nodes selected and parameter of the set item.

Further, The host computer of the present invention may comprise a operation discriminating unit. In this case, the operation discriminating unit judges whether parameter establishment regarding network address is received by the user I/F unit, judges whether the network address is normally available at corresponding node decided based on the parameter establishment, and judges the assignation operation regarding the network address; and the set value writing unit, when the operation discriminating unit judged that the network address is normal, writes the network address into node connected with corresponding network.

The above and other objects and features of the present invention will become apparent from the following detailed description and the appended claims with reference to the accompanying drawings.

BRIEF DESCRIPTION OF THE DRAWINGS

FIG. 3 is a diagram showing an example of conventional set items;

FIG. 4 is a diagram showing an example of default values of the conventional set items;

FIG. 8 is a diagram showing settings of protocols in the first embodiment of the invention;

FIG. 9 is a diagram showing a main page of a network utility in the first embodiment of the invention;

FIG. 10 is a diagram showing a dialog box for setting the protocols in the first embodiment of the invention;

FIG. 11 is a diagram showing an example of setting of printers in the first embodiment of the invention;

FIG. 24 is a diagram showing a dialog box for setting protocols in the fifth embodiment of the invention;

FIG. 32 is a diagram showing a construction of a database for user optimum values in the sixth embodiment of the invention;

FIG. 33 is a diagram showing a dialog box for setting protocols in the sixth embodiment of the invention;

FIG. 38 is a diagram showing a main page of a network utility in the eighth embodiment of the invention;

FIG. 41 is a diagram showing settings of protocols in the ninth embodiment of the invention;

FIG. 42 is a diagram showing a dialog box for setting the protocols in the ninth embodiment of the invention;

FIG. 45 is a diagram showing a main page of a network utility in the tenth embodiment of the invention;

FIG. 48 is a table showing an example of grouping keys in the tenth embodiment of the invention;

FIG. 60 is a table showing an example of discriminating algorithms in the twelfth embodiment of the invention.

DETAILED DESCRIPTION OF THE PREFERRED EMBODIMENTS

Embodiments of the invention will be described in detail hereinbelow with reference to the drawings.

Figure 1:
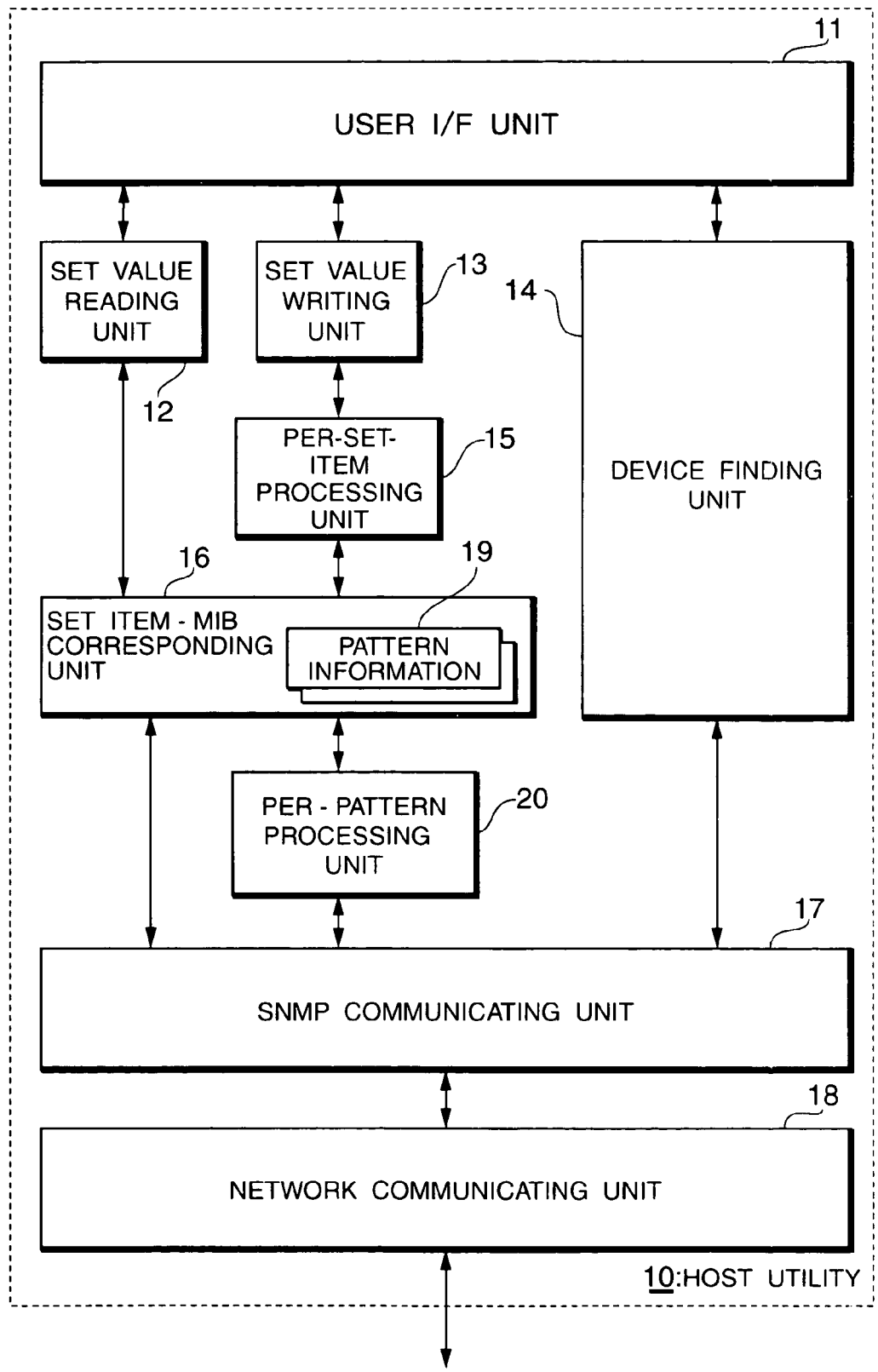
FIG. 1 is a diagram showing a construction of a network utility in the first embodiment of the invention.
Figure 2:
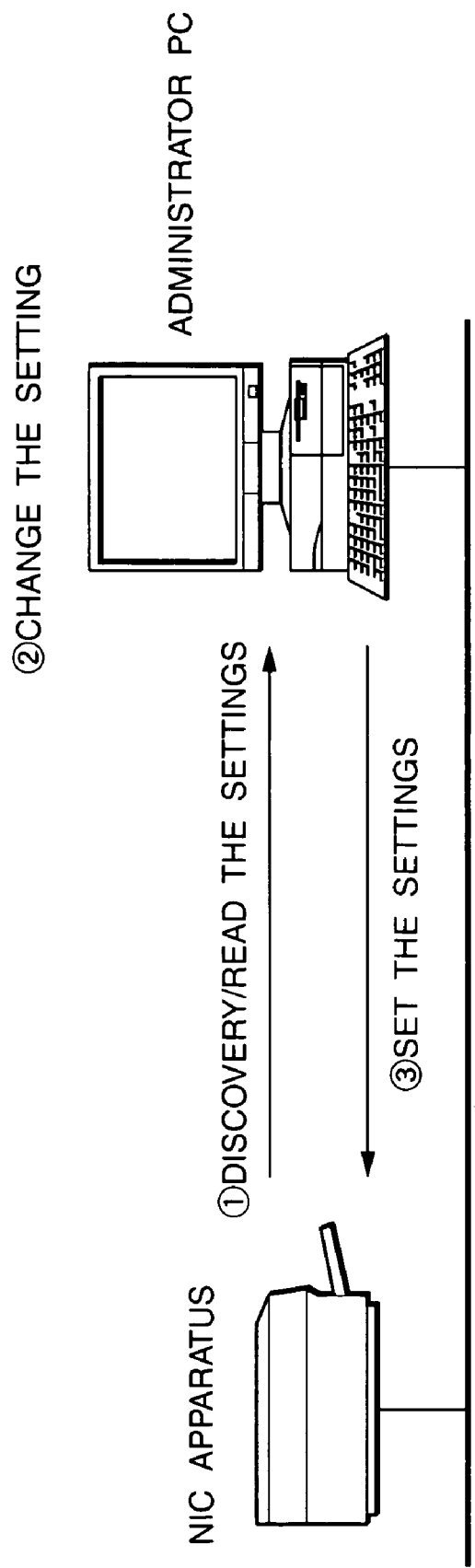
FIG. 2 is a diagram showing a procedure in a conventional setting method.
Figure 5:
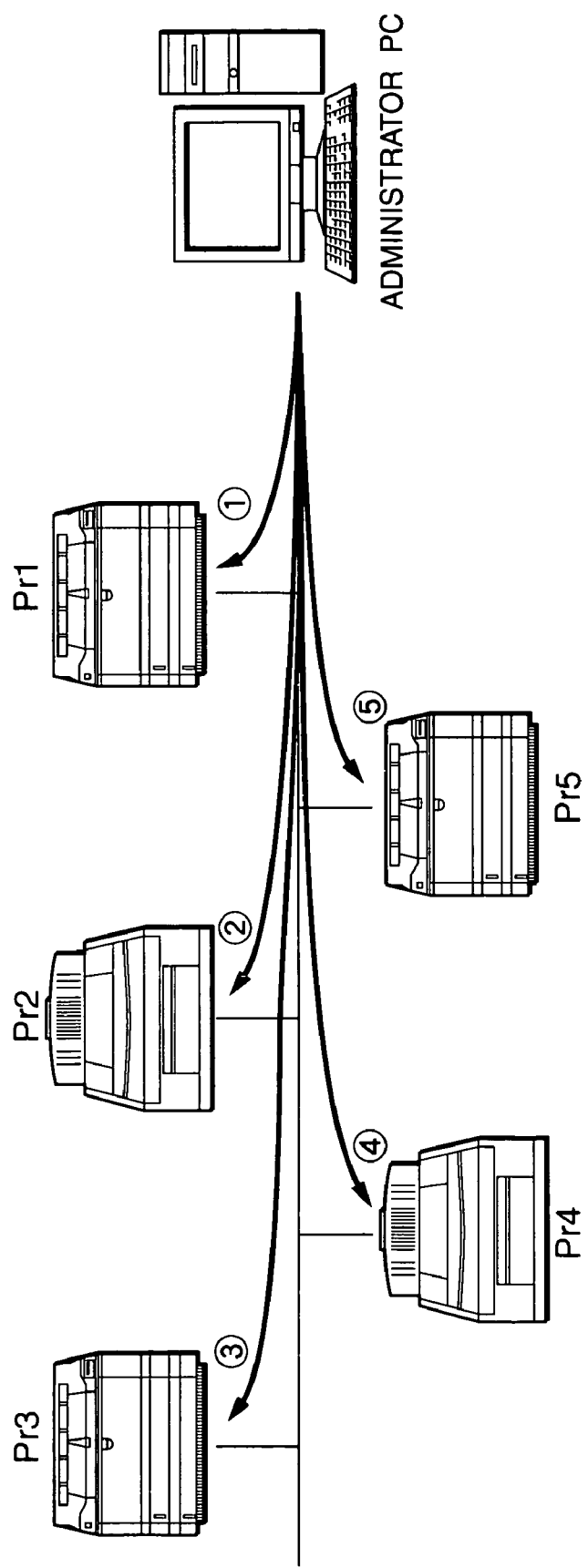
FIG. 5 is a diagram showing an example of a conventional network.
Figure 6:
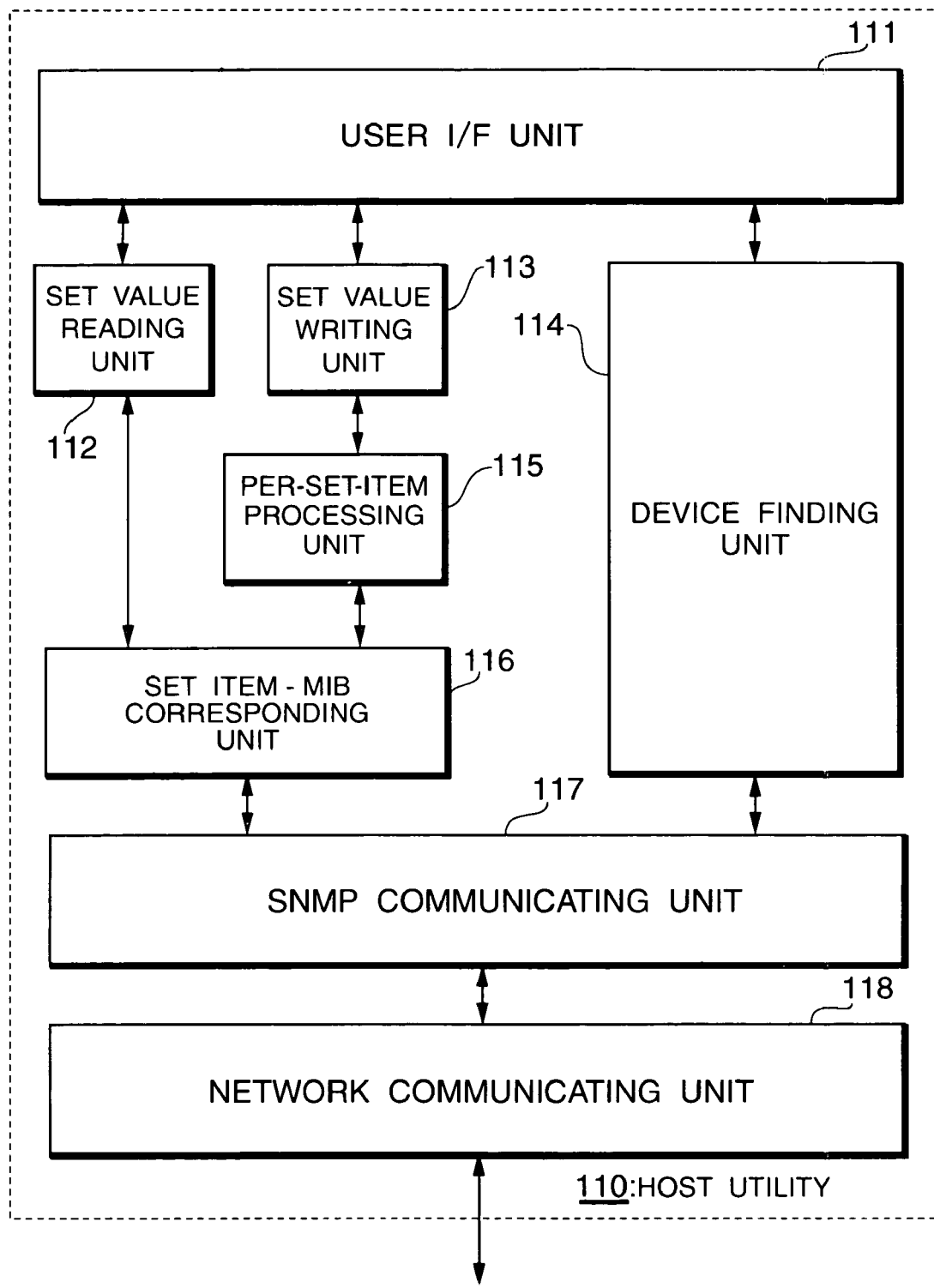
FIG. 6 is a diagram showing a construction of a conventional network utility.
Figure 7:
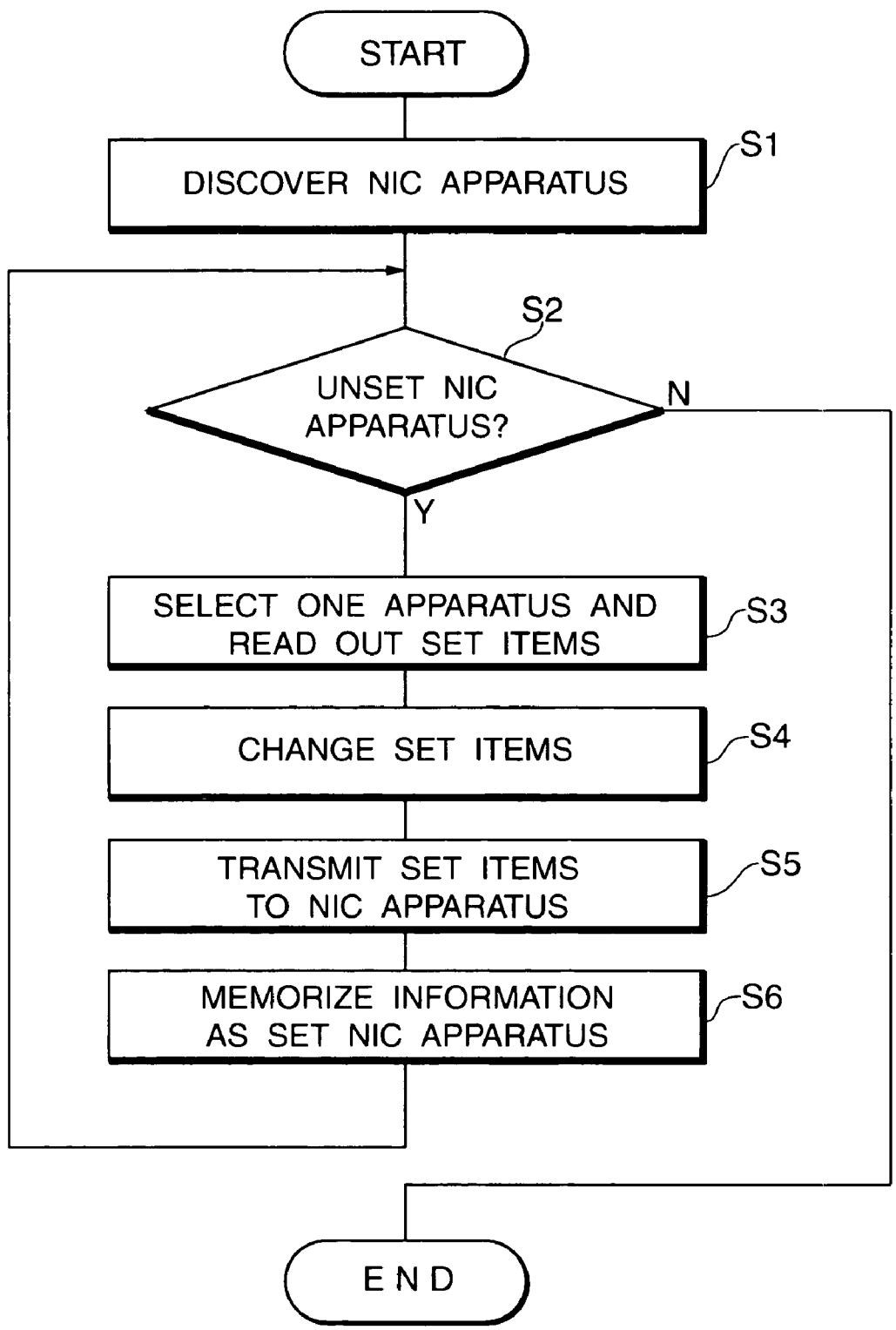
FIG. 7 is a flowchart showing the operation of a setting changing process in the conventional network utility.

FIG. 1 is a diagram showing a construction of a network utility in the first embodiment of the invention. FIG. 8 is a diagram showing settings of protocols in the first embodiment of the invention.

In the embodiment, with respect to set items in each of which a same set value is set for a plurality of nodes connected to a network, another setting can be made by the setting of one node.

As shown in FIG. 1, a host utility 10 serving as a network utility in the embodiment comprises: a user I/F unit 11 as an interface with the user; a network communicating unit 18 having a function for communicating with the nodes connected to the network by a network protocol; an SNMP communicating unit 17 for notifying the nodes connected to the network of a kind (whether information is obtained or written) of an action that is communicated by using an SNMP of an upper protocol; a device finding unit 14 having a function for finding out the unset nodes connected to the network; a set value reading unit 12 for issuing an instruction for reading out set information of the nodes connected to the network; a set value writing unit 13 for issuing an instruction for writing the set information by the nodes connected to the network; a per-set-item processing unit 15 for discriminating whether the instruction issued by the set value writing unit 13 or its contents is/are correct or not; a set item—MIB corresponding unit 16 for replacing the instruction issued from the set value reading unit 12 or the set value writing unit 13 into specific parameter numerical values by searching an MIB database; pattern information 19 for holding pattern information for patterning into the set item—MIB corresponding unit 16; and a per-pattern processing unit 20 for executing a process according to the pattern in accordance with the information in the pattern information 19.

The operation of the network utility with the above construction will now be described.

First, an item which is set in common into each node connected to the network is a setting of Enable/Disable of each protocol as shown in FIG. 8. Usually, by setting all protocols to "Enable (valid)", no problem occurs. Therefore, it can become a common setting. With respect to set items which can be automatically set, a set value AUTO exists and, by setting the set item to this value, the set item can become a common setting.

Even in the case where there are a plurality of nodes connected to the network, a possibility that the server is activated only in order to set an address only for the specific node connected to the network is low. Therefore, address setting systems ordinarily become common.

When a plurality of nodes connected to the network exist in a narrow area, since the server which is used for printing or the like also becomes common, it can become a common setting. In many cases, the mask value of the address is common in the case where it is used in one school or company. Therefore, it can become a common setting.

It can be said that there are a large variety of set items which become targets in the embodiment. In the invention, the set items in which the same value can be set into the nodes connected to the network are defined as a pattern of "Same Value".

Subsequently, a procedure for setting the set items will be described. The embodiment will be described with respect to the case where the nodes connected to the network are printers.

FIG. 9 is a diagram showing a main page of a network utility in the first embodiment of the invention. FIG. 10 is a diagram showing a dialog box for setting the protocols in the first embodiment of the invention. FIG. 11 is a diagram showing an example of setting of the printers in the first embodiment of the invention.

A setting display screen of each protocol will be described here. First, each protocol is set by the dialog box as shown in FIG. 10. In this case, a combo box is provided every protocol and a value "Enable (valid)" or "Disable (invalid)" can be selected. In the case where an initial value has been set to "Disable", when it is set for all of the printers, the top printer displayed on a list as shown in FIG. 9 is selected, thereby allowing the dialog box as shown in FIG. 10 to be displayed.

Subsequently, settings of the protocols are all set to "Enable". The processes so far are the same as those in the conventional setting method. In the embodiment, one corresponding combo box is provided for each set value. There are "No Type", "Same Value", and the like as selection elements. In the embodiment, since the same value as that of the present selected printer is set for all printers, "Same Value" is selected from the selection elements. After that, a "decide (the set values are transmitted to the printer) button" provided for each set page/dialog box is clicked. In FIG. 10, the "decide button" is omitted.

In addition to the setting method of one printer as described above, by setting a pattern, all of the printers shown in FIG. 9 can be set. Values which are specifically set will now be described.

In FIG. 11, it is assumed that the printer which has actually been set is Printer No. 1 locating at the top on the list. It is assumed that the setting of valid (Enable)/invalid (Disable) of TCP/IP is set to "Enable" and the setting of Subnet Mask is set to "255.255.255.0" as a class C standard. In this case, by executing the operation as mentioned above, settings of Enable/Disable of TCP/IP of Printer No. 2 to Printer No. 7 are all set to "Enable" and settings of Subnet Mask are all set to "255.255.255.0".

The operation of the per-pattern processing unit 20 at the time when the above operation is executed will be described.

Figure 12:
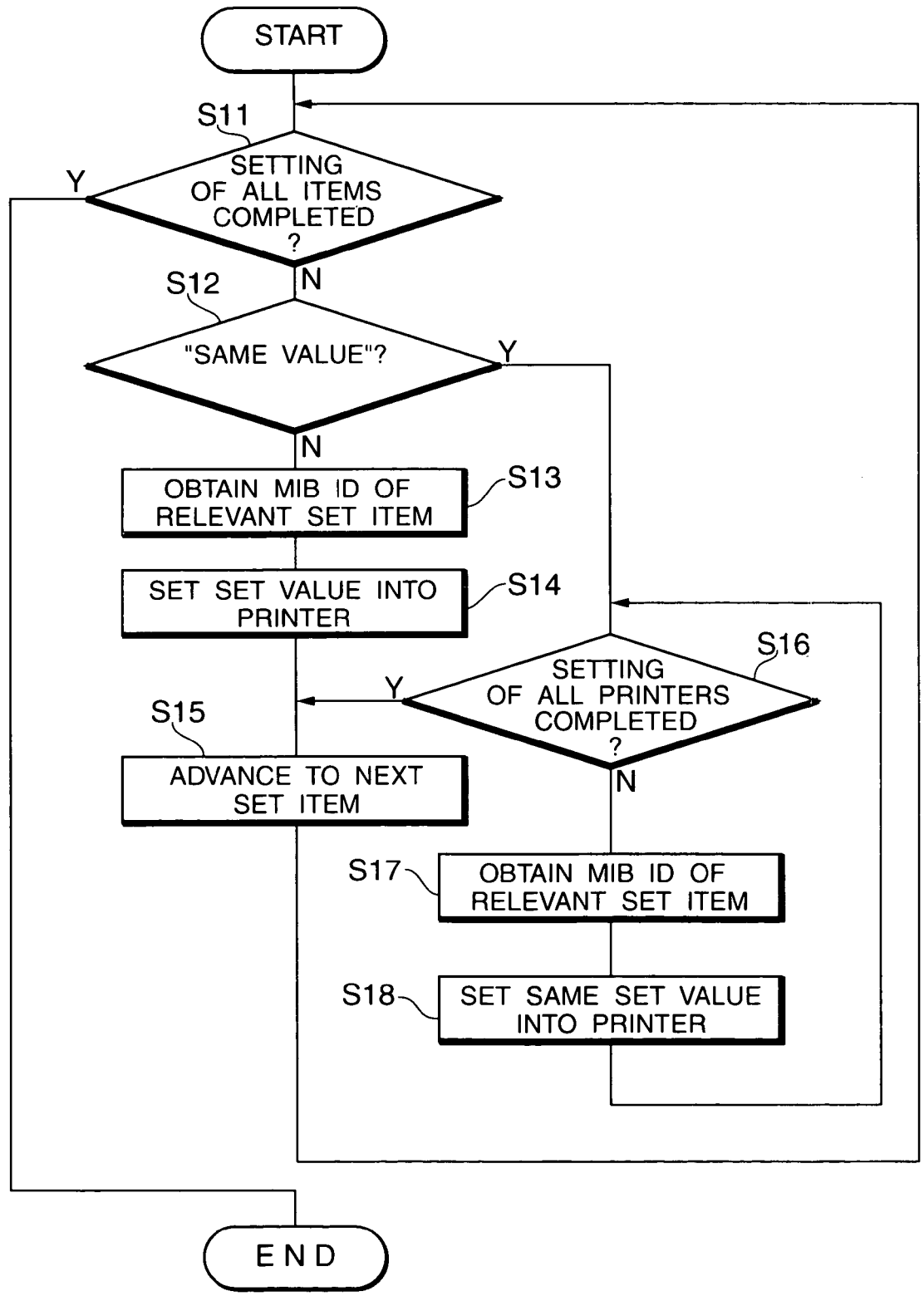
FIG. 12 is a flowchart showing the operation of the network utility in the first embodiment of the invention.

FIG. 12 is a flowchart showing the operation of the network utility in the first embodiment of the invention.

In this case, when the per-pattern processing unit 20 receives a change request for changing the set values of the set items from the set value writing unit 13 and the per-set-item processing unit 15, the unit 20 confirms whether the setting of all items has been completed or not. If the setting of all items has been completed, the processing routine is finished.

Subsequently, whether the setting of the pattern has been designated or not is discriminated. In the embodiment, "No Type (no pattern designation)" and "Same Value (pattern designation to set to the same value)" become the selection elements.

When the pattern designation is "No Type", that is, not "Same Value", with respect to the set item in which the change request has been designated, an MIB value (MIB ID) of the relevant set item is obtained from the set item—MIB corresponding unit 16.

Subsequently, the set value of the change request and the MIB value of the set item are used as arguments and the SNMP communicating unit 17 is requested to change the set value of the set item. Thus, the set value is set into the printer.

Subsequently, the process advances to the next item whose change has been requested as a set item and whether the setting of all items has been completed or not is discriminated.

Whether the pattern setting has been designated or not is discriminated. If the pattern designation is "Same Value", whether the pattern process has been finished or not is discriminated. That is, whether the setting of all of the printers has been completed or not is discriminated. If the pattern processes of all of the printers have been finished, the process advances to the next item whose change has been requested as a set item.

If the pattern processes of all of the printers are not finished yet, the MIB value of the relevant set item is obtained with respect to the set item whose change request has been designated.

Subsequently, the operation corresponding to the pattern "Same Value" is read out from the pattern information 19, the set value of the change request and the relevant MIB value are used as arguments, and the SNMP communicating unit 17 is requested to change the set value of the set item. Thus, the same set value is set into the printer.

When the set values of each printer are changed, whether the pattern processes of all of the printers have been finished or not is discriminated.

One printer whose setting is made is not always limited to the top printer on the list but on the basis of the setting of the selected one of the seven printers shown in FIG. 9, "Same Value" can be also set into the other printers.

Explanation will now be made with reference to the flowchart of FIG. 12.

Step S11: Whether the setting of all items has been completed or not is discriminated. If it has been completed, the processing routine is finished. If it is not completed, step S12 follows.

Step S12: Whether the pattern designation is "Same Value" or not is discriminated. If it is "Same Value", step S16 follows. If it is "No Type", step S13 follows.

Step S13: The MIB ID of the relevant set item is obtained.

Step S14: The set value is set into the printer.

Step S15: The processing routine advances to the next set item and is returned to step S11.

Step S16: Whether the setting of all printers has been completed or not is discriminated. If it has been completed, step S15 follows. If it is not completed, step S17 follows.

Step S17: The MIB ID of the relevant set item is obtained.

Step S18: The same set value is set into the printer and the processing routine is returned to step S16.

As mentioned above, in the embodiment, in the case of changing the settings of the nodes connected to the network, when the set values of the nodes are the same, by executing the setting process of almost one printer as a node, the setting of all of the printers serving as targets of the setting change can be made. Therefore, the operation time that is required for the setting change can be shortened and the operation mistakes in the setting change can be prevented.

The second embodiment will now be described. Since a network utility in the second embodiment has substantially the same structure as that of the network utility in the first embodiment, it will be described also with reference to FIG. 1.

According to the second embodiment, with respect to a plurality of nodes connected to the network, by setting one node regarding the set item in which the set value whose numerical value portion to be set changes by one is set, other nodes can be also set.

The operation of the network utility with the above construction will now be described.

As items which include a numerical value in each of the nodes connected to the network and in which a value for increasing the numerical value by 1 can be set, there are an item including a character train such as Printer Name or Print Server Name, an address such as IP Address, and the like. In the case of including the character train, a case where Printer No. 1 is set when the top printer on the list as shown in FIG. 9 is set and subsequent Printer Names are set to Printer No. 2, Printer No. 3, Printer No. 4, Printer No. 5, Printer No. 6, and Printer No. 7 or the like corresponds to the second embodiment.

In the embodiment, the set item in which the value as mentioned above can be set into each node connected to the network is defined as a pattern "Ordinal Number Increment".

A procedure for setting the set items in the embodiment will now be described. In the embodiment, a case where the nodes connected to the network are printers will be described.

Figures 13, 14:
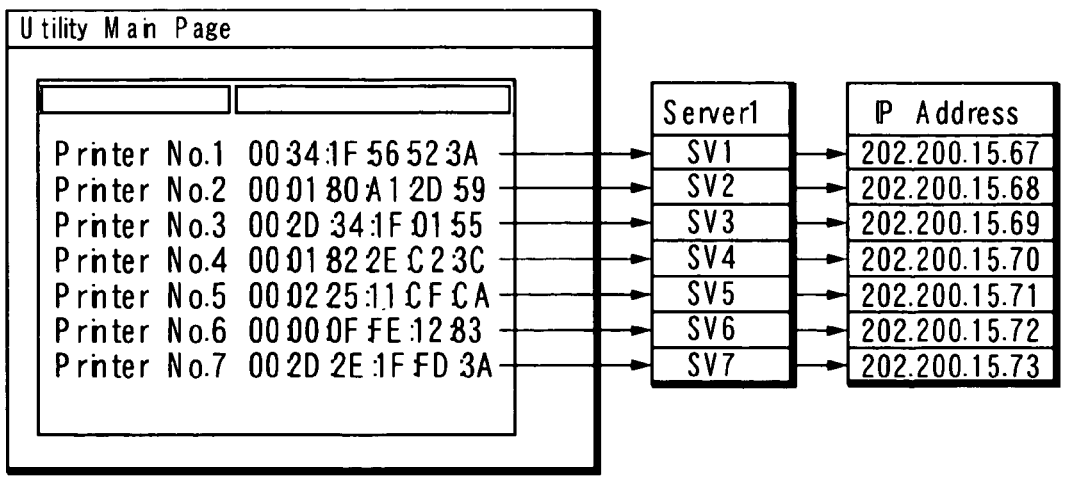
FIG. 13 is a diagram showing a dialog box for setting protocols in the second embodiment of the invention.
FIG. 14 is a diagram showing an example of setting of printers in the second embodiment of the invention.

FIG. 13 is a diagram showing a dialog box for setting protocols in the second embodiment of the invention. FIG. 14 is a diagram showing an example of setting of printers in the second embodiment of the invention.

A setting display screen of IP Address and a setting display screen of a server name as shown in FIG. 13 will be described as an example.

First, the setting of each protocol is made by the dialog box as shown in FIG. 13. At this time, an edit box is provided every set item and a numerical value or a character train can be inputted. In order to set the numerical value or character train into all of the printers if no initial value is set, the top printer among the printers shown in FIG. 9 is selected and the dialog box shown in FIG. 13 are displayed.

Subsequently, the setting of IP Address is set to "202.200.15.67". The setting of Server1 is set to "SV1". The setting of Server2 is set to "Backup SV1". The processes so far are substantially the same as those in the conventional setting method. In the embodiment, one corresponding combo box is provided for each set value. There are "No Type", "Ordinal Number Increment", and the like as selection elements. In the embodiment, since the values whose numerical value portions are increased by one from those of the present selected and set printer are set into all of the printers, "Ordinal Number Increment" is selected from the above selection elements. After that, the "decide (the set values are transmitted to the printer) button" provided for each set page/ dialog box is clicked. In FIG. 13, the "decide button" is omitted.

By selecting the setting method of one printer and setting the pattern as mentioned above, all of the printers shown in FIG. 9 can be set.

Explanation will now be made by using values which are specifically set.

In FIG. 14, it is assumed that the printer which has actually been set is the top printer (Printer No. 1) on the list. If the setting of IP Address is set to "202.200.15.67", the setting of Server1 is set to "SV1", and the setting of Server2 is set to "Backup SV1", by executing the operation as mentioned above, the settings of IP Addresses of Printer No. 2 to Printer No. 7 are set to "202.200.15.68", "202.200.15.69", "202.200.15.70", "202.200.15.71", "202. 200.15.72", and "202.200.15.73", respectively. The settings of Server1 are set to "SV2", "SV3", "SV4", "SV5", "SV6", and "SV7", respectively.

The operation of the per-pattern processing unit 20 as a target of the embodiment at the time when the foregoing operation is executed will now be described.

Figure 15:
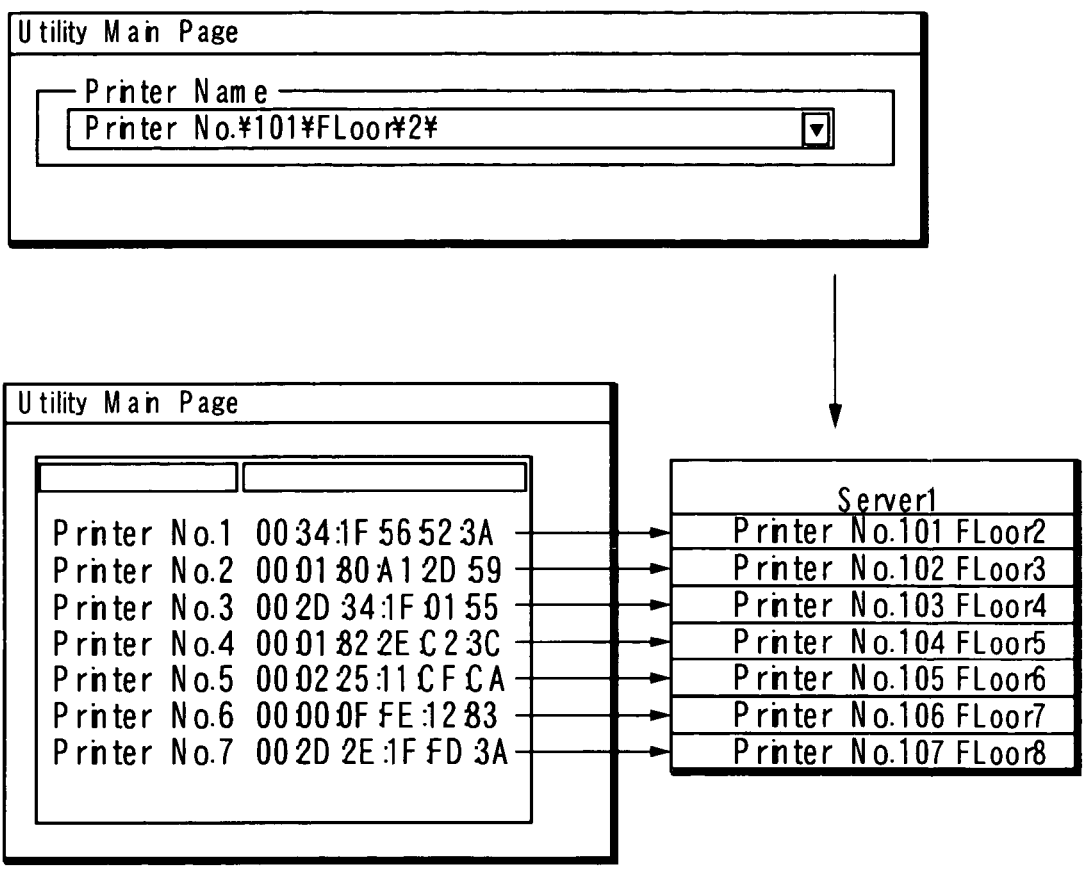
FIG. 15 is a diagram showing the operation of a per-pattern processing unit in the second embodiment of the invention.
Figure 16:
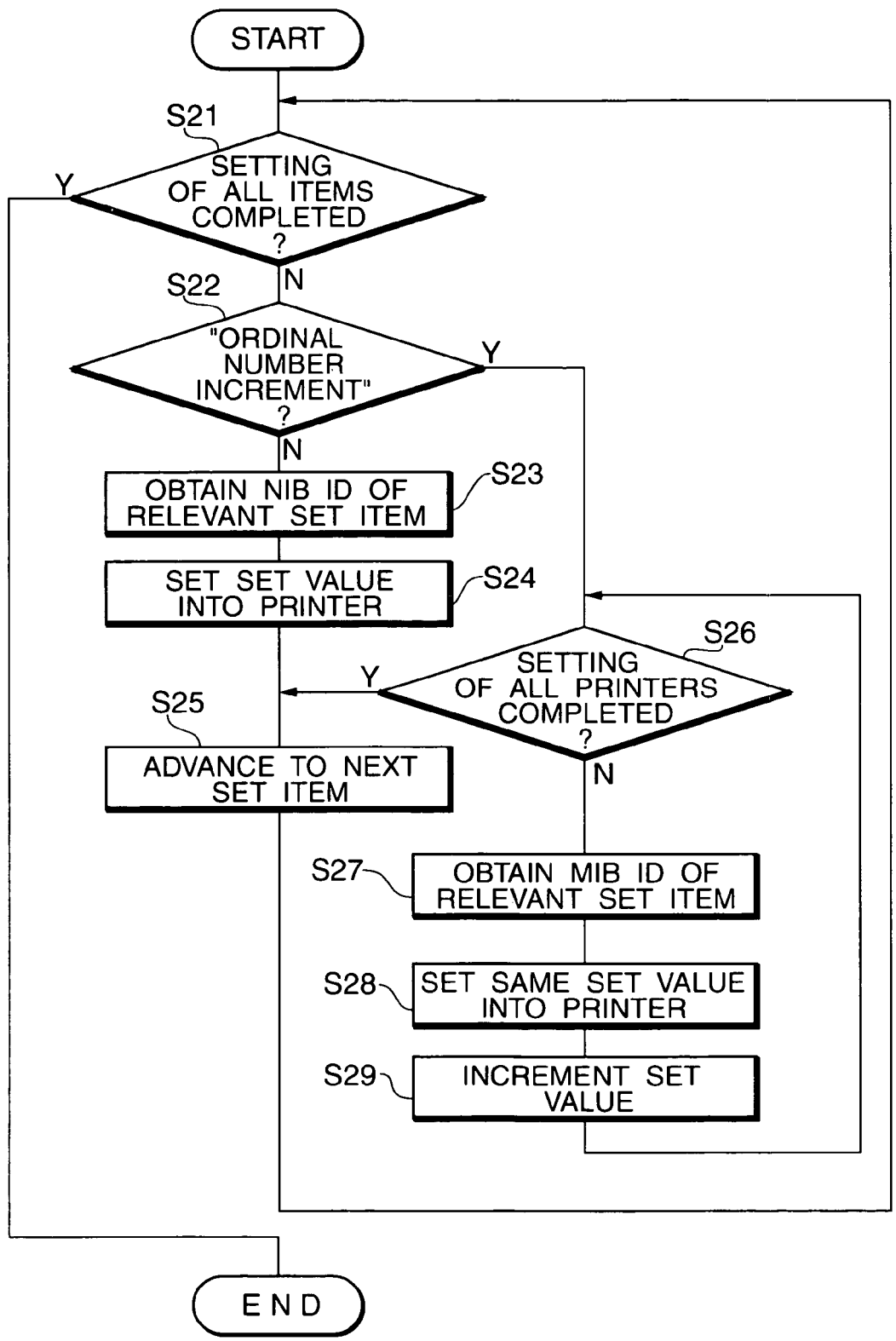
FIG. 16 is a flowchart showing the operation of a network utility in the second embodiment of the invention.

FIG. 15 is a diagram showing the operation of the per-pattern processing unit in the second embodiment of the invention. FIG. 16 is a flowchart showing the operation of a network utility in the second embodiment of the invention.

In this case, when the per-pattern processing unit 20 receives the change requests for changing the set values of the set items from the set value writing unit 13 and the per-set-item processing unit 15, the unit 20 confirms whether the setting of all items has been completed or not. If the setting of all items has been completed, the processing routine is finished.

Subsequently, whether the setting of the pattern has been designated or not is discriminated. In the embodiment, "No Type (no pattern designation)" and "Ordinal Number Increment (pattern designation in which the value which has been increased by one is set)" become selection elements. If the pattern setting is "No Type", with respect to the set item whose change request has been designated, the corresponding MIB value (MIB ID) is obtained from the process of the set item—MIB corresponding unit 16.

Subsequently, the set value of the change request and the relevant MIB value are used as arguments and the SNMP communicating unit 17 is requested to change the set value of the set item. Thus, the set value is set into the printer.

Subsequently, the process advances to the next item whose change has been requested as a set item and whether the setting of all items has been completed or not is discriminated.

If the setting of the pattern is "Ordinal Number Increment", first, whether the pattern processes of all printers have been finished or not is discriminated. That is, whether the setting of all of the printers has been completed or not is discriminated. If the pattern processes of all printers have been finished, the process advances to the next item whose change has been requested as a set item.

If the pattern processes of all printers are not finished, with respect to the set item whose change request has been designated, the corresponding MIB value is obtained from the process of the set item—MIB corresponding unit 16.

Subsequently, the operation corresponding to the pattern "Ordinal Number Increment" is read-out from the pattern information 19. The set value of the change request and the relevant MIB value are used as arguments and the SNMP communicating unit 17 is requested to change the set value of the set item. Thus, the set value is set into the printer.

Subsequently, the numerical value portion is incremented for the set value of the printer. When the set values of each printer are changed, whether the pattern processes of all printers have been finished or not is discriminated.

At this time, the value which is incremented is not limited to the numerical value but can be a character train. That is, since the character train is expressed by a character code (for example, a=61H), if the portion of "a" is a target of the increment, the next set value becomes "b". The target of the increment is searched for from the least significant digit (carry) of the set value toward the upper digit and set to the numerical value which has been found first. If no numerical value is found, the character train is set to the target.

In the setting of the server, when the set value is set to "Server-A" and the pattern is designated as "Ordinal Number Increment", "Server-B", "Server-C", "Server-D", "Server-E", "Server-F", and "Server-G" are subsequently set.

If it is impossible to correspond by the foregoing algorithm as shown in FIG. 15, the value to be incremented can be designated by using a control code "¥" as "Ordinal Number Increment". In FIG. 15, "Printer No." is a fixed character train and becomes common to the printers as a set value. Since "101" as a next numerical value is sandwiched between control codes "¥", it becomes a target of the increment. Numerical values "101", "102", "103", "104", "105", "106", and "107" are set, respectively. Subsequent "Floor" is a fixed character train and becomes common to the printers as a set value. Since "2" as a next notification is sandwiched between the control codes "¥", it becomes a target of the increment. Numerical values "2", "3", "4", "5", "6", "7", and "8" are set, respectively.

Therefore, the set values of Server1 which are finally set into Printer No. 1 to Printer No. 7 become "Printer No. 101 Floor2", "Printer No. 102 Floor3", "Printer No. 103 Floor4", "Printer No. 104 Floor5", "Printer No. 105 Floor6", "Printer No. 106 Floor7", and "Printer No. 107 Floor8", respectively.

Explanation will now be made with reference to the flowchart of FIG. 16.

Step S21: Whether the setting of all items has been completed or not is discriminated. If it has been completed, the processing routine is finished. If it is not completed yet, step S22 follows.

Step S22: Whether the pattern designation is "Ordinal Number Increment" or not is discriminated. If it is "Ordinal Number Increment", step S26 follows. If it is "No Type", step S23 follows.

Step S23: The MIB ID of the relevant set item is obtained.

Step S24: The set value is set into the printer.

Step S25: The process advances to the next set item and the processing routine is returned to step S21.

Step S26: Whether the setting of all printers has been completed or not is discriminated. If it has been completed, step S25 follows. If it is not completed yet, the processing routine advances to step S27.

Step S27: The MIB ID of the relevant set item is obtained.

Step S28: The same set value is set into the printer.

Step S29: The set value is incremented and the processing routine is returned to step S26.

As mentioned above, in the embodiment, in the case of changing the settings of the nodes connected to the network, if the value in which the set value in each node has been incremented by one can be set, the setting of all of the printers in which the user wants to change the settings can be made by the setting process of almost one printer as a node. Therefore, the operation time which is required for the setting change can be shortened and the operation mistakes in the setting change can be prevented.

The third embodiment of the invention will now be described.

Since a network utility in the third embodiment has substantially the same structure as that of the network utility in the first embodiment, it will be described also with reference to FIG. 1.

In the third embodiment, even if the value portions to be set into a plurality of nodes connected to the network are values which are different every node connected to the network, with respect to the set items in which the fixed values are always set, by setting one node, they can be also set with respect to the other nodes.

The operation of the network utility with the above construction will now be described.

In this case, although the set items to be set have the values which are different every node connected to the network, as set items in which the fixed values are always set, set values of character trains such as Server Name, Printer Name, Print Server Name, Queue Name, and the like, destination information for transmitting communication mail at the time of occurrence of an error, and the like exist.

In the embodiment, the set items in which the same value can be set into the nodes connected to the network are defined as a pattern "fixed value".

A procedure for setting the set items mentioned above will now be described. The embodiment will be described on the assumption that the nodes connected to the network are the printers.

Figures 17, 18:
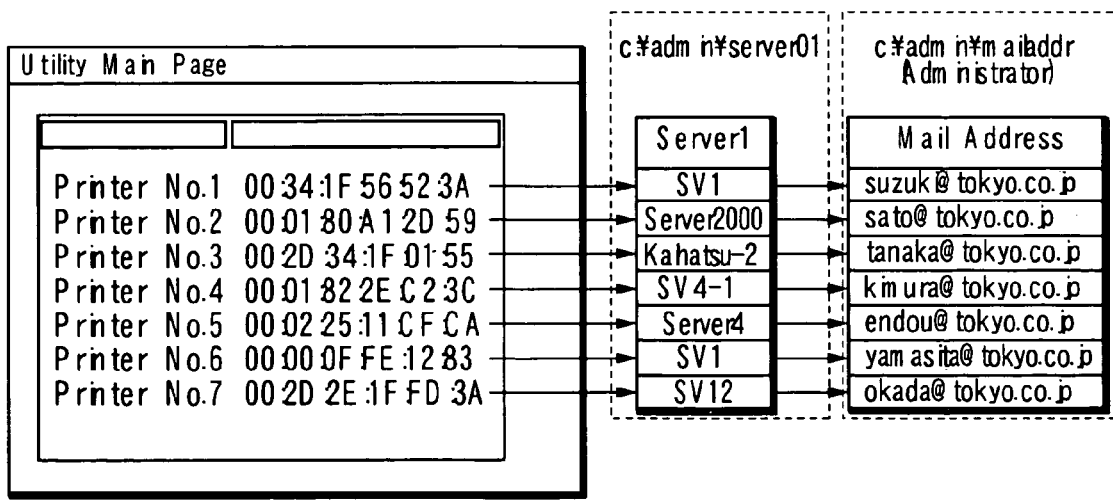
FIG. 17 is a diagram showing a dialog box for setting protocols in the third embodiment of the invention.
FIG. 18 is a diagram showing an example of setting of printers in the third embodiment of the invention.

FIG. 17 is a diagram showing a dialog box for setting protocols in the third embodiment of the invention. FIG. 18 is a diagram showing an example of setting of printers in the third embodiment of the invention.

In the above case, in FIGS. 17 and 18, a setting display screen of a communication destination mail address at the time of occurrence of an error and a setting display screen of a server for spooling print data will be explained as an example.

First, each protocol is set by the dialog box as shown in FIG. 17. At this time, an edit box is provided every set item and a free character train can be inputted. In the case where no initial value is set, if the initial value is set into each printer, the top printer among the printers shown in FIG. 9 is selected and the dialog box shown in FIG. 17 are displayed. Hitherto, although it has been necessary to input a proper character train into the edit box, in the embodiment, there is no need to input each setting. The third embodiment differs from the conventional setting method in terms of such a point.

Subsequently, in the embodiment, one corresponding combo box is provided for each set value and "No Type" exists as a selection element. In the embodiment, since the user wants to set different set values into all printers, the foregoing selection elements are not selected but a path to a file in which values to be set into the set items have been written is described. Although such an area is a combo box, text characters (showing the path to the file) have to be able to be inputted. After that, the "decide (the set values are transmitted to the printer) button" provided for each set page/dialog box is clicked. In FIG. 17, the "decide button" is omitted.

By selecting the setting method of one printer and setting the pattern mentioned above, all of the printers shown in FIG. 9 can be set.

Explanation will now be made by using values which are specifically set.

In FIG. 18, it is assumed that the printer which has actually been set is the top printer (Printer No. 1) on the list. If the setting of the mail address to be notified at the time of occurrence of an error is set to "c:¥admin¥mailaddr" and the setting of a server to print is set to "c:¥admin¥server01", by executing the operation as mentioned above, the settings of the mail addresses which are notified upon occurrence of the error of Printer No. 1 to Printer No. 7 are set to "suzuki@tokyo.co.jp", "sato@tokyo.co.jp", "tanaka@tokyo.co.jp", "kimura@tokyo.co.jp", "endou@tokyo.co.jp", "yamasita@tokyo.co.jp", and "okada@tokyo.co.jp", respectively. Settings of the servers to print are set to "SV1", "Server2000", "Kaihatsu-2", "SV4-1", "Server4", "SV1", and "SV12", respectively.

Contents of the file "c:¥admin¥mailaddr" are suzuki@tokyo.co.jp, sato@tokyo.co.jp, tanaka@tokyo.co.jp, kimura@tokyo.co.jp, endou@tokyo.co.jp, yamasita@tokyo.co.jp, and okada@tokyo.co.jp. Those values are partitioned by using a comma, a space, a tab, or the like as a separator. The network utility reads out the character train up to the separator in order from the beginning of the set file and sets it into the relevant set item. The first set value in the file becomes the set value which is set into the printer listed at the top of a utility main page. The second set value in the file becomes the set value which is set into the printer displayed at the second top on the list. In the case of resetting, therefore, it is necessary to pay attention so that each arranging order always becomes identical. For this purpose, it is desirable to sort the set values on the basis of the names of the printers (Printer Name) or the like.

In the case of newly expanding a printer, it is necessary to correct the relevant file by a text editor and add a set value to be set into the new printer.

The operation of the per-pattern processing unit 20 as a target of the embodiment at the time when the above operation is executed will now be described.

Figure 19:
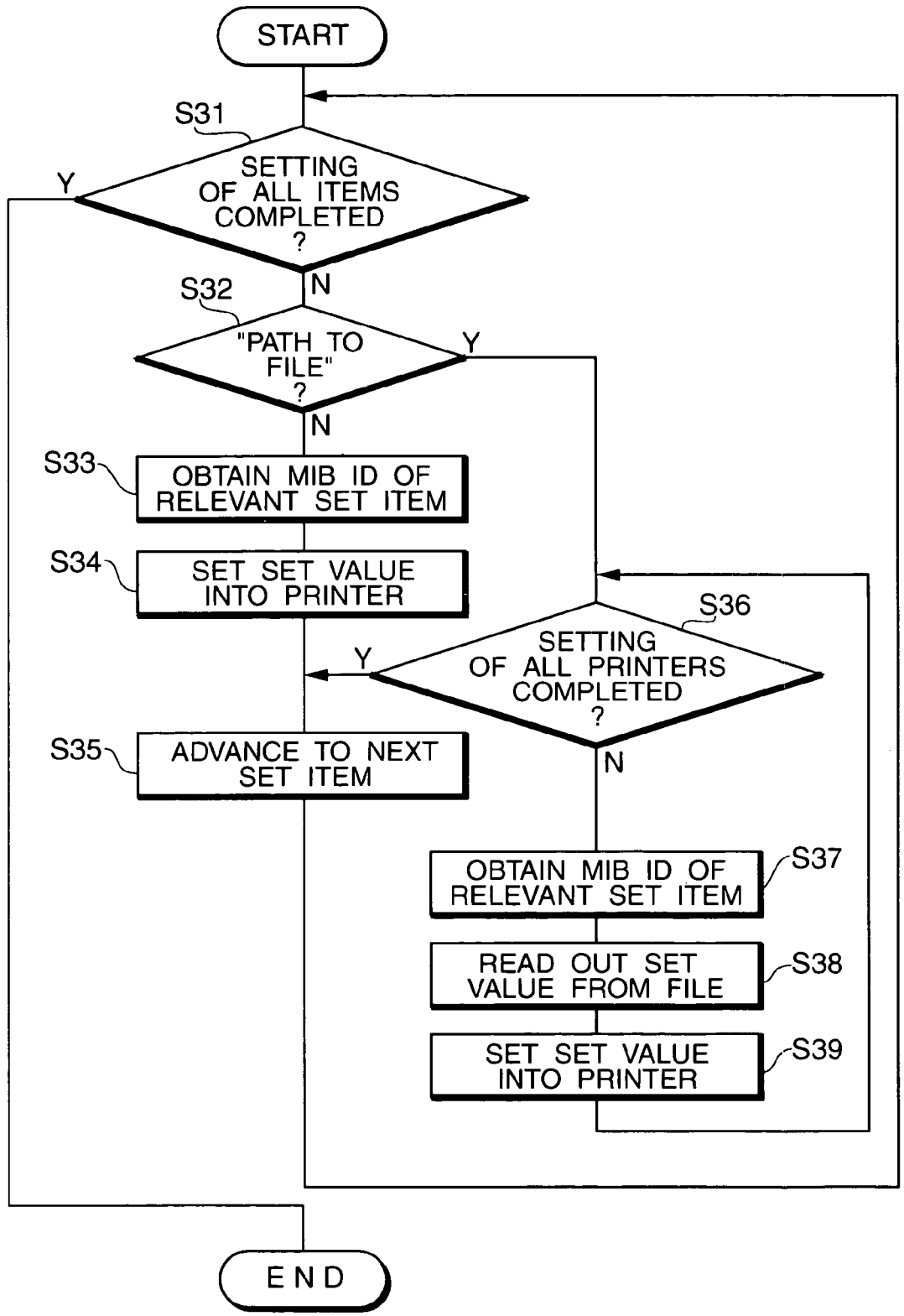
FIG. 19 is a flowchart showing the operation of a network utility in the third embodiment of the invention.

FIG. 19 is a flowchart showing the operation of the network utility in the third embodiment of the invention.

In this case, when the per-pattern processing unit 20 receives the change requests for changing the set values of the set items from the set value writing unit 13 and the per-set-item processing unit 15, the unit 20 confirms whether the setting of all items has been completed or not. If the setting of all items has been completed, the processing routine is finished.

Subsequently, whether the setting of the pattern has been designated or not is discriminated. In the embodiment, "No Type (no pattern designation)" and "Path to File (set value to the relevant set item)" become selection elements. If the pattern designation is "No Type", with respect to the set item whose change request has been designated, the corresponding MIB value (MIB ID) is obtained from the process of the set item—MIB corresponding unit 16.

Subsequently, the set value of the change request and the relevant MIB value are used as arguments and the SNMP communicating unit 17 is requested to change the set value of the set item. Thus, the set value is set into the printer.

Subsequently, the process advances to the next item whose change has been requested as a set item and whether the setting of all items has been completed or not is discriminated.

If the pattern designation is "Path to File", first, whether the pattern processes of all printers have been finished or not is discriminated. That is, whether the setting of all of the printers has been completed or not is discriminated. If the pattern processes of all printers have been finished, the process advances to the next item whose change has been requested as a set item.

If the pattern processes of all printers are not finished, with respect to the set item whose change request has been designated, the corresponding MIB value is obtained from the process of the set item—MIB corresponding unit 16.

Subsequently, the operation corresponding to the pattern "Path to File" is read out from the pattern information 19. The set value of the change request is read out from the designated file of the path. The set value of the change request and the relevant MIB value are used as arguments and the SNMP communicating unit 17 is requested to change the set value of the set item. Thus, the set value is set into the printer.

When the set values of each printer are changed, whether the pattern processes of all of the printers have been finished or not is discriminated.

Explanation will now be made with reference to the flowchart of FIG. 19.

Step S31: Whether the setting of all items has been completed or not is discriminated. If it has been completed, the processing routine is finished. If it is not completed yet, step S32 follows.

Step S32: Whether the pattern designation is "Path to File" or not is discriminated. If it is "Path to File", step S36 follows. If it is "No Type", step S33 follows.

Step S33: The MIB ID of the relevant set item is obtained.

Step S34: The set value is set into the printer.

Step S35: The process advances to the next set item and the processing routine is returned to step S31.

Step S36: Whether the setting of all printers has been completed or not is discriminated. If it has been completed, step S35 follows. If it is not completed yet, the processing routine advances to step S37.

Step S37: The MIB ID of the relevant set item is obtained.

Step S38: The set value is read out from the file.

Step S39: The set value is set into the printer and the processing routine is returned to step S36.

As mentioned above, in the embodiment, in the case of changing the settings of the nodes connected to the network, even if the value portions to be set are values which are different every node connected to the network, with respect to the set items in which fixed values are always set, the setting of all of the printers in which the user wants to change the settings can be made by the setting process of almost one printer as a node. Therefore, the operation time which is required for the setting change can be shortened and the operation mistakes in the setting change can be prevented.

Since the set value can be read out from the file and set every item, the file can be easily formed and a mistake in forming the file can be prevented.

The fourth embodiment of the invention will now be described. Since a network utility in the fourth embodiment has substantially the same structure as that of the network utility in the first embodiment, it will be described also with reference to FIG. 1.

In the fourth embodiment, with respect to the set items in the case where the set values to be set have a range for a plurality of nodes connected to the network, by setting them for one node, they can be also set with respect to the other nodes.

The operation of the network utility with the above construction will now be described.

As set items in which the set values to be set have the range and which are set into each node connected to the network, there are: a setting of print resolution in the printer; a setting of reception time-out for deciding how long the apparatus has to wait for continuous data in the case where the print data whose reception has been started is not transmitted halfway; a setting of a timer for monitoring whether the settings have been changed in the connected server or not; and the like.

In such set items, although numerical values which should be inputted are not decided, a range of an available value of the set value exists. In many cases, a maximum value or a minimum value is set as such a value in dependence on an environment in which the printer has been located.

In the embodiment, in the set items in which the set values to be set have the range, the maximum value is defined as a pattern "Maximum Value" and the minimum value is defined as a pattern "Minimum Value".

A procedure for setting the foregoing set items will now be described. The embodiment will be explained on the assumption that the nodes connected to the network are the printers.

Figures 20, 21:
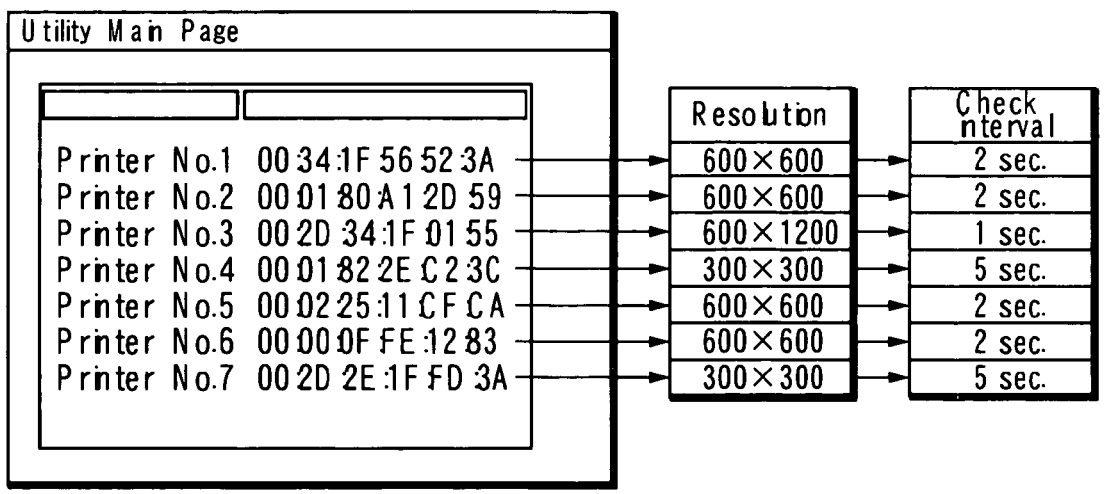
FIG. 20 is a diagram showing a dialog box for setting protocols in the fourth embodiment of the invention.
FIG. 21 is a diagram showing an example of setting of printers in the fourth embodiment of the invention.

FIG. 20 is a diagram showing a dialog box for setting protocols in the fourth embodiment of the invention. FIG. 21 is a diagram showing an example of setting of printers in the fourth embodiment of the invention.

In the above case, in FIGS. 20 and 21, a setting display screen of print resolution of each printer and a setting display screen of a check interval for monitoring the setting change or the like on the server side will be explained as an example.

First, each protocol is set by the dialog box as shown in FIG. 20. At this time, an edit box or a combo box is provided every protocol. A value "300×300", "600×600", or "600× 1200" can be selected as print resolution. In the case where no initial value is set or if the initial value is set to an undesirable value, when it is set into all of the printers, the top printer among the printers shown in FIG. 9 is selected and the dialog box shown in FIG. 20 are displayed. Hitherto, although it has been necessary to input a proper character train into the edit box, in the embodiment, there is no need to input each setting. The fourth embodiment differs from the conventional setting method in terms of such a point.

Subsequently, in the embodiment, one corresponding combo box is provided to each set value and "No Type", "Maximum Value", and "Minimum Value" exist as selection elements. In the embodiment, since either the maximum value or the minimum value which the set value can be set is set for the set items corresponding to all of the printers, "Maximum Value" or "Minimum Value" is selected as a selection element mentioned above. After that, the "decide (the set values are transmitted to the printer) button" provided for each set page/dialog box is clicked. In FIG. 20, the "decide button" is omitted.

By selecting the setting method of one printer and setting the pattern as mentioned above, all of the printers shown in FIG. 9 can be set.

Explanation will now be made by using values which are specifically set.

In FIG. 21, it is assumed that the printer which has actually been set is the top printer (Printer No. 1) on the list. It is assumed that the setting of the print resolution of the printer is set to "Maximum Value" and the setting of the check interval for monitoring the change of the set item on the server side is set to "Minimum Value". On such an assumption, by executing the operation as mentioned above, the print resolution of the printers of Printer No. 1 to Printer No. 7 are set to the largest print resolution value (highest print quality) in the range of the set values which are supported (which can be set) in each printer. For example, the printer of Printer No. 1 can print at the largest print resolution "600×600" and its value is set.

In the setting of the check interval for monitoring the change of the set item of the server, the minimum value in the range of the set values which are supported by each printer is selected. For example, in the case of the printer of Printer No. 1, the shortest monitoring interval is equal to 2 seconds and this value is set in the setting process.

The operation of the per-pattern processing unit 20 serving as a target of the embodiment at the time when "Maximum Value" among those values is selected will be described.

Figure 22:
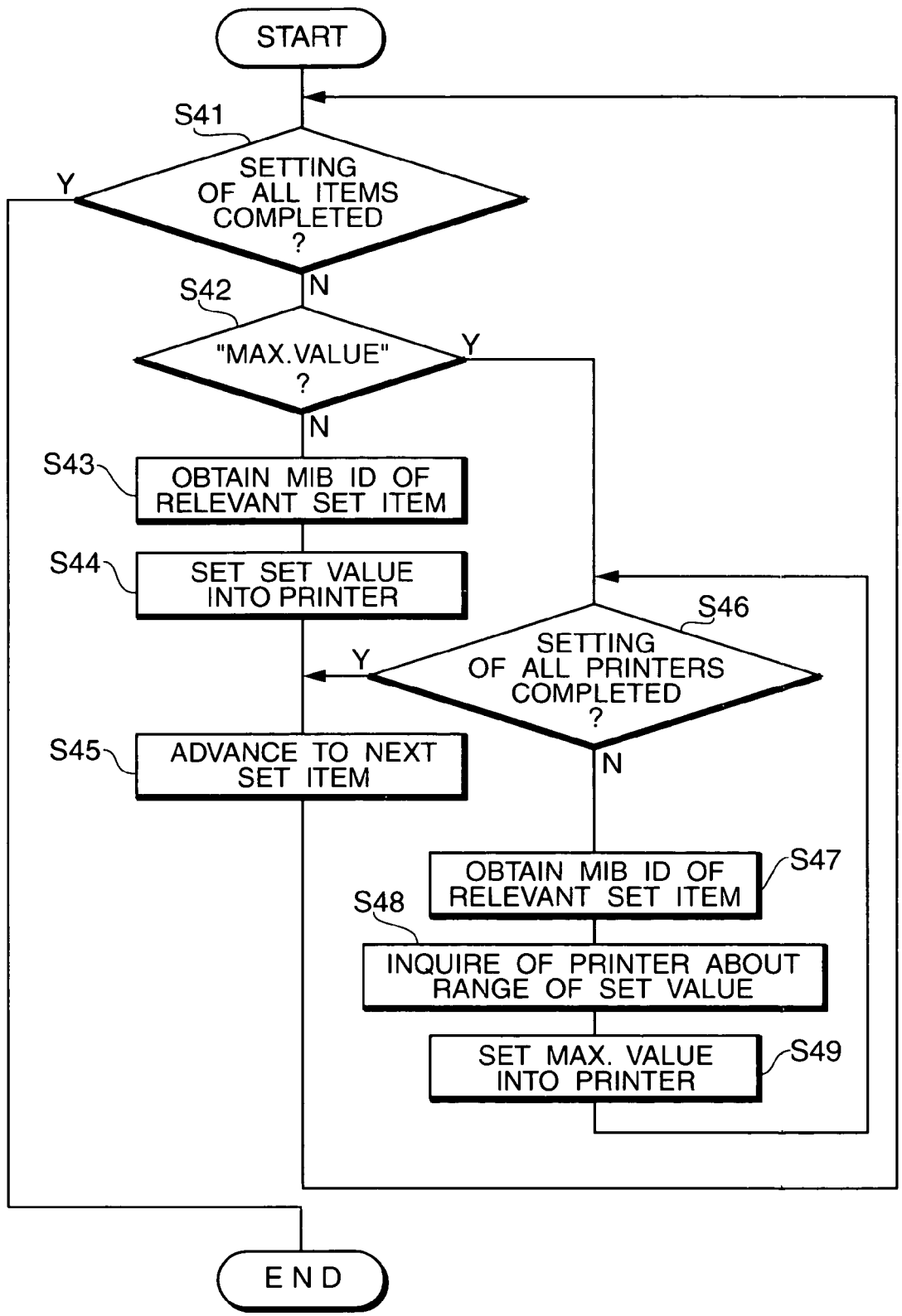
FIG. 22 is a flowchart showing the operation of a network utility in the fourth embodiment of the invention.

FIG. 22 is a flowchart showing the operation of a network utility in the fourth embodiment of the invention.

In this case, when the per-pattern processing unit 20 receives the change requests for changing the set values of the set items from the set value writing unit 13 and the per-set-item processing unit 15, the unit 20 confirms whether the setting of all items has been completed or not. If the setting of all items has been completed, the processing routine is finished.

Subsequently, whether the setting of the pattern has been designated or not is discriminated. In the embodiment, "No Type (no pattern designation)" and "Maximum Value (the maximum value in the selectable range)" become the selection elements. If the pattern designation is "No Type", with respect to the set item whose change request has been designated, the corresponding MIB value (MIB ID) is obtained from the process of the set item—MIB corresponding unit 16.

Subsequently, the set value of the change request and the relevant MIB value are used as arguments and the SNMP communicating unit 17 is requested to change the set value of the set item. Thus, the set value is set into the printer.

The process advances to the next item whose change has been requested as a set item and whether the setting of all items has been completed or not is discriminated.

If the pattern designation is "Maximum Value", first, whether the pattern processes of all of the printers have been finished or not is discriminated. If the pattern processes of all of the printers have been finished, the process advances to the next item whose change has been requested as a set item.

If the pattern processes of all of the printers are not finished, with respect to the set item whose change request has been designated, the corresponding MIB value is obtained from the process of the set item—MIB corresponding unit 16.

Subsequently, the operation corresponding to the pattern "Maximum Value" is read out from the pattern information 19. The printer is inquired about a range of a value that is available as a set value of the relevant item. The maximum set value answered from the printer and the relevant MIB value are used as arguments and the SNMP communicating unit 17 is requested to change the set value of the set item. Thus, the maximum value is set into the printer.

When the set values of each printer are changed, whether the pattern processes of all of the printers have been finished or not is discriminated.

One printer whose setting is made is not always limited to the top printer on the list but on the basis of the setting of the selected one of the seven printers shown in FIG. 9, "Maximum Value" can be also set into the other printers.

Explanation will now be made with reference to the flowchart of FIG. 22.

Step S41: Whether the setting of all items has been completed or not is discriminated. If it has been completed, the processing routine is finished. If it is not completed, step S42 follows.

Step S42: Whether the pattern designation is "Maximum Value" or not is discriminated. If it is "Maximum Value", step S46 follows. If it is "No Type", step S43 follows.

Step S43: The MIB ID of the relevant set item is obtained.

Step S44: The set value is set into the printer.

Step S45: The processing routine advances to the next set item and is returned to step S41.

Step S46: Whether the setting of all of the printers has been completed or not is discriminated. If it has been completed, step S45 follows. If it is not completed, step S47 follows.

Step S47: The MIB ID of the relevant set item is obtained.

Step S48: The printer is inquired about the range of the set value.

Step S49: The maximum value is set into the printer and the processing routine is returned to step S46.

As mentioned above, in the embodiment, in the case of changing the settings of the nodes connected to the network, when the set value in each node has the range, by executing the setting process of almost one printer as a node, the setting of all of the printers in which the user wants to change the settings can be made. Therefore, the operation time that is required for the setting change can be shortened and the operation mistakes in the setting change can be prevented.

Even if the available ranges or values of the set values are different every node, the setting time can be shortened and the operation mistakes can be prevented.

The fifth embodiment of the invention will now be described. Component elements having the same structure as those in the first embodiment are designated by the same reference numerals and their description is omitted.

In the fifth embodiment, with respect to the set item in which a default set value is set for a plurality of nodes connected to the network, by setting it for one node, the setting can be made for the other nodes. Although the conventional printer has a function for setting all of the settings to defaults, it does not have a function for returning each setting to the default. However, the setting change to the default is a function which is indispensable for separation at the time of occurrence of a fault.

Figure 23:
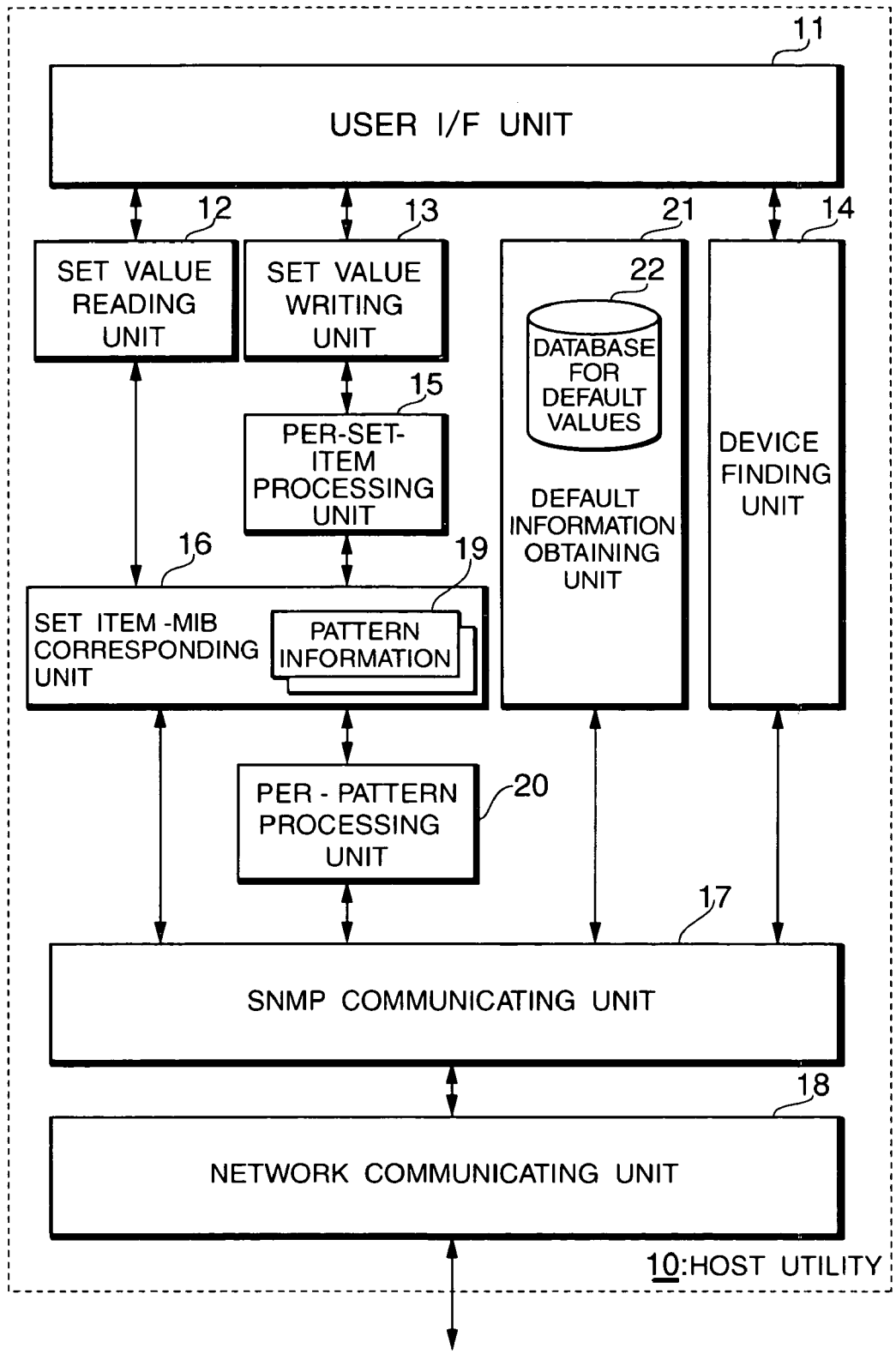
FIG. 23 is a diagram showing a construction of a network utility in the fifth embodiment of the invention.

FIG. 23 is a diagram showing a construction of a network utility in the fifth embodiment of the invention.

In this case, as shown in FIG. 23, the host utility 10 serving as a network utility has: a default information obtaining unit 21 having a function for obtaining a default value of each printer; and a database 22 for default values for storing the default values.

The operation of the network utility with the above construction will now be described.

In this case, the default value denotes a set value given as an initial value in each set item by a manufacturing company of the nodes connected to each network. The default value denotes the set value which is most recommended by the manufacturing company of the nodes connected to each network and can be also regarded as a set value whose operation evaluation has been most exhaustive. Therefore, in the case of separating the fault portion of an inconvenience occurring on the user destination, the operation to return the set value to the default value is certainly necessary.

However, although the conventional printer as a node has the function for setting all of the settings to the default values, it does not have the function for returning each setting to the default value. If all of the settings are returned to the default values, the minimum necessary address in communication, the setting of the server, and the like are also returned to the initial state. Naturally, if those information is returned to the initial state, the apparatus can never operate, so that the fault cannot be separated. To separate the fault, all of the settings have to be returned to the default values once and all of the minimum necessary settings in which the apparatus operates have to be made again.

In the embodiment, the set item in which the value set as a default by the manufacturing company of the nodes connected to each network can be set into the nodes connected to each network is defined as a pattern "Default" and the setting can be returned to the default setting every set item.

A procedure for setting the set items mentioned above will now be described. The embodiment will be described on the assumption that the nodes connected to the network are the printers.

FIG. 24 is a diagram showing a dialog box for setting protocols in the fifth embodiment of the invention.

In this case, a setting display screen of the print resolution of each printer and a setting display screen of the check interval at which the setting change or the like of the server side is monitored will be explained as an example.

First, each setting is made by the dialog box as shown in FIG. 24. At this time, the edit box or combo box is provided every setting. A value "300×300", "600×600", or "600×1200" can be selected as print resolution. When the default value is selected from them and set into all of the printers, the top printer among the printers shown in FIG. 9 is selected and the dialog box shown in FIG. 24 are displayed. The dialog box shown in FIG. 24 are displayed. Hitherto, it has been necessary for the user to input the default value into the edit box. However, in many cases, the user ordinarily forgets the default value and in order to examine the default value, he has to examine a predetermined portion of a thick instruction manual of the printer. In the embodiment, the user doesn't need to input the default value. The fifth embodiment differs from the conventional setting method in terms of such a point.

Subsequently, in the embodiment, one corresponding combo box is provided for each set value and "No Type", "Default", and the like exist as selection elements. In the embodiment, since the default values set by the manufacturing company of the printer are set for the set items corresponding to all of the printers, "Default" is selected as a selection element. After that, the "decide (the set values are transmitted to the printer) button" provided for each set page/dialog box is clicked. In FIG. 24, the "decide button" is omitted.

By selecting the setting method of one printer and setting the pattern as mentioned above, the setting of all of the printers shown in FIG. 9 can be made.

The operation of the system serving as a target of the invention at the time when the operation is executed will now be described.

Figure 25:
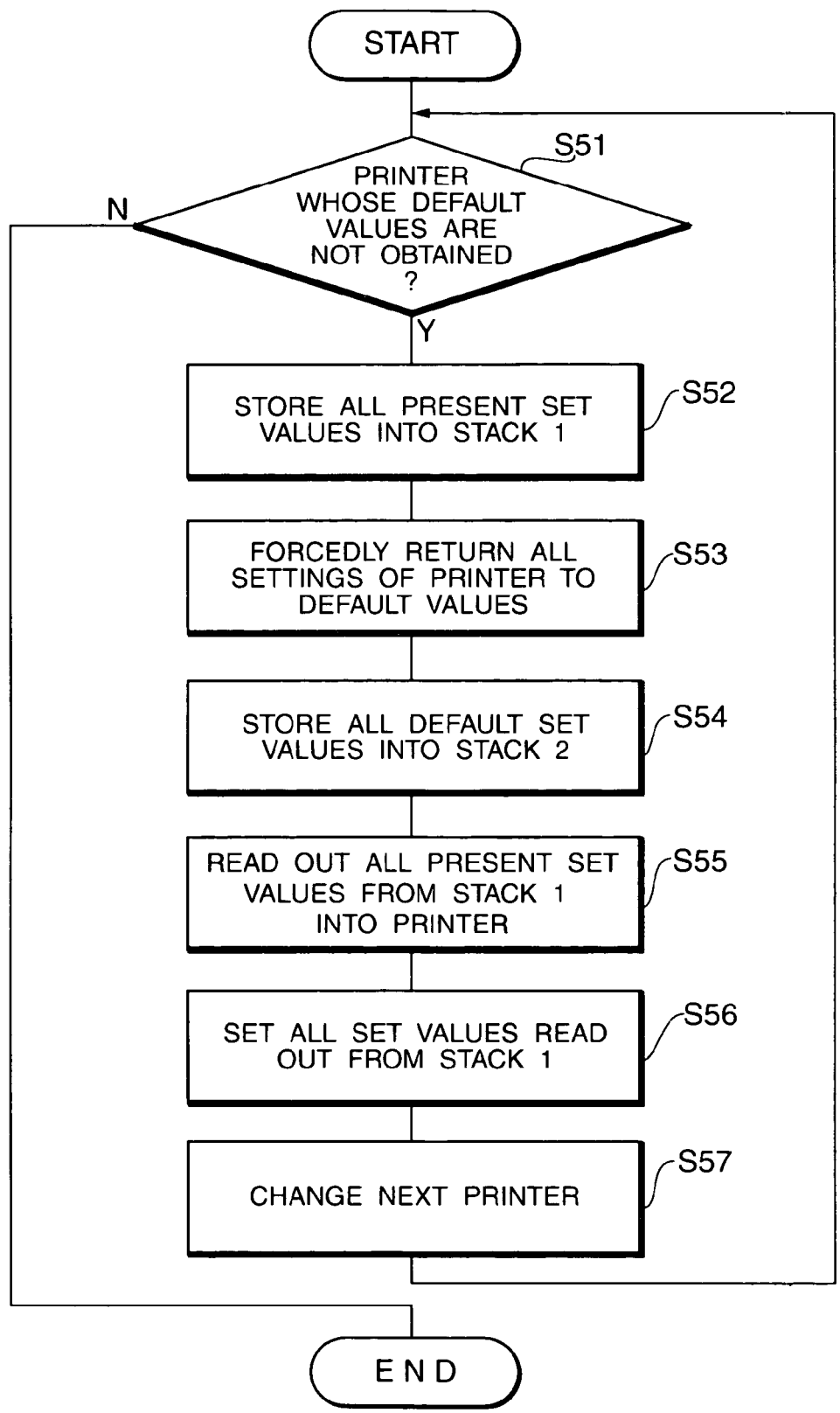
FIG. 25 is a flowchart showing the operation of a default information obtaining unit in the fifth embodiment of the invention.

FIG. 25 is a flowchart showing the operation of the default information obtaining unit in the fifth embodiment of the invention.

In this case, the operation of the default information obtaining unit 21 will be mainly explained. The default information obtaining unit 21 starts the operation at a predetermined period when the network utility is activated or after the network utility was activated.

First, the list of the printers shown in FIG. 9 as a main page of the host utility 10 as a network utility is searched from the top and whether the default values of the printer have been obtained or not is searched from the database 22 for the default values. That is, whether the printer (apparatus) whose default values are not obtained exists or not is discriminated. If the printer whose default values are not obtained does not exist, the processing routine is finished.

If the printer whose default values are not obtained exists, the network utility temporarily obtains a memory (stack 1), reads out all of the set values set in the present printer, and stores them into the stack 1.

The function for setting all of the settings corresponding to the functions which the printer ordinarily holds to the default values is activated. All of the settings of the relevant printer are forcedly returned to the default values and set.

The address before the set values are shifted to the defaults is allocated to the printer by using the minimum communicating means and all of the default values set in the printer are read out from the printer. The read-out default values of the relevant printer, that is, all of the set values of defaults are stored in the default value database 22 (stack 2).

Subsequently, all of the present set values are read out from the memory (stack 1) which has temporarily been obtained. All of the set values read out from the stack 1 are set into the relevant printer. By the above process, all of the set values of the relevant printer are returned to the state before they are set to the default values.

Subsequently, the next printer (apparatus) on the list of the printers shown in FIG. 9 as a main page of the network utility is confirmed and whether the default values of this printer have been obtained or not is searched from the default value database 22.

By such a process, the default values of all of the printers can be held in the network utility.

Explanation will now be made with reference to the flowchart of FIG. 25.

Step S51: Whether the printer whose default values are not obtained exists or not is discriminated. If the printer whose default values are not obtained does not exist, the processing routine is finished. If the printer whose default values are not obtained exists, step S52 follows.

Step S52: All of the present set values are held in the stack 1.

Step S53: All of the settings of the printer are forcedly returned to the default values.

Step S54: All of the set values of defaults are held in the stack 2.

Step S55: All of the present set values are read out from the stack 1.

Step S56: All of the set values read out from the stack 1 are set into the printer.

Step S57: The next printer is confirmed and the processing routine is returned to step S51.

Subsequently, the operation of the network utility in the case of changing the set values to the default values by using the foregoing default values will be described. In this case, the operation of the per-pattern processing unit 20 will be mainly explained.

Figure 26:
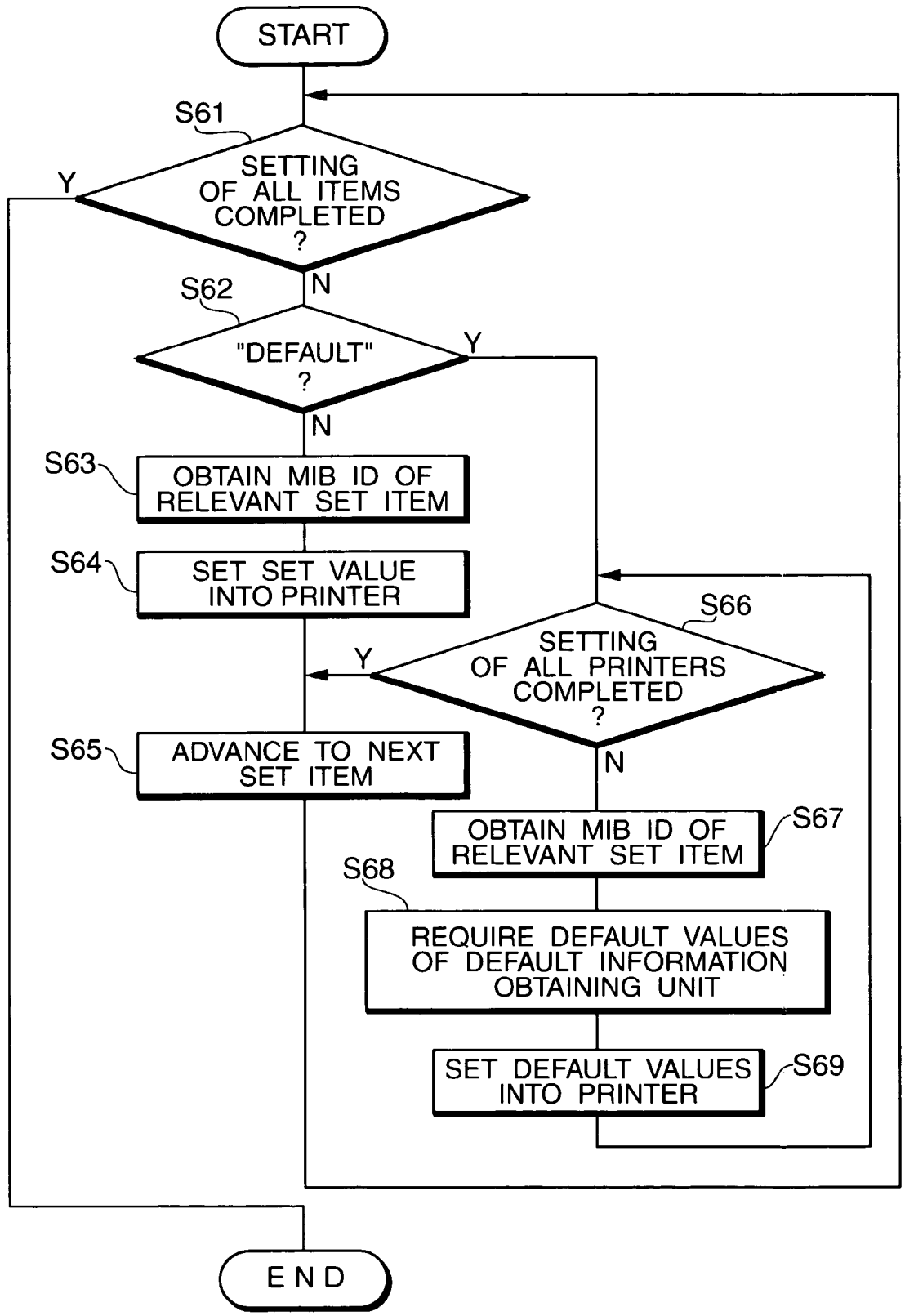
FIG. 26 is a flowchart showing the operation of a network utility in the fifth embodiment of the invention.

FIG. 26 is a flowchart showing the operation of the network utility in the fifth embodiment of the invention.

In this case, when the per-pattern processing unit 20 receives the change requests for changing the set values of the set items from the set value writing unit 13 and the per-set-item processing unit 15, the unit 20 confirms whether the setting of all items has been completed or not. If the setting of all items has been completed, the processing routine is finished.

Subsequently, whether the setting of the pattern has been designated or not is discriminated. In the embodiment, "No Type (no pattern designation)" and "Default" become selection elements. If the pattern designation is "No Type", with respect to the set item whose change request has been designated, the corresponding MIB value (MIB ID) is obtained from the process of the set item—MIB corresponding unit 16.

Subsequently, the set value of the change request and the relevant MIB value are used as arguments and the SNMP communicating unit 17 is requested to change the set value of the set item. Thus, the set value is set into the printer.

Subsequently, the process advances to the next item whose change has been requested as a set item and whether the setting of all items has been completed or not is discriminated.

If the pattern designation is "Default", first, whether the pattern processes of all printers have been finished or not is discriminated. That is, whether the setting of all of the printers has been completed or not is discriminated. If the pattern processes of all printers have been finished, the process advances to the next item whose change has been requested as a set item.

If the pattern processes of all printers are not finished, with respect to the set item whose change request has been designated, the corresponding MIB value is obtained from the process of the set item—MIB corresponding unit 16.

Subsequently, the operation corresponding to the pattern "Default" is read out from the pattern information 19. The default values as set values of the change request are requested from the default value database 22 of the default information obtaining unit 21.

Subsequently, the default values as set values obtained from the default information obtaining unit 21 and the relevant MIB value are used as arguments and the SNMP communicating unit 17 is requested to change the set value of the set item. When the default values are set into each printer, whether the pattern processes of all of the printers have been finished or not is discriminated.

One printer whose setting is made is not always limited to the top printer on the list but on the basis of the setting of the selected one of the seven printers shown in FIG. 9, "Default" can be also set into the other printers.

Explanation will now be made with reference to the flowchart of FIG. 26.

Step S61: Whether the setting of all items has been completed or not is discriminated. If it has been completed, the processing routine is finished. If it is not completed, step S62 follows.

Step S62: Whether the pattern designation is "Default" or not is discriminated. If it is "Default", step S66 follows. If it is "No Type", step S63 follows.

Step S63: The MIB ID of the relevant set item is obtained.

Step S64: The set value is set into the printer.

Step S65: The processing routine advances to the next set item and is returned to step S61.

Step S66: Whether the setting of all of the printers has been completed or not is discriminated. If it has been completed, step S65 follows. If it is not completed, step S67 follows.

Step S67: The MIB ID of the relevant set item is obtained.

Step S68: The default values are required from the default information obtaining unit 21.

Step S69: The default values are set into the printer and the processing routine is returned to step S66.

The structure of the default value database 22 will now be described.

Figure 27:
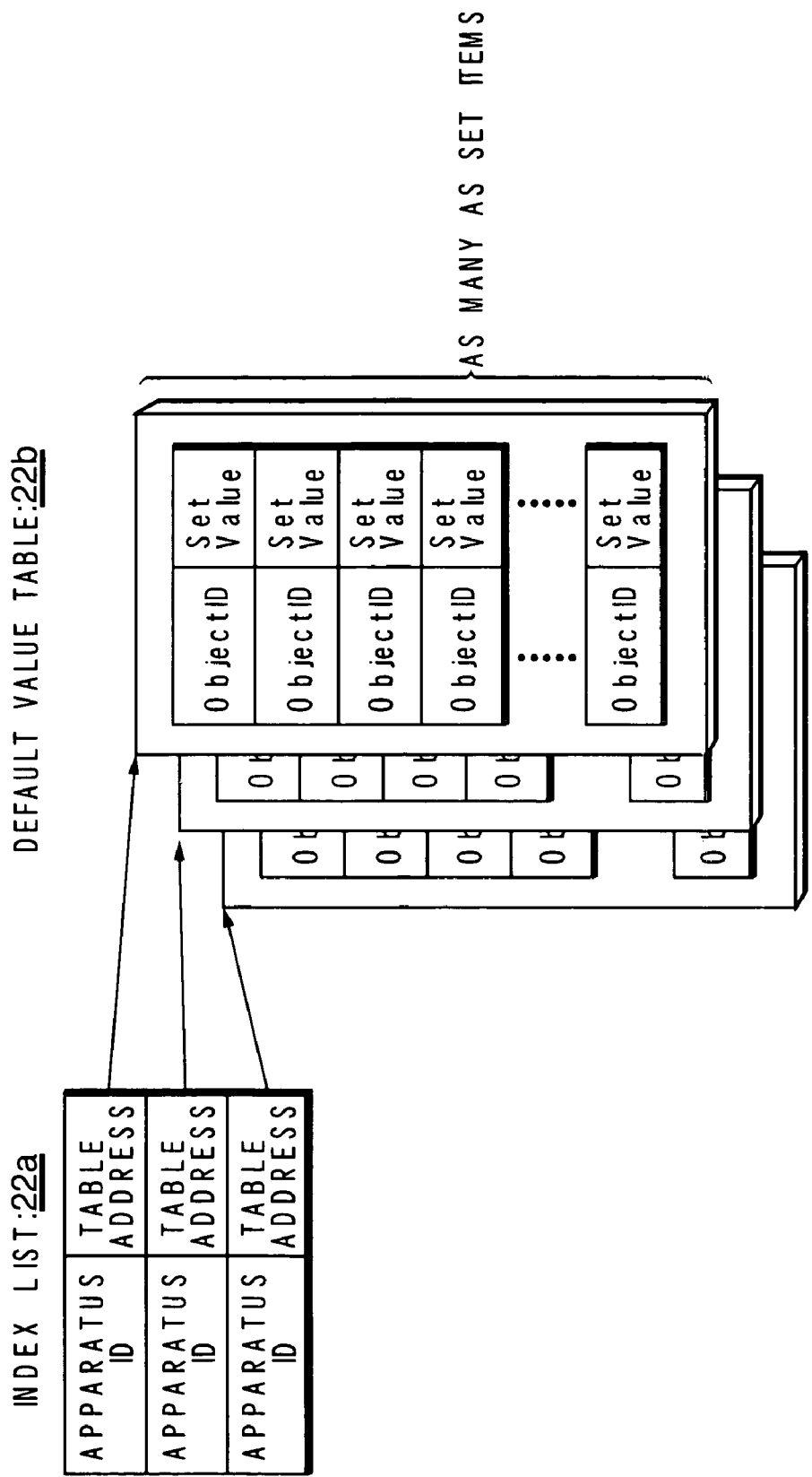
FIG. 27 is a diagram showing a structure of a default value database in the fifth embodiment of the invention.

FIG. 27 is a diagram showing the structure of the default value database in the fifth embodiment of the invention.

As shown in FIG. 27, the default value database 22 is constructed by an index list 22a and a default value table 22b.

In the index list 22a, one entry is formed every printer (each node connected to the network). One entry is constructed by an apparatus identifier and a table address. In many cases, as an apparatus identifier, an ID such as a serial number or the like of the apparatus is used and defined by the MIB or the like so that it uniquely indicates the apparatus main body and is not changed. Further, as a table address, an address to the default value table 22b is stored. One entry of the index list 22a is certainly linked to one default value table 22b by the table address.

The default value table 22b holds the default values of the nodes connected to each network. As for each set item of the default value table 22b, the default values and an Object ID have been stored as a pair. The Object ID is an MIB ID as an identifier which uniquely indicates the MIB corresponding to each set item. The Object ID and the set item are linked in a one-to-one correspondence relational manner.

By allowing the database 22 to have such a structure, when whether the default values of the nodes set onto the relevant network have been held or not is searched, there is no need to access the default value table 22b with a large information amount by using the index list 22a, so that an algorithm for the searching process can be easily formed.

In the embodiment as mentioned above, in the case where the default values individually set by the manufacturing company of the nodes connected to the network are set into the nodes connected to the network, if the set values of the nodes are the same, the setting of all of the printers in which the user wants to change the settings can be made by executing the setting process of almost one printer as a node. Therefore, the operation time which is required for the setting change can be shortened and the operation mistakes in the setting change can be prevented.

The sixth embodiment of the invention will now be described. Since component elements having the same structure as shown in the first embodiment are designated by the same reference numerals, their description is omitted here.

Since there are a variety of user environments, in most cases, the optimum set items exist every environment. In the sixth embodiment, once the user decides the optimum set items for a plurality of nodes connected to the network, when the set values as optimum values are set, the settings of each printer can be set to the optimum values obtained by the user by the one-touch operation. The optimum values obtained by the user can be also set every node. By setting them for one node, the setting of the other apparatuses can be made.

Figure 28:
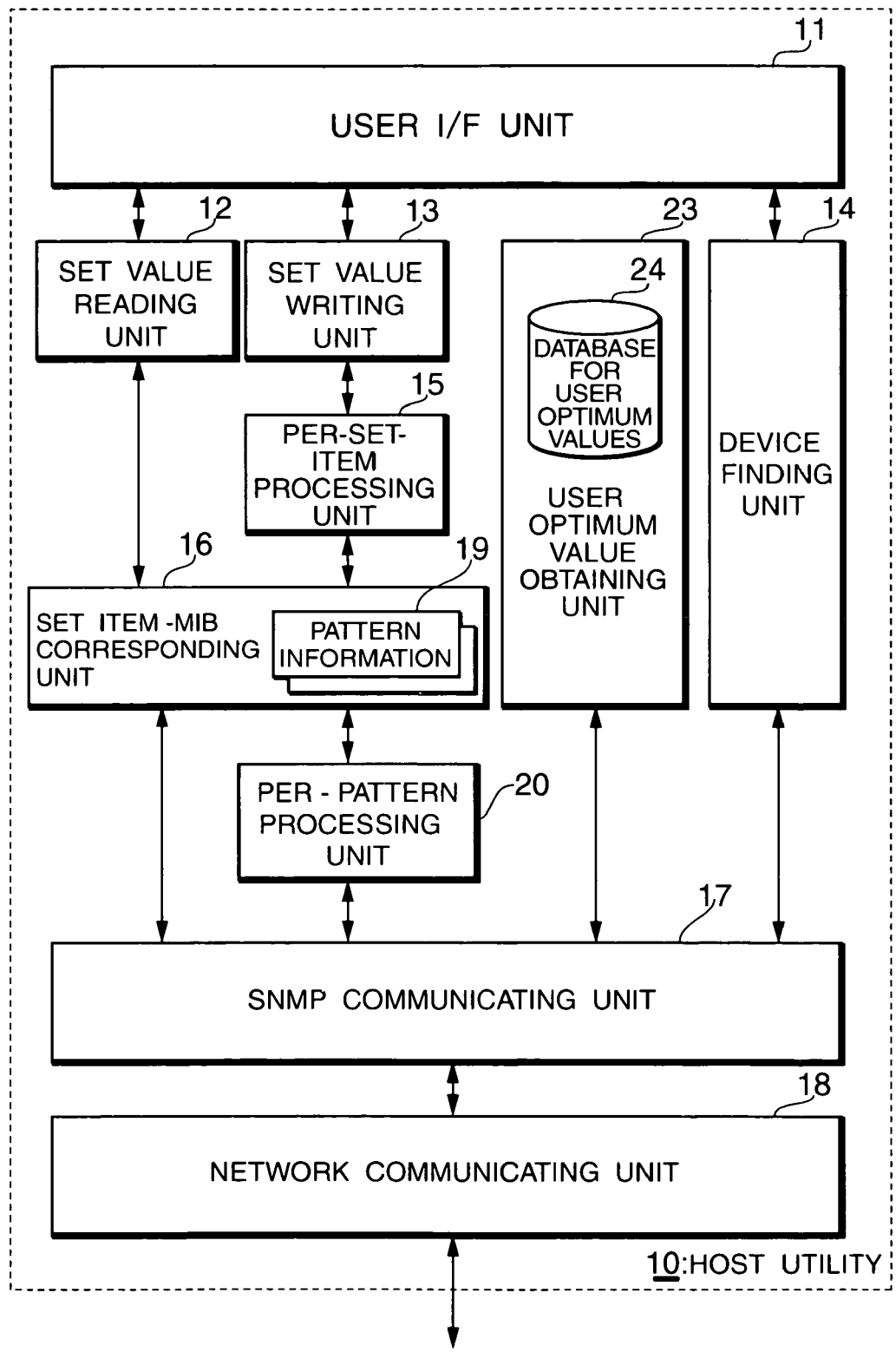
FIG. 28 is a diagram showing a construction of a network utility in the sixth embodiment of the invention.

FIG. 28 is a diagram showing a construction of a network utility in the sixth embodiment of the invention.

In this case, as shown in FIG. 28, the host utility 10 as a network utility has: a user optimum value obtaining unit 23 having a function for obtaining the optimum values of the user; and a database 24 for user optimum values for storing the set values of the user.

The operation of the network utility with the above construction will now be described.

In this case, in many cases, there are a variety of user environments in which the nodes connected to the network are used and their situations are changed. Each node connected to the network has a plurality of operation patterns in dependence of a menu so that it can cope with many user environments. Therefore, usually, the optimum set values are different every user environment which is used. If the types of nodes connected to the network differ, the optimum set values in each user environment as mentioned above also differ in accordance with it. In the case of using the nodes connected to a plurality of networks in the user environment, the administrator of the environment has to memorize the set values in which each apparatus operates most efficiently.

In the embodiment, the values set by the user into the nodes connected to each network are stored as "User Settings" and the same setting can be always made to the nodes connected to the same network.

A procedure for setting the set items mentioned above will now be described. The embodiment will be described on the assumption that the nodes connected to the network are the printers.

Figure 29:
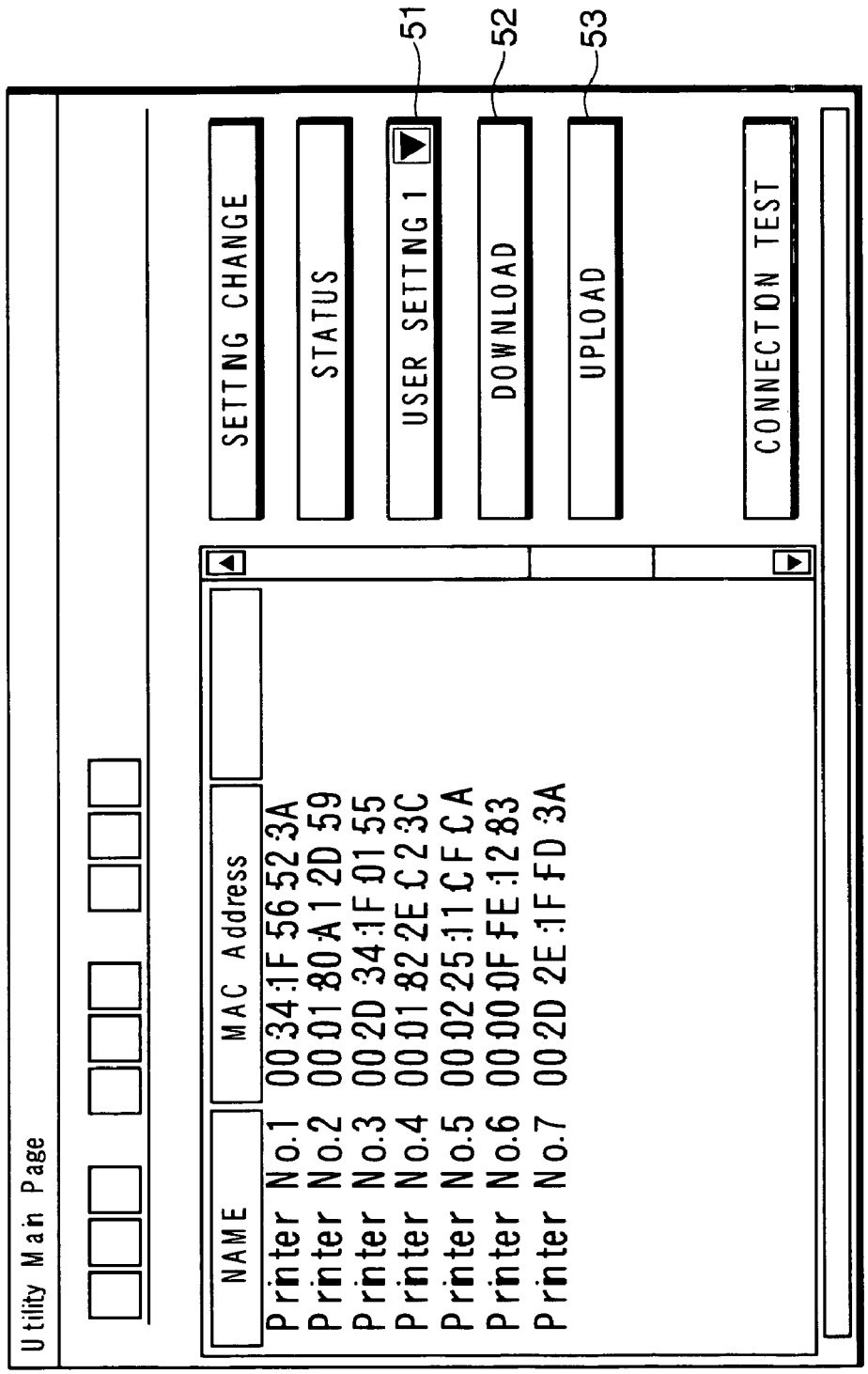
FIG. 29 is a diagram showing a main page of the network utility in the sixth embodiment of the invention.

FIG. 29 is a diagram showing a main page of the network utility in the sixth embodiment of the invention.

In FIG. 29, the main page of the network utility is shown, it is a display screen which is first displayed when the network utility is activated, and a list of the printers which can be found on the network is displayed.

The operation for storing the user settings on the assumption that Printer No. 3 can be set to the optimum state will be described here.

First, as shown in FIG. 29, when user clicks the indication of Printer No. 3 by the mouse, it is highlighted to thereby showing that the printer of Printer No. 3 has been selected. The number of the user setting in which the set values are stored is determined here by using a combo box 51. In the embodiment, "User Setting 1" is selected.

By clicking a button 53 by the mouse, the set contents of Printer No. 3 are stored into the area of "User Setting 1" in the user optimum value database 24.

The operation for setting the user settings will now be described.

In this case, it is assumed that Printer No. 3 is not set to the optimum set values.

First, the printer in which the user wants to set is selected from the list. In the embodiment, Printer No. 3 is selected.

Subsequently, which one of the stored user settings is applied is selected by using the combo box 51. In the embodiment, "User Setting 1" is selected.

By clicking the button 53 by the mouse, all of the set data stored in the area of "User Setting 1" in the user optimum value database 24 in the network utility is set into Printer No. 3.

The operation of the network utility at the time when the operation is executed will now be described. In this case, the operation of the user optimum value obtaining unit 23 will be mainly explained.

First, the storing process of the user setting will be described.

Figure 30:
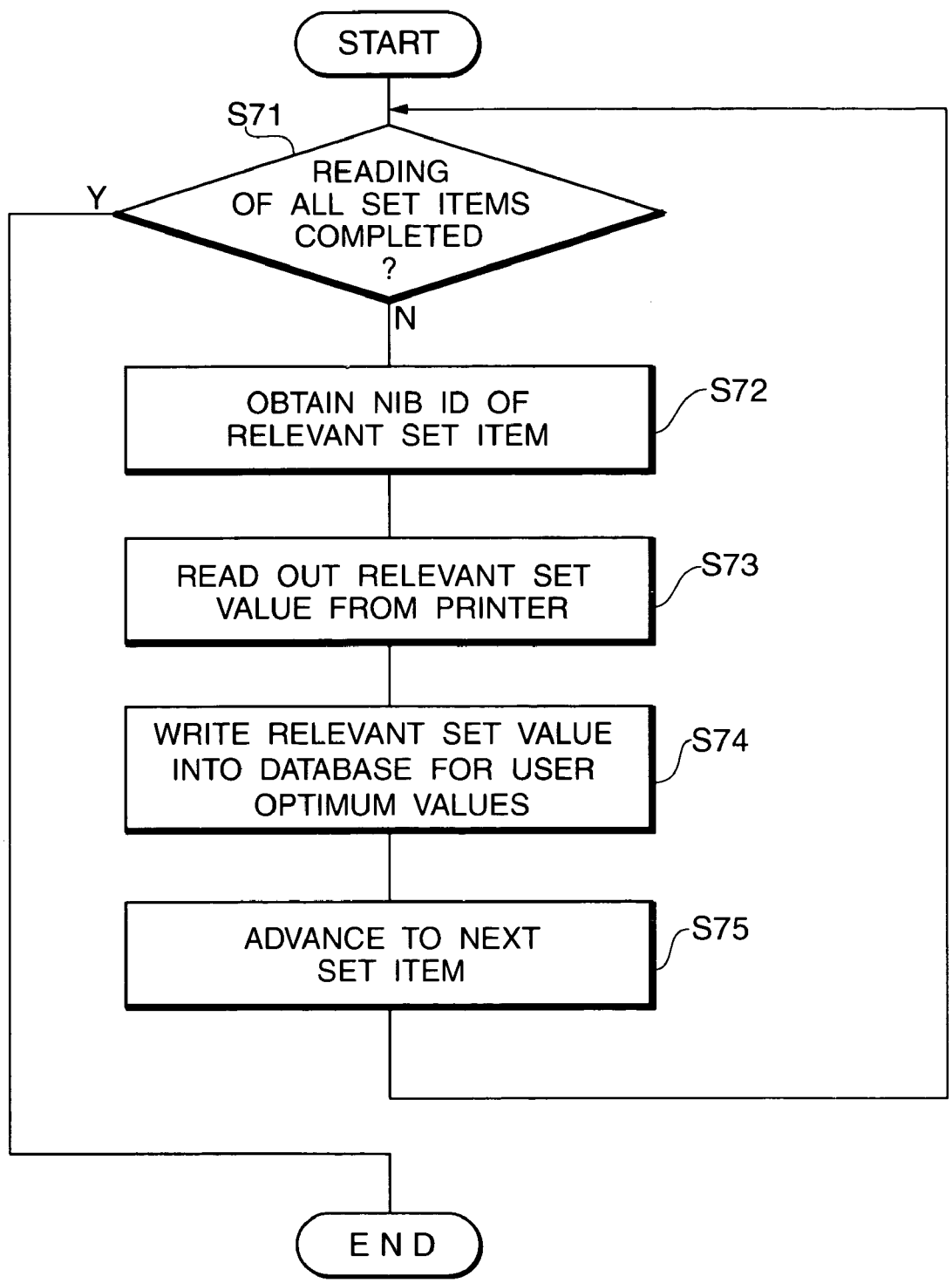
FIG. 30 is a flowchart showing the operation of a storing process of user settings in the sixth embodiment of the invention.

FIG. 30 is a flowchart showing the operation of the storing process of user settings in the sixth embodiment of the invention.

First, whether the reading of all of the set items from the printer has been completed or not is discriminated. If it has been completed, the processing routine is finished. If it is not completed, the MIB ID of the set item which is next read out from the printer is requested to the set item—MIB corresponding unit 16 and obtained therefrom.

Subsequently, the relevant set item is read out from the printer by using the obtained MIB ID. The read-out set value and the MIB ID are stored into the user optimum value database 24. The process advances to the next set item and whether the reading of all of the set items from the printer has been completed or not is discriminated.

Explanation will now be made with reference to the flowchart of FIG. 30.

Step S71: Whether the reading of all of the set items has been completed or not is discriminated. If the reading of all of the set items has been completed, the processing routine is finished. If the reading of all of the set items is not completed, step S72 follows.

Step S72: The MIB ID of the relevant set item is obtained.

Step S73: The relevant set value is read out from the printer.

Step S74: The relevant set value is written into the user optimum value database 24.

Step S75: The processing routine advances to the next set item and is returned to step S71.

The setting process of the user settings will now be described.

Figure 31:
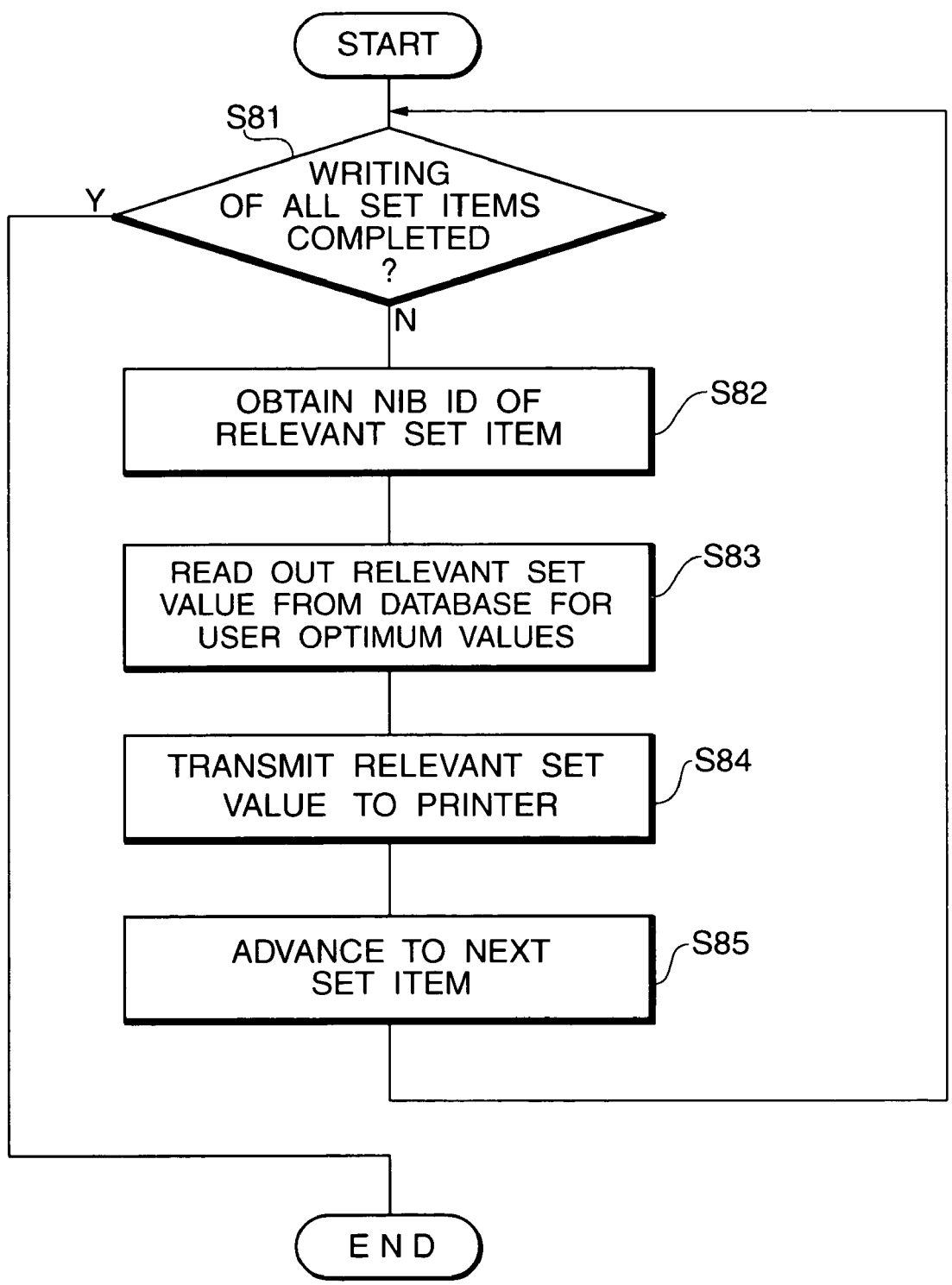
FIG. 31 is a flowchart showing the operation of a setting process of the user settings in the sixth embodiment of the invention.

FIG. 31 is a flowchart showing the operation of the setting process of the user settings in the sixth embodiment of the invention.

First, whether the writing of all of the set items has been completed for the printer or not is discriminated. If the writing of all of the set items has been completed for the printer, the processing routine is finished. If the writing of all of the set items is not completed yet for the printer, the MIB ID of the set item to be set into the printer is requested to the set item MIB corresponding unit 16 and obtained therefrom.

Subsequently, the set value is searched and read out from the user optimum value database 24 by using the obtained MIB ID as a search key. The obtained set value is transmitted to the printer and set therein. The process advances to the next set item and whether the writing of all of the set items has been completed for the printer or not is discriminated.

Explanation will now be made with reference to the flowchart of FIG. 31.

Step S81: Whether the writing of all of the set items has been completed or not is discriminated. If the writing of all of the set items has been completed, the processing routine is finished. If the writing of all of the set items is not completed, step S82 follows.

Step S82: The MIB ID of the relevant set item is obtained.

Step S83: The relevant set value is read out from the user optimum value database 24.

Step S84: The relevant set value is transmitted to the printer.

Step S85: The processing routine advances to the next set item and is returned to step S81.

A structure of the user optimum value database 24 will now be described.

FIG. 32 is a diagram showing the construction of the user optimum value database in the sixth embodiment of the invention.

As shown in FIG. 32, the user optimum value database 24 is constructed by a plurality of tables in which all of the settings of one apparatus are constructed as a table of one set. Each table is constructed by the Object IDs and the set values selected by the user. The Object ID is the MIB ID as an identifier which uniquely indicates the MIB corresponding to each set item. The Object ID and the set item are linked in a one-to-one correspondence relational manner.

The operation for setting the set items stored in the user optimum value database 24 every set item will now be described.

FIG. 33 is a diagram showing a dialog box for setting protocols in the sixth embodiment of the invention.

A setting display screen of the print resolution of each printer and a setting display screen of the check interval for monitoring the setting change or the like on the server side will be explained as an example.

First, each setting is made by the dialog box as shown in FIG. 33. At this time, the edit box or combo box is provided every setting and a value "300×300", "600×600", or "600× 1200" can be selected as print resolution. In the case where the set values stored as "User Setting 1" among them are selected and set into all of the printers, the top printer among the printers shown in FIG. 9 is selected and the dialog box shown in FIG. 33 are displayed. Hitherto, although it has been necessary for the user to remember the values set in the edit box at the previous time and input them. However, in many cases, the user ordinarily forgets the accurate values. To keep all of the set values, the user has to execute the work of a lot of patience. In the embodiment, however, there is no need to input the values which have been set by the user at the previous time. The embodiment differs from the conventional setting method in terms of this point.

Subsequently, in the embodiment, one corresponding combo box is provided for each set value. "No Type", "User Setting 1", "User Setting 2", and the like exist as selection elements. In the embodiment, since the user wants to set the set values obtained as optimum values at the previous time with respect to the set items corresponding to all of the printers, "User Setting 1" or "User Setting 2" is selected as a selection element. After that, the "decide (the set values are transmitted to the printer) button" provided for each set page/ dialog box is clicked. In FIG. 33, the "decide button" is omitted.

By selecting the setting method of one printer mentioned above and setting the pattern, the setting of all of the printers shown in FIG. 9 can be made. Since the values which are specifically set by the foregoing operation are set into the printer once at the previous time and the operation is efficiently executed, such a setting becomes the value stored as "User Setting 1".

The operation of the network utility in the embodiment will now be described.

Figure 34:
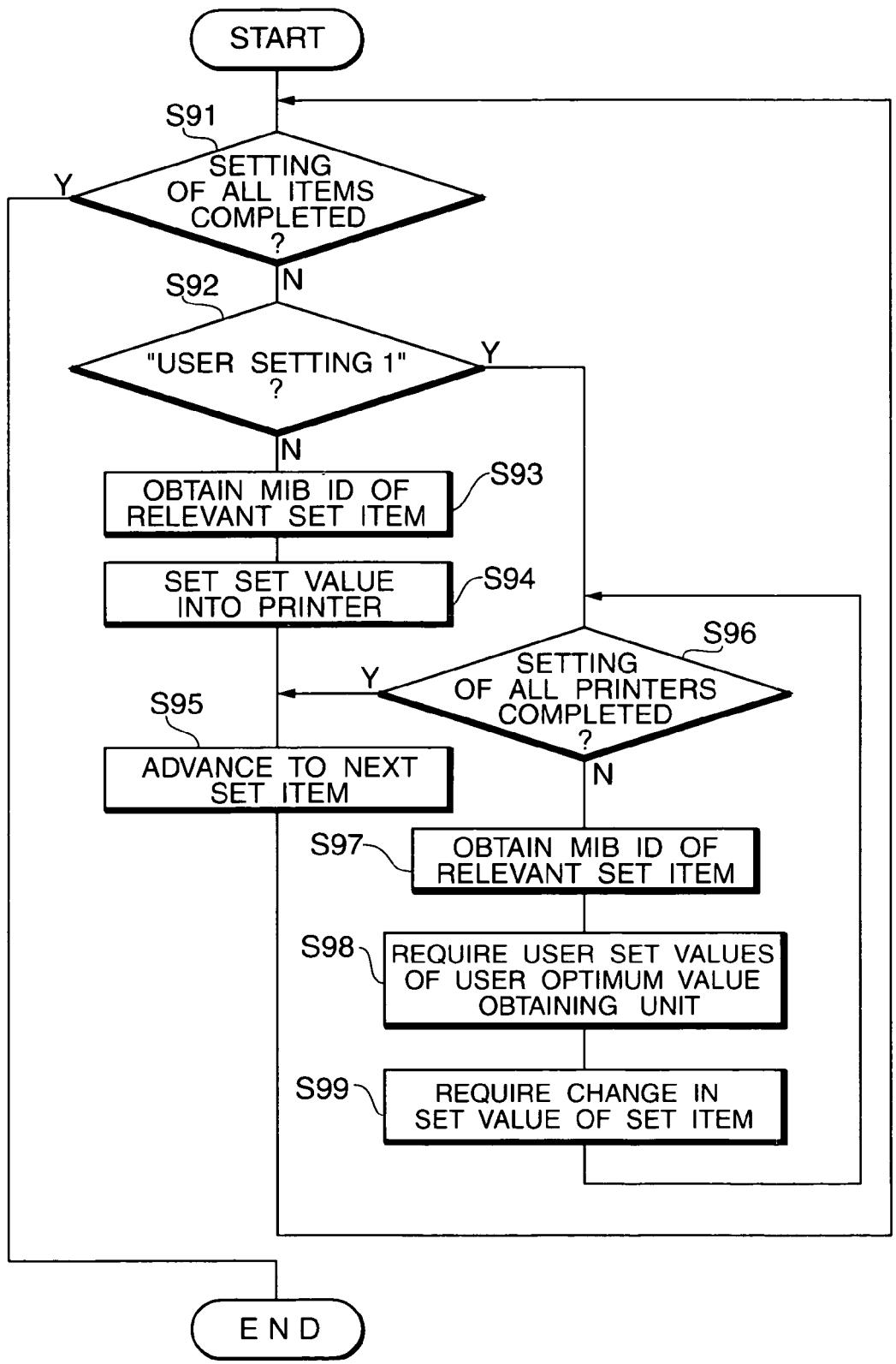
FIG. 34 is a flowchart showing the operation of a network utility in the sixth embodiment of the invention.

FIG. 34 is a flowchart showing the operation of the network utility in the sixth embodiment of the invention.

In this case, the operation of the per-pattern processing unit 20 will be mainly explained with respect to the operation of the network utility in the case of changing each item to a default value.

First, when the per-pattern processing unit 20 receives the change requests for changing the set values of the set items from the set value writing unit 13 and the per-set-item processing unit 15, the unit 20 confirms whether the setting of all items has been completed or not. If the setting of all items has been completed, the processing routine is finished.

Subsequently, whether the setting of the pattern has been designated or not is discriminated. In the embodiment, "No Type (no pattern designation)" and "User Setting 1" become selection elements. The number of items which can be stored as user settings is not limited to one but "User Setting 2", "User Setting 3", and "User Setting 4" also exist. However, since the operation is explained, it is assumed that only "User Setting 1" is mentioned.

If the pattern setting is "No Type", with respect to the set item whose change request has been designated, the corresponding MIB value (MIB ID) is obtained from the process of the set item—MIB corresponding unit 16.

Subsequently, the set value of the change request and the relevant MIB value are used as arguments and the SNMP communicating unit 17 is requested to change the set value of the set item. Thus, the set value is set into the printer.

Subsequently, the process advances to the next item whose change has been requested as a set item and whether the setting of all items has been completed or not is discriminated.

If the pattern setting is "User Setting 1", first, whether the pattern processes of all of the printers have been finished or not is discriminated. If the pattern processes of all of the printers have been finished, the process advances to the next item whose change has been requested as a set item.

If the pattern processes of all of the printers are not finished yet, with respect to the set item whose change request has been designated, the corresponding MIB value is obtained from the process of the set item—MIB corresponding unit 16.

Subsequently, the obtained MIB ID is used as an argument and the set value of the user is requested to the user optimum value obtaining unit 23. At this time, the user optimum value obtaining unit 23 searches the user optimum value database 24 by using the MIB ID as a search key.

The value obtained from the user optimum value obtaining unit 23 and the obtained relevant MIB value are used as arguments and the SNMP communicating unit 17 is requested to change the set value of the set item.

When the set values of each printer are changed, whether the pattern processes of all of the printers have been finished or not is discriminated.

One printer whose setting is made is not always limited to the top printer on the list but on the basis of the setting of the selected one of the seven printers shown in FIG. 9, "User Setting 1" can be also set into the other printers.

Explanation will now be made with reference to the flowchart of FIG. 34.

Step S91: Whether the setting of all items has been completed or not is discriminated. If it has been completed, the processing routine is finished. If it is not completed, step S92 follows.

Step S92: Whether the pattern designation is "User Setting 1" or not is discriminated. If it is "User Setting 1", step S96 follows. If it is "No Type", step S93 follows.

Step S93: The MIB ID of the relevant set item is obtained.

Step S94: The set value is set into the printer.

Step S95: The processing routine advances to the next set item and is returned to step S91.

Step S96: Whether the setting of all printers has been completed or not is discriminated. If it has been completed, step S95 follows. If it is not completed, step S97 follows.

Step S97: The MIB ID of the relevant set item is obtained.

Step S98: The set value is requested to the user optimum value obtaining unit 23.

Step S99: The change of the set value of the set item is requested and the processing routine is returned to step S96.

As mentioned above, in the embodiment, in the case where the setting suitable for the nodes connected to the network can be made, the setting can be stored into the network utility by the simple operation. Even in the case where the setting is temporarily changed, it can be returned to the previous setting by the simple operation. Either the mode in which the setting is returned or the mode in which the setting is not returned can be selected every item. Further, the setting of all of the printers in which the user wants to change the settings can be made by the setting process of almost one printer as a node. Therefore, the operation time which is required for the setting change can be shortened and the operation mistakes in the setting change can be prevented.

The seventh embodiment of the invention will now be described. Since a network utility in the 7th embodiment has substantially the same structure as that of the network utility in the first embodiment, it will be described also with reference to FIG. 1.

In the 7th embodiment, in the process for simultaneously making the setting for a plurality of nodes connected to the network, the user can select the specific nodes connected to the network instead of selecting all of the nodes, as targets, connected to the network found out by the network utility.

The operation of the network utility with the above construction will now be described. The embodiment will be described on the assumption that the nodes connected to the network are the printers.

Figure 35:
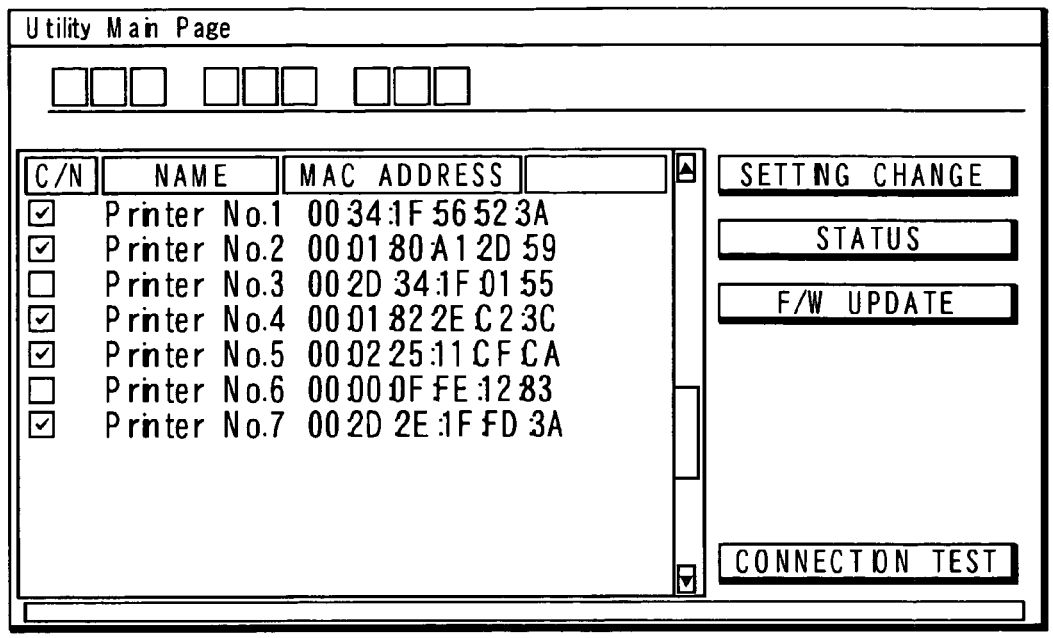
FIG. 35 is a first diagram showing a main page of a network utility in the seventh embodiment of the invention.
Figure 36:
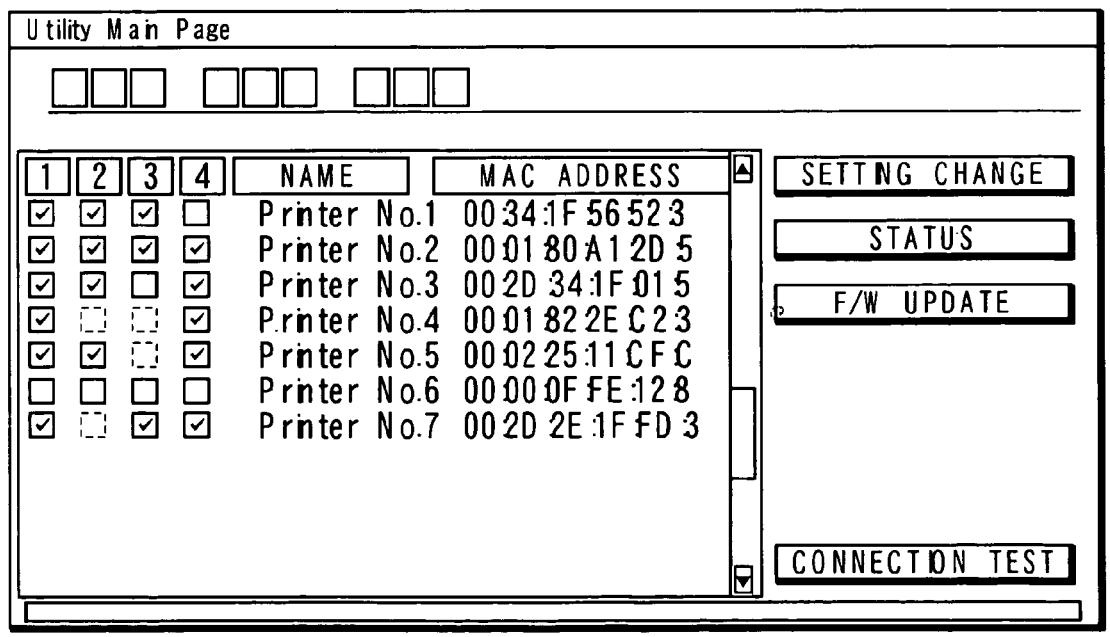
FIG. 36 is a second diagram showing a main page of the network utility in the seventh embodiment of the invention.

FIG. 35 is a first diagram showing a main page of the network utility in the 7th embodiment of the invention. FIG. 36 is a second diagram showing the main page of the network utility in the 7th embodiment of the invention.

In FIG. 35, Printer No. 1 to Printer No. 7 are found out and seven printers in total are displayed as a list. In this case, a check box is added to the left of the list shown in FIG. 9 of the network utility in correspondence to each row. Each check box corresponds to each printer. For example, if ten printers are displayed on the list, ten check boxes on the left column are also displayed in correspondence to those ten printers.

In the network utility having the function for simultaneously setting a plurality of nodes in the first to sixth embodiments, the nodes connected to the network serving as targets of such a function can be selected.

In FIG. 35, printer identification information such as Name, MAC Address, and the like for identifying the printers is displayed. Check boxes (C/N) for setting whether the printers are used as setting targets in correspondence to the printer identification information or not are provided.

Referring to the set information of FIG. 35, Printer No. 1, Printer No. 2, Printer No. 4, Printer No. 5, and Printer No. 7 whose check boxes have been marked are used as setting targets and Printer No. 3 and Printer No. 6 whose check boxes are not marked are excluded from the setting targets. Even if each pattern setting is made after the administrator executed the above operation, the setting change is not performed to Printer No. 3 and Printer No. 6.

The check box can be also provided in accordance with each of the setting patterns which the network utility has.

For example, as shown in FIG. 36, a case of displaying a setting display screen provided with the check box in accordance with each of the setting patterns will be described.

Reference numerals 1, 2, 3, and 4 denote the numbers corresponding to the Objects. For example, there are print resolution, an Error-Check interval, a Power Save shifting time, a network common set item, and the like.

The printer identification information such as Name, MAC Address, and the like for identifying the printers is displayed.

A plurality of check boxes are provided in correspondence to the number corresponding to each object and the printer identification information.

In the check box, the settable Object information of each printer is obtained prior to displaying, the item which can be set by the settable Object information of each printer is displayed by a square of a solid line, and the unsettable item of each printer is displayed in a display format different from that of the settable item, for example, by a square of a broken line.

That is, by providing the check box in accordance with each setting pattern which the network utility has, a number of more complicated settings can be made by one setting operation.

The operation of the network utility at the time when the operation is executed will now be described.

Figure 37:
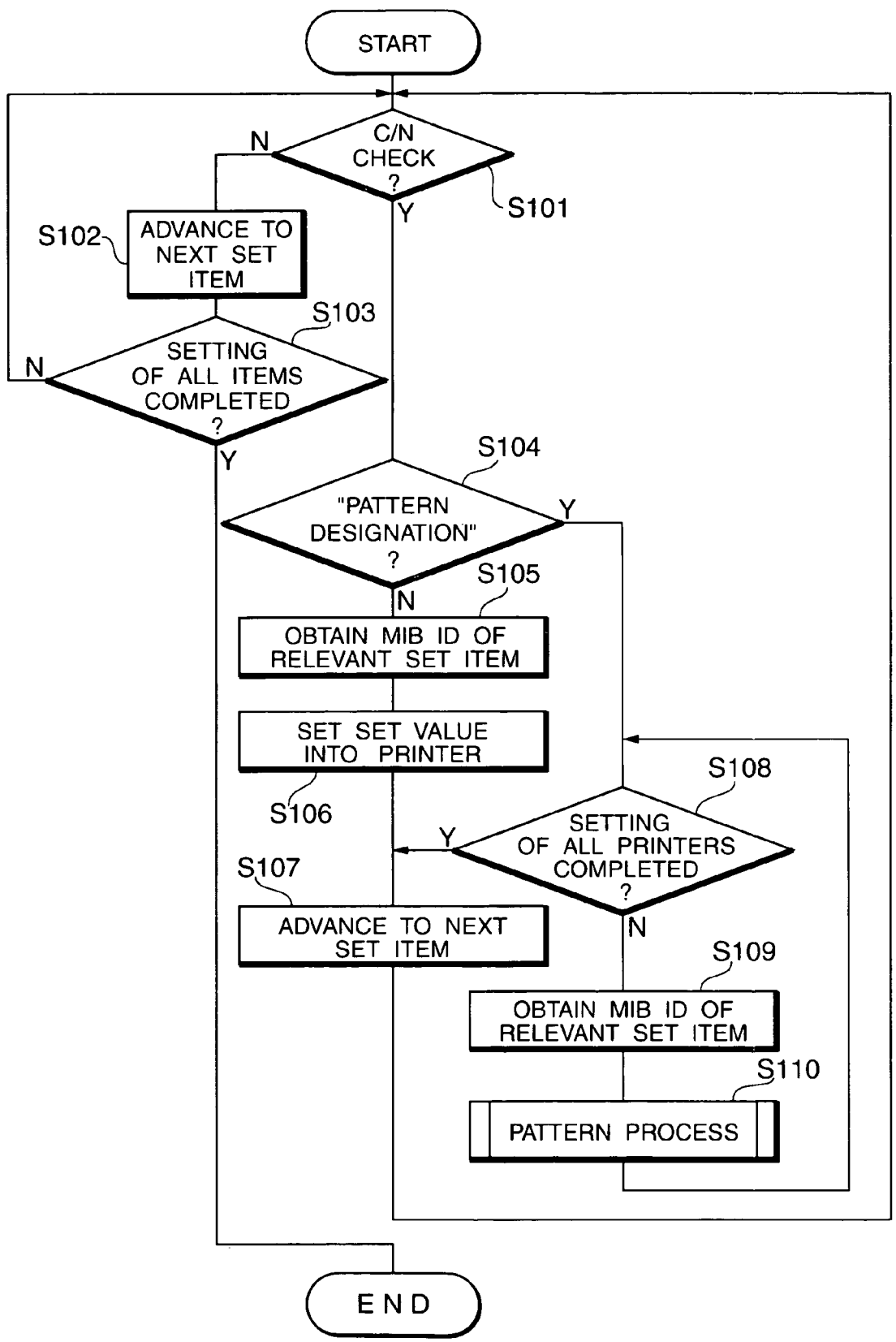
FIG. 37 is a flowchart showing the operation of the network utility in the seventh embodiment of the invention.

FIG. 37 is a flowchart showing the operation of the network utility in the 7th embodiment of the invention.

First, in a step of sequentially selecting the printers shown on the list onto the host utility 10 serving as a network utility, the presence or absence of a C/N check in the check box corresponding to the printer which is current at present is discriminated.

If the C/N check is not marked in the check box, since the relevant printer is out of the setting targets, the process advances to the next set item and the printer shown at the next lower position on the list is set to be current. If the residual printers are extinguished during the above operation, it is regarded that the setting of all items has been completed, so that the processing routine is finished. If the residual printers exist, the presence or absence of the C/N check in the check box corresponding to the printer which is current at present is discriminated.

If the check box is marked, the printer is a target of the setting change. Therefore, the presence or absence of the pattern setting is confirmed. If "No Type" showing that the pattern process is not executed is selected, it is regarded that there is no pattern designation, and the process corresponding to no pattern is executed. Since the contents of the process are almost similar to those in the first to sixth embodiments, its explanation is omitted. If the pattern has been set, it is regarded that the pattern has been designated, and the process according to the pattern is executed. Since the contents of the process are almost similar to those in the first to sixth embodiments, its explanation is omitted.

In the 7th embodiment, a function for setting the targets of a technique to simultaneously change the printers as a plurality of nodes connected to the network into a plurality of groups is provided.

Explanation will now be made with reference to the flowchart of FIG. 37.

Step S101: Whether the check box has been marked or not is discriminated. If the check box is not marked, step S102 follows. If the check box has been marked, step S104 follows.

Step S102: The process advances to the next set item.

Step S103: Whether the setting of all items has been completed or not is discriminated. If the setting of all items has been completed, the processing routine is finished. If the setting of all items is not completed, the processing routine is returned to step S101.

Step S104: Whether the pattern has been designated or not is discriminated. If the pattern has been designated, step S108 follows. If "No Type" is selected, step S105 follows.

Step S105: The MIB ID of the relevant set item is obtained.

Step S106: The set value is set into the printer.

Step S107: The processing routine advances to the next set item and is returned to step S101.

Step S108: Whether the setting of all printers has been completed or not is discriminated. If the setting of all printers has been completed, step S107 follows. If the setting of all printers is not completed, step S109 follows.

Step S109: The MIB ID of the relevant set item is obtained.

Step S110: The pattern process is executed and the processing routine is returned to step S108.

As mentioned above, in the embodiment, in the case of changing the settings of the nodes connected to the network and in the case where the apparatus has a function such that, when the set values for each node can be converted into a certain pattern, the setting of all of the printers serving as setting targets can be made by the setting operation of the printer as one node, by selecting the printer to be set instead of all of the printers displayed on the list and setting it, the setting change of only parts of a plurality of printers connected to the network can be performed.

Since the node which are connected to the network and to which the setting change is performed can be freely selected from the printers as nodes connected to the network shown on the list, as a function of the portion for listing the nodes, it is sufficient to use a function which merely displays all of the found nodes among the nodes connected to the network without filtering those nodes. Therefore, the function for finding the nodes connected to the network which are displayed on the list of the network utility can be simplified. Thus, the operation time that is required for the setting change can be shortened and the operation mistakes in the setting change can be prevented.

The eighth embodiment of the invention will now be described. Since a network utility in the 8th embodiment has substantially the same structure as that of the network utility in the first embodiment, it will be described also with reference to FIG. 1.

According to the 8th embodiment, in the process for simultaneously setting to a plurality of nodes connected to the network, the user can select the specific nodes connected to the network instead of all of the nodes, as targets, connected to the network which have been found out by the network utility.

The operation of the network utility with the above construction will now be described. The embodiment will be described on the assumption that the nodes connected to the network are the printers.

FIG. 38 is a diagram showing a main page of the network utility in the 8th embodiment of the invention.

In FIG. 38, Printer No. 1 to Printer No. 7 are found out and seven printers in total are displayed as a list. In this case, a check box and an edit box are added to the left of the list shown in FIG. 9 of the network utility in correspondence to each row. Each check box corresponds to each printer. For example, if ten printers are displayed on the list, ten check boxes on the left column are also displayed in correspondence to those ten printers.

The user can write arbitrary text characters into the edit box. For the nodes connected to the network, the network utility recognizes the written characters as a group name to which the nodes connected to the network belong. In the embodiment, the network utility uses a concept of this group when the setting change is performed.

The check box determines a reference of the nodes connected to the network which belong to each group. The pattern process in each group is executed by using the contents set in the reference nodes connected to the network as a reference. Only one of the check boxes can be selected in the group. If a plurality of check boxes are marked in an overlapping manner, one printer locating in an upper position on the list in the same group is enabled.

In FIG. 38, the user classifies the settings of the seven printers into two groups: a group of Printer No. 1 to Printer No. 3 and Printer No. 5; and a group of Printer No. 4, Printer No. 6, and Printer No. 7.

Subsequently, the user writes a character train A into the portions corresponding to Printer No. 1 to Printer No. 3 and Printer No. 5 of the edit boxes of the network utility. The user writes a character train B into the portions corresponding to Printer No. 4, Printer No. 6, and Printer No. 7 of the edit boxes.

By the above operation, the network utility recognizes Printer No. 1 to Printer No. 3 and Printer No. 5 as a group A and recognizes Printer No. 4, Printer No. 6, and Printer No. 7 as a group B. Further, since there are a plurality of groups, the user has to set one node connected to the network in which the reference is set in the case of simultaneously setting a plurality of nodes connected to the network into each group. In the embodiment, the check boxes of Printer No. 2 and Printer No. 7 are marked, Printer No. 2 is set to the reference of the group A, and Printer No. 7 is set to the reference of the group B.

If the function for simultaneously setting a plurality of nodes in the first to sixth embodiments is made operative in the setting state of the network utility mentioned above, the setting of the group A is made by using Printer No. 2 as a reference and the setting of the group B is made by using Printer No. 7 as a reference.

As mentioned above, in the network utility having the function for simultaneously setting the printers as a plurality of nodes in the first to sixth embodiments, the nodes connected to the network serving as targets of the above function can be selected as a plurality of groups.

The operation of the network utility at the time when the operation is executed will now be described.

Figure 39:
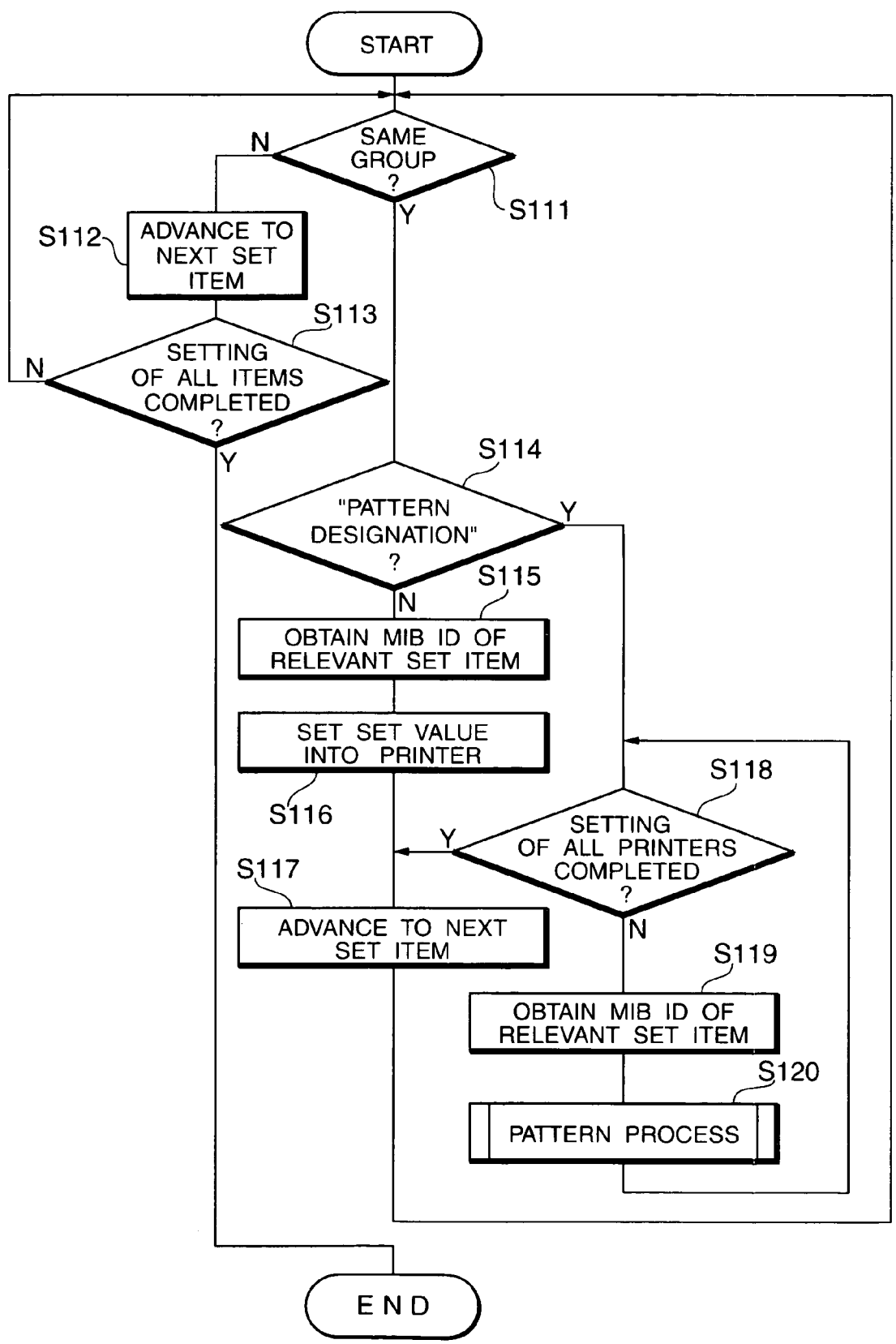
FIG. 39 is a flowchart showing the operation of the network utility in the eighth embodiment of the invention.

FIG. 39 is a flowchart showing the operation of the network utility in the 8th embodiment of the invention.

First, in the step of sequentially selecting the printers shown on the list on the network utility, whether the group name in the check box corresponding to the printer which is current at present coincides with that of the group to be set at present or not is discriminated. That is, whether the groups are the same or not is discriminated.

If the groups are different, since the printers are out of the setting targets, the process advances to the next set item and the printer shown at the next lower position on the list is set to be current. If the residual printers are extinguished during the above operation, it is regarded that the setting of all items has been completed, so that the processing routine is finished. If the residual printers exist, whether the group name in the edit box corresponding to the printer which is current at present coincides with that of the group to be set at present or not is discriminated.

If the groups coincide, since the printer is the target of the setting change, the presence or absence of the pattern designation is confirmed. If "No Type" showing that the pattern process is not executed is selected, it is regarded that the pattern is not designated, so that the process regarding the case where there is no pattern is executed. Since the contents of the process are almost similar to those in the first to seventh embodiments, their explanation is omitted. If the pattern has been set, it is regarded that the pattern has been designated, so that the process corresponding to the pattern is executed. Since the contents of the process are almost similar to those in the first to seventh embodiments, their explanation is omitted.

In the 8th embodiment, a function for limiting the targets of the technique to simultaneously change the settings of the printers as a plurality of nodes connected to the network is provided.

Explanation will now be made with reference to the flowchart of FIG. 39.

Step S111: Whether the group names in the edit boxes coincide or not is discriminated. If they do not coincide, step S112 follows. If they coincide, step S114 follows.

Step S112: The process advances to the next set item.

Step S113: Whether the setting of all items has been completed or not is discriminated. If the setting of all items has been completed, the processing routine is finished. If the setting of all items is not completed, the processing routine is returned to step S111.

Step S114: Whether the pattern has been designated or not is discriminated. If the pattern has been designated, step S118 follows. If "No Type" is selected, step S115 follows.

Step S115: The MIB ID of the relevant set item is obtained.

Step S116: The set value is set into the printer.

Step S117: The processing routine advances to the next set item and is returned to step S111.

Step S118: Whether the setting of all printers has been completed or not is discriminated. If the setting of all printers has been completed, step S117 follows. If the setting of all printers is not completed, step S119 follows.

Step S119: The MIB ID of the relevant set item is obtained.

Step S120: The pattern process is executed and the processing routine is returned to step S118.

As mentioned above, in the embodiment, in the case of changing the settings of the nodes connected to the network and in the case where the apparatus has the function such that, when the set values for each node can be converted into a certain pattern, the setting of all of the printers serving as setting targets can be made by the setting operation of the printer as one node, by grouping the printers to be set instead of all of the printers displayed on the list and setting a plurality of groups, the setting change of only parts of a plurality of printers connected to the network can be performed in a lump with respect to a plurality of groups. Therefore, the setting which is complicated more than that in the 7th embodiment can be completed by one operation.

Since the node which are connected to the network and to which the setting change is performed can be freely selected from the printers as nodes connected to the network shown on the list, as a function of the portion for listing the nodes, it is sufficient to use the function which merely displays all of the found nodes, as they are, among the nodes connected to the network without filtering those nodes. Therefore, the function for finding the nodes connected to the network which are displayed on the list of the network utility can be simplified. Thus, the operation time that is required for the setting change can be shortened and the operation mistakes in the setting change can be prevented.

The ninth embodiment of the invention will now be described. Component elements having the same structure as those in the first embodiment are designated by the same reference numerals and their description is omitted.

Figure 40:
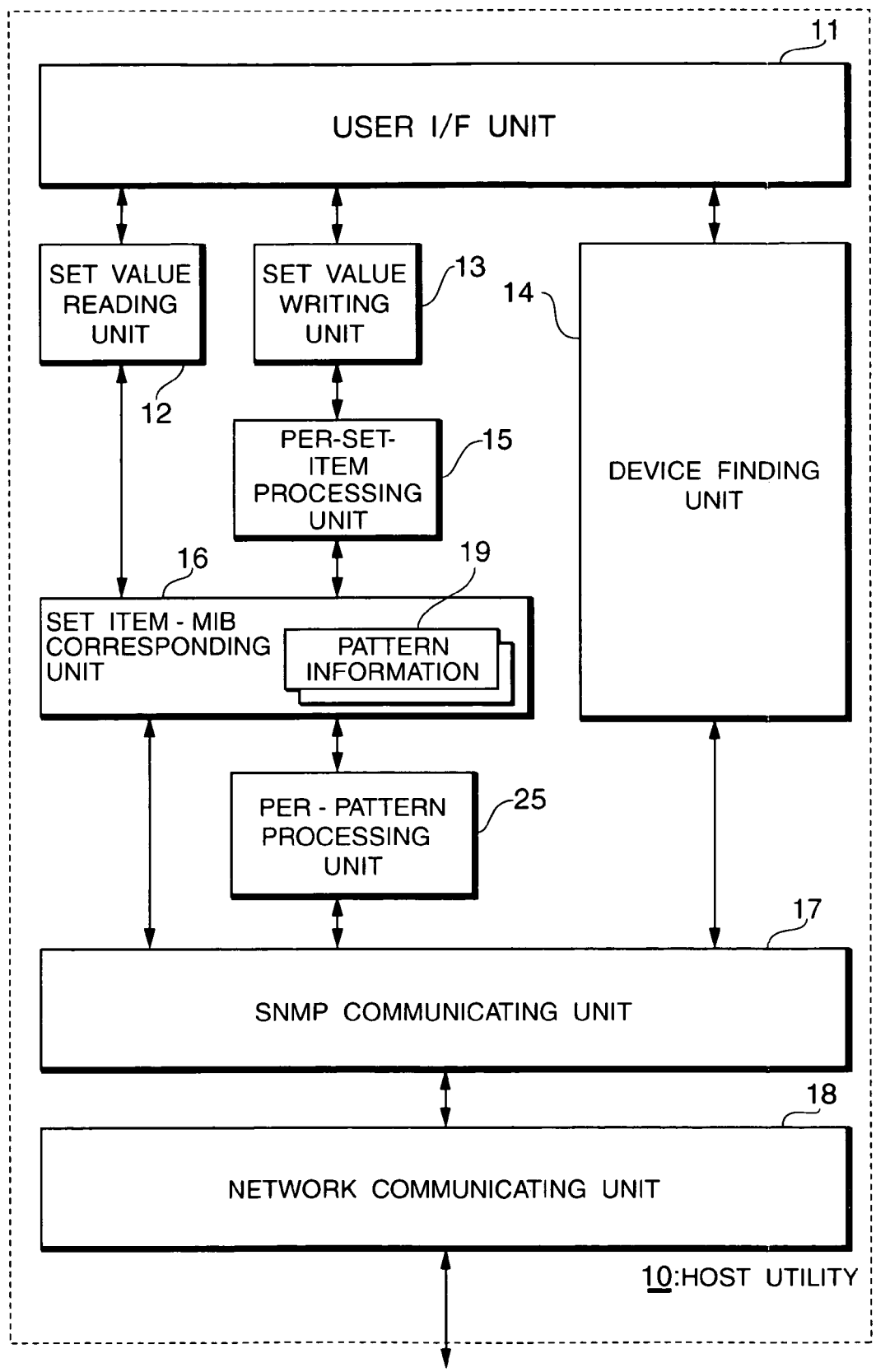
FIG. 40 is a diagram showing a construction of a network utility in the ninth embodiment of the invention.

FIG. 40 is a diagram showing a construction of the network utility in the 9th embodiment of the invention. FIG. 41 is a diagram showing settings of protocols in the 9th embodiment of the invention.

In the embodiment, the setting can be accurately completed to the node which is connected to the network and has the function for dynamically obtaining the address.

As shown in FIG. 40, the host utility 10 serving as a network utility has a per-pattern processing unit 25 for executing a process according to the pattern in accordance with the information in the pattern information 19. The per-pattern processing unit 25 has a function for identifying the items of the same relation and a function for extracting the items of the same relation.

The operation of the network utility with the foregoing construction will now be described.

In this case, set items which are collected into a similar group exist in the menu items. As shown in FIG. 41, with respect to Enable/Disable to the protocols such as Enable/Disable of TCP/IP, Enable/Disable of Net Ware, Enable/Disable of Apple Talk, Enable/Disable of Net BEUI, and the like, there is a request such that the user wants to set all of the protocols into "Enable (valid)" as the same set value or the like. Therefore, they can be grouped as related items.

Similarly, also with respect to ON/OFF settings of the address setting systems such as ON/OFF of DHCP, ON/OFF of BOOTP, ON/OFF of RARP, and the like, there is a possibility that all of them are set to "ON" as the same set value for enabling them. However, even in similar items, since the set contents of the settings of the server which is used in common cannot be expressed by ON/OFF and cannot be set by the same value, they are not grouped to the related items here.

In the embodiment, the process at the time of enabling all of the related set items of the nodes connected to each network is defined as a pattern "AUTO", thereby enabling all of the items related to the same group to be set to "Enable" per set environment.

A procedure for setting the set items will now be described. The embodiment will be described on the assumption that the nodes connected to the network are the printers.

FIG. 42 is a diagram showing a dialog box for setting the protocols in the 9th embodiment of the invention.

In this case, the nodes connected to the network are replaced with the printers in the embodiment and explanation will be made. A setting dialog box of an address solving process as a function for dynamically obtaining the IP address of each printer will be explained as an example.

First, the setting is made by the dialog box as shown in FIG. 42. A check box is provided for every setting and whether each address solving means is used or not can be selected. In the case of enabling all of the address solving means and setting into all of the printers, the top printer among the printers displayed on the list in FIG. 9 is selected and the dialog box shown in FIG. 42 is displayed. Hitherto, it has been necessary to input the check box of the address solving means which is used by the dialog box. In the 9th embodiment, however, it is unnecessary for the user to input to the check box each time. The embodiment differs from the conventional setting method in terms of this point.

In the embodiment, one corresponding combo box is provided for each group of the set values and "No Type", "Select ALL", and the like exist as selection elements. In the embodiment, since the user wants to set all related items with respect to the set items corresponding to all of the printers, "Select ALL" is selected as a selection element as shown in FIG. 42. After that, the "decide (the set values are transmitted to the printer) button" provided for each set page/dialog box is clicked. In FIG. 42, the "decide button" is omitted.

By selecting the setting method of one printer and setting the pattern as mentioned above, all of the printers shown in FIG. 9 can be set. The values which are specifically set by the above operation are DHCP=Enable, BOOTP=Enable, and RARP=Enable.

The operation of the per-pattern processing unit 25 serving as a target of the invention at the time of executing the operation will now be explained.

Figure 43:
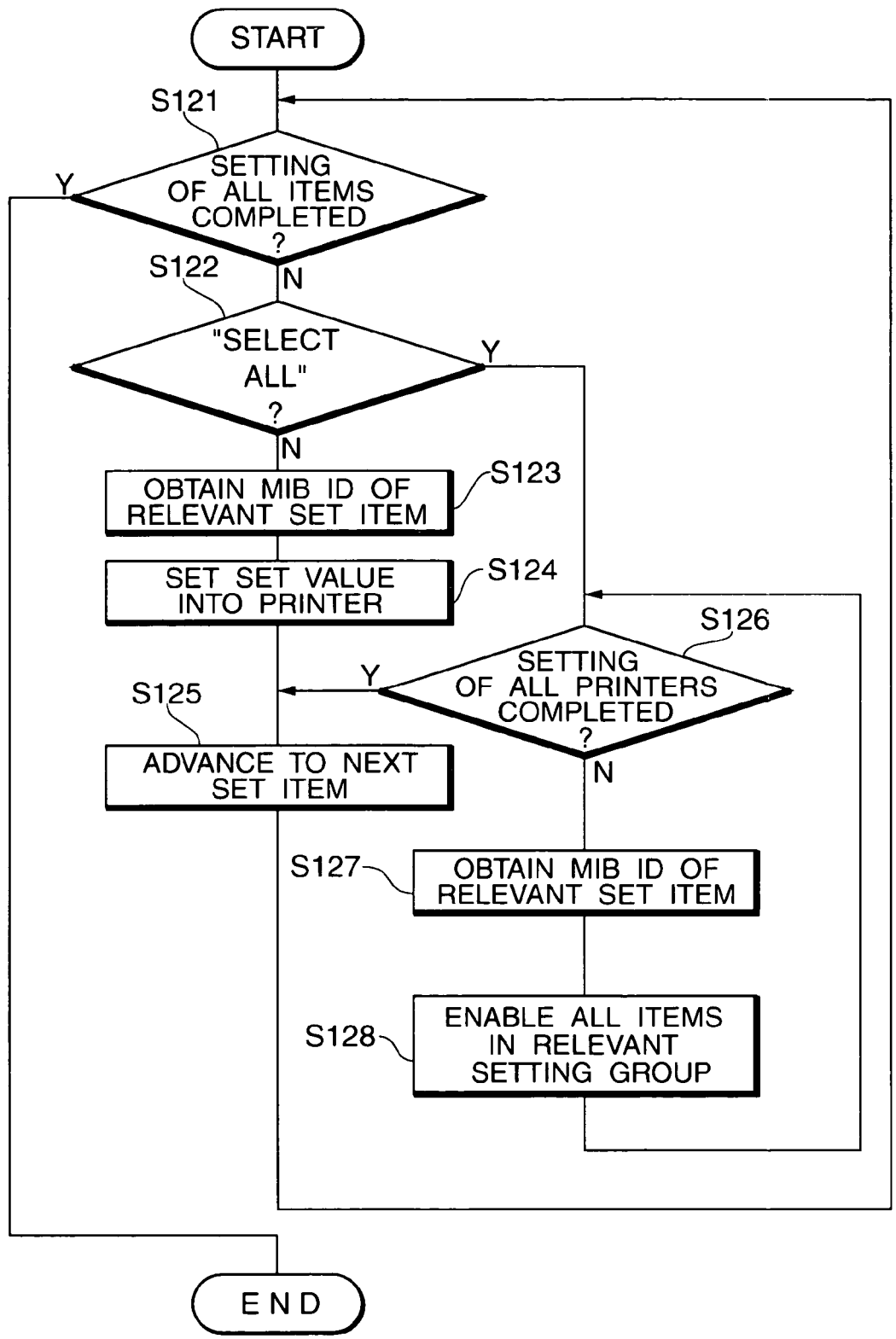
FIG. 43 is a flowchart showing the operation of the network utility in the ninth embodiment of the invention.

FIG. 43 is a flowchart showing the operation of the network utility in the 9th embodiment of the invention.

In this case, when the per-pattern processing unit 25 receives the change requests for changing the set values of the set items from the set value writing unit 13 and the per-set-item processing unit 15, the unit 25 confirms whether the setting of all items has been completed or not. If the setting of all items has been completed, the processing routine is finished.

Subsequently, whether the setting of the pattern has been designated or not is discriminated. In the embodiment, "No Type (no pattern designation)" and "Select ALL (all of the related items are turned ON)" become the selection elements.

If the pattern designation is "No Type", that is, if it is not "Select ALL", with respect to the set item whose change request has been designated, the corresponding MIB value (MIB ID) is obtained from the process of the set item—MIB corresponding unit 16.

Subsequently, the set value of the change request and the relevant MIB value are used as arguments and the SNMP communicating unit 17 is requested to change the set value of the set item. Thus, the set value is set into the printer.

The process advances to the next item whose change has been requested as a set item and whether the setting of all items has been completed or not is discriminated.

If the pattern designation is "Select ALL", first, whether the pattern processes of all of the printers have been finished or not is discriminated. If the pattern processes of all of the printers have been finished, the process advances to the next item whose change has been requested as a set item.

If the pattern processes of all of the printers are not finished yet, with respect to the set item whose change request has been designated, the corresponding MIB value is obtained from the process of the set item—MIB corresponding unit 16.

Subsequently, the operation corresponding to the pattern "Select ALL" is read out from the pattern information 19, the set value of the change request and the relevant MIB value are used as arguments, and the SNMP communicating unit 17 is requested to change the set value of the set item. Thus, all of the items in the relevant setting group are enabled.

When the set values of each printer are changed, whether the pattern processes of all of the printers have been finished or not is discriminated.

One printer whose setting is made is not always limited to the top printer on the list but on the basis of the setting of the selected one of the seven printers shown in FIG. 9, "Select ALL" can be also set into the other printers. On the contrary, when the user wants to turn OFF all of the related items, it is also possible to similarly cope with such a case by a pattern such as "Select None".

Explanation will now be made with reference to the flowchart of FIG. 43.

Step S121: Whether the setting of all items has been completed or not is discriminated. If it has been completed, the processing routine is finished. If it is not completed, step S122 follows.

Step S122: Whether the pattern designation is "Select ALL" or not is discriminated. If it is "Select ALL", step S126 follows. If it is "No Type", step S123 follows.

Step S123: The MIB ID of the relevant set item is obtained.

Step S124: The set value is set into the printer.

Step S125: The processing routine advances to the next set item and is returned to step S121.

Step S126: Whether the setting of all of the printers has been completed or not is discriminated. If it has been completed, step S125 follows. If it is not completed, step S127 follows.

Step S127: The MIB ID of the relevant set item is obtained.

Step S128: All of the items in the relevant setting group are enabled and the processing routine is returned to step S126.

As mentioned above, in the embodiment, in the case where all of the settings of the related items are set to "Enable" or "Disable" for the nodes connected to the network, when all of the related items are set to "Enable" (set to "Disable"), the setting of all of the printers to which the user wants to change the settings can be made by the setting process of almost one printer as a node. Therefore, the operation time that is required for the setting change can be shortened and the operation mistakes in the setting change can be prevented.

The tenth embodiment of the invention will now be described. Component elements having the same structure as those in the first embodiment are designated by the same reference numerals and their description is omitted.

Figure 44:
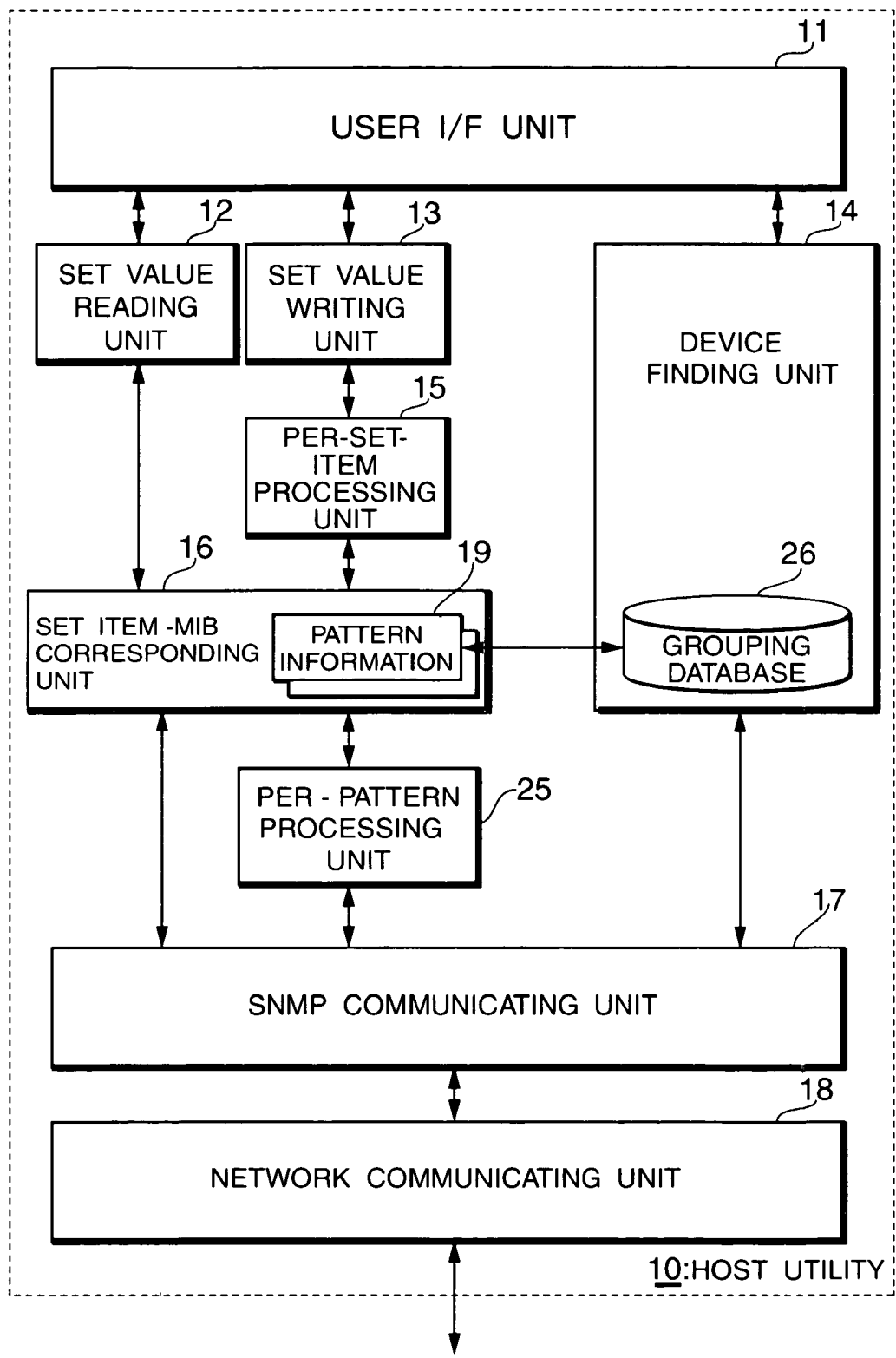
FIG. 44 is a diagram showing a construction of a network utility in the tenth embodiment of the invention.

FIG. 44 is a diagram showing a construction of a network utility in the 10th embodiment of the invention.

In the embodiment, in the process for simultaneously setting for a plurality of nodes connected to the network, the user can select a plurality of specific nodes connected to the network instead of all of the nodes, as targets, connected to the network which have been found out by the network utility.

In this case, as shown in FIG. 44, in the host utility 10 as a network utility, the device finding unit 14 has a grouping database 26 for grouping the nodes connected to the network. When the node is found out and when a request for grouping the nodes is issued by the user, the host utility 10 can extract the information from the grouping database 26.

The operation of the network utility with the above construction will now be described. The embodiment will be explained on the assumption that the nodes connected to the network are the printers.

FIG. 45 is a diagram showing a main page of the network utility in the 10th embodiment of the invention.

In FIG. 45, Printer No. 1 to Printer No. 7 are found out and seven printers in total are displayed as a list. In this case, a check box and a list box are added to the left of the list shown in FIG. 9 of the network utility in correspondence to each row. Further, one combo box is added into the column of buttons on the right side. Each check box corresponds to each printer. For example, if ten printers are displayed on the list, ten check boxes on the left column are also displayed in correspondence to those ten printers.

The list box is arranged in the position where the items of Group are displayed and shows the group to which the printer belongs.

The combo box is used to designate conditions of the printer to be searched and a classifying key. Although one key is displayed in the embodiment, a plurality of keys such as first key and second key for searching/sorting can be displayed. In FIG. 45, "Company" is displayed and it is requested to group the printers every manufacturing company of the nodes connected to the network. If the nodes connected to the network are searched for in a state where such a key has been set, the name of the manufacturing company is displayed on the list box and a list of the nodes connected to the network is displayed.

The network utility recognizes the characters displayed for each node connected to the network as a name of the group to which the nodes connected to the network belongs. In the embodiment, the network utility uses such a concept of the group when the settings are changed.

The check box determines a reference of the nodes connected to the network belonging to each group. The pattern process in each group is executed by using the contents, as a reference, set in the node connected to the network serving as a reference. Only one of the marks of the check boxes among the groups can be selected. If a plurality of check boxes are marked in an overlapping manner, one printer locating in an upper position on the list in the same group is enabled.

In FIG. 45, the user classifies the settings of the seven printers into four groups every manufacturing company: a group of Printer No. 1 and Printer No. 4; a group of Printer No. 2 and Printer No. 7; a group of Printer No. 3; and a group of Printer No. 5 and Printer No. 6.

Further, since there are a plurality of groups, the user has to set one node which is connected to the network and to which the reference setting is made in the case of simultaneously setting a plurality of nodes connected to the network. In the embodiment, the check boxes of Printer No. 1, Printer No. 3, Printer No. 5, and Printer No. 7 are marked, Printer No. 1 is set to a reference of a group "Toshipa", Printer No. 3 is set to a reference of a group "HPP", Printer No. 5 is set to a reference of a group "Rexmark", and Printer No. 7 is set to a reference of a group "OKI", respectively.

If the function for simultaneously setting a plurality of nodes in the 9th embodiment is made operative in the setting state of the network utility, the setting of the group "Toshipa" is made by using Printer No. 1 as a reference, the setting of the group "HPP" is made by using Printer No. 3 as a reference, the setting of the group "Rexmark" is made by using Printer No. 5 as a reference, and the setting of the group "OKI" is made by using Printer No. 7 as a reference, respectively.

As mentioned above, in the network utility having the function for simultaneously setting a plurality of nodes, the nodes connected to the network serving as targets of such a function can be selected as a plurality of groups.

The operation of the network utility at the time of executing the operation will now be described.

Figure 46:
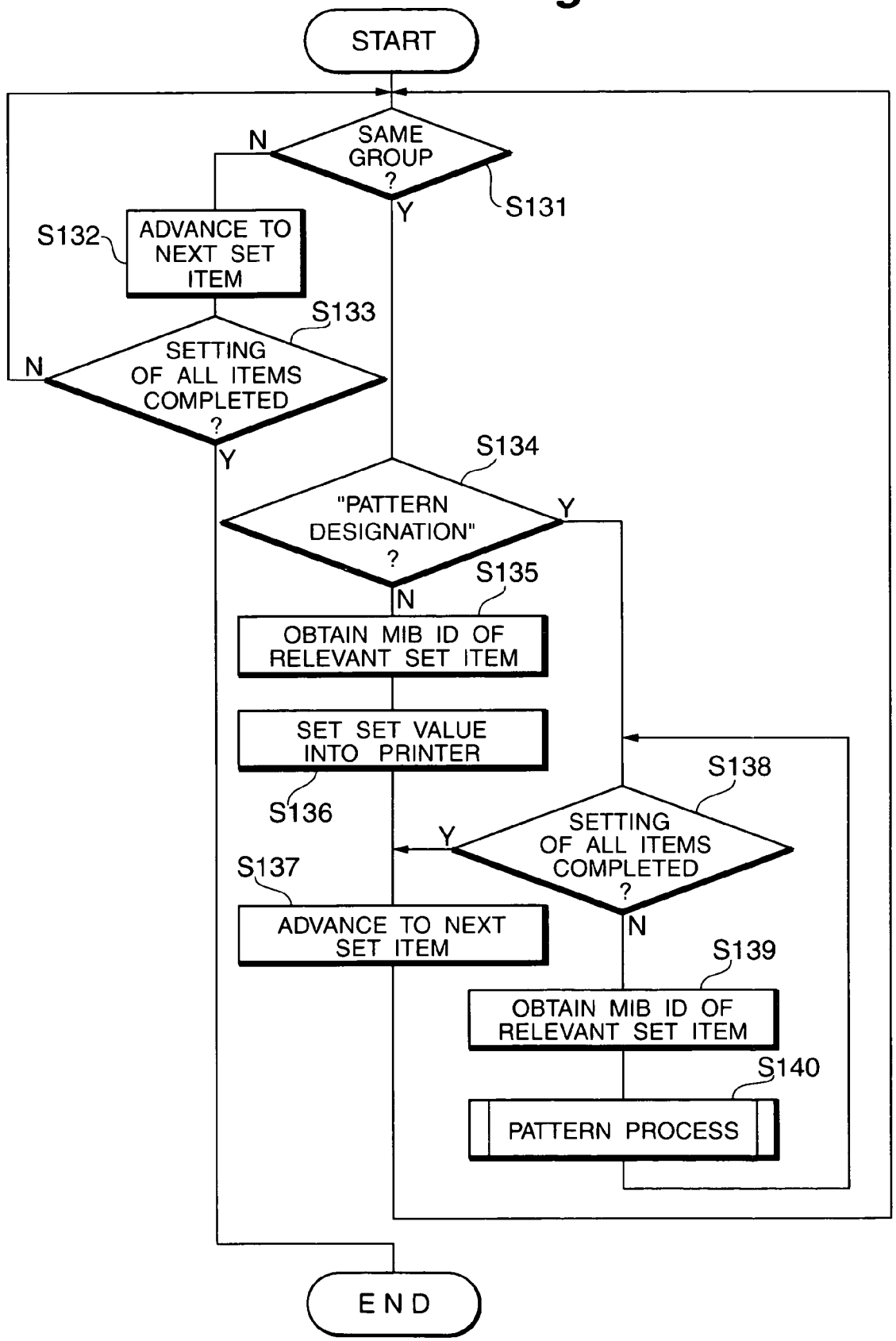
FIG. 46 is a flowchart showing the operation of the network utility in the tenth embodiment of the invention.

FIG. 46 is a flowchart showing the operation of the network utility in the 10th embodiment of the invention.

First, in the step of sequentially selecting the printers shown on the list on the network utility, whether the group name on the list box corresponding to the printer which is current at present coincides with that of the group to be set at present or not is discriminated. That is, whether the groups are the same or not is discriminated.

If the groups are different, since the printers are out of the setting targets, the process advances to the next set item and the printer shown at the next lower position on the list is set to be current. If the residual printers are extinguished during the above operation, it is regarded that the setting of all items has been completed, so that the processing routine is finished. If the residual printers exist, whether the group name on the list box corresponding to the printer which is current at present coincides with that of the group to be set at present or not is discriminated.

If the groups coincide, since the printer is the target of the setting change, the presence or absence of the pattern setting is confirmed. If "No Type" showing that the pattern process is not executed is selected, it is regarded that the pattern is not designated, so that the process regarding the case where there is no pattern is executed. Since the contents of the process are almost similar to those in the first to seventh embodiments, their explanation is omitted. If the pattern has been set, it is regarded that the pattern has been designated, so that the process corresponding to the pattern is executed. Since the contents of the process are almost similar to those in the first to seventh embodiments, their explanation is omitted.

In the invention, a function for limiting the targets of the technique to simultaneously change the settings of a plurality of nodes connected to the network is provided.

Explanation will now be made with reference to the flowchart of FIG. 46.

Step S131: Whether the names of the groups in the edit boxes coincide or not is discriminated. If they are different, step S132 follows. If they coincide, step S134 follows.

Step S132: The processing routine advances to the next set item.

Step S133: Whether the setting of all of the items has been completed or not is discriminated. If the setting of all of the items has been completed, the processing routine is finished. If the setting of all of the items is not completed, the processing routine is returned to step S131.

Step S134: Whether the pattern has been designated or not is discriminated. If the pattern has been designated, step S138 follows. If "No Type" is selected, step S135 follows.

Step S135: The MIB ID of the relevant set item is obtained.

Step S136: The set value is set into the printer.

Step S137: The processing routine advances to the next set item and is returned to step S131.

Step S138: Whether the setting of all printers has been completed or not is discriminated. If the setting of all printers has been completed, step S137 follows. If the setting of all printers is not completed, step S139 follows.

Step S139: The MIB ID of the relevant set item is obtained.

Step S140: The pattern process is executed and the processing routine is returned to step S138.

The operation for grouping a plurality of nodes connected to the network will now be explained.

Figure 47:
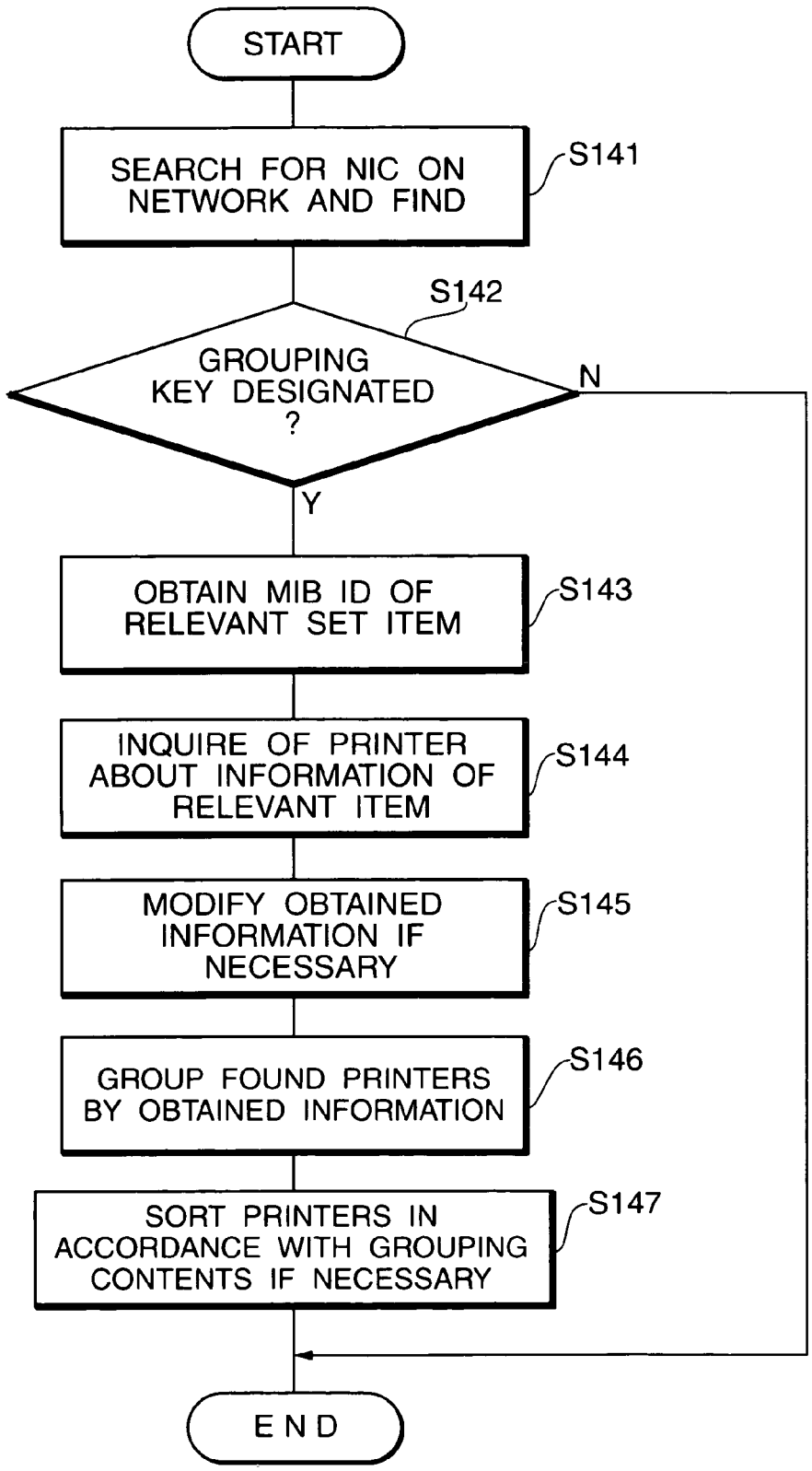
FIG. 47 is a flowchart showing the operation for grouping nodes in the tenth embodiment of the invention.

FIG. 47 is a flowchart showing the operation for grouping the nodes in the 10th embodiment of the invention. FIG. 48 is a table showing an example of grouping keys in the 10th embodiment of the invention.

First, the NIC as a node connected to the network is searched, found out, and displayed into the list of the main page of the network utility.

Subsequently, whether the grouping key has been designated in the combo box or not is discriminated. If it is not designated, the process is finished. If the grouping key has been designated, in order to know the items designated by the grouping keys, all of the necessary corresponding MIB values (MIB IDs) are obtained from the process of the set item—MIB corresponding unit 16.

Subsequently, the values corresponding to the MIB IDs as information of the relevant items are obtained by inquiring of the printers as nodes connected to the network. If necessary, the obtained values as information are modified and used and the items designated by the grouping keys are formed.

Subsequently, the printers as nodes connected to the network which have been found on the list of the network utility can be grouped in accordance with the obtained values as information and, if necessary, they can be sorted and displayed in accordance with the grouping.

The grouping keys are not limited to the manufacturing companies of the printers as nodes connected to the network but can be also set as shown in FIG. 48.

As mentioned above, in the embodiment, in the case of changing the settings of the nodes connected to the network and in the case where the apparatus has the function such that, when the set values for each node can be converted into a certain pattern, the setting of all of the printers to be set can be made by the setting operation of the printer as one node, by grouping the printers to be set instead of all of the printers displayed on the list and setting a plurality of groups, the setting change of only parts of a plurality of printers among the printers connected to the network can be performed in a lump with respect to a plurality of groups. Therefore, the 10th embodiment has a feature in terms of a point that the printers can be grouped on the basis of the information of each node as compared with those in the 7th and 8th embodiments. Therefore, the administrator can make the setting according to the features of the nodes which are managed.

Thus, the operation time that is required for the setting change can be shortened and the operation mistakes in the setting change can be prevented.

The eleventh embodiment of the invention will now be described. Component elements having the same structure as those in the first embodiment are designated by the same reference numerals and their description is omitted.

In the 11th embodiment, in the process for simultaneously making the setting for the printers as a plurality of nodes connected to the network, with respect to an apparatus such as a server or the like which does not normally operate in dependence on a setting situation of the network environment even if the printer setting such as an address solving process or the like is made, the operation is confirmed on the network utility side and the method whose operation guarantee can be obtained is set into the printer as a node connected to the network.

Figure 49:
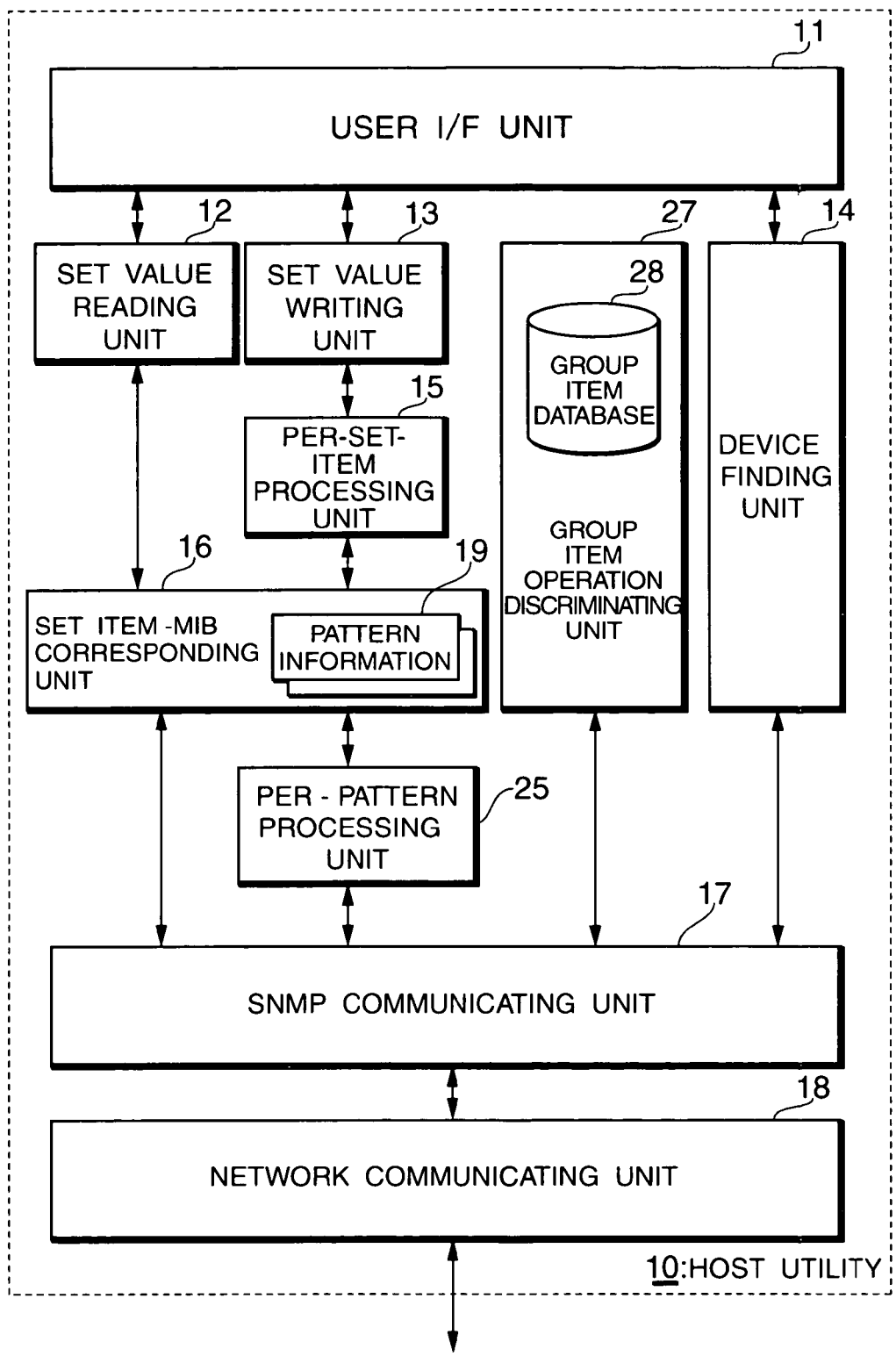
FIG. 49 is a diagram showing a construction of a network utility in the eleventh embodiment of the invention.

FIG. 49 is a diagram showing a construction of the network utility in the 11th embodiment of the invention.

In this case, as shown in FIG. 49, in the host utility 10 as a network utility, a group item operation discriminating unit 27 has a group item database 28 for grouping the related items among the set items of the nodes connected to the network. The host utility 10 has a function such that which operation of the grouped items is normally finished is discriminated by the group item operation discriminating unit 27 and the set values in which the operation is normally finished are set on the basis of the discrimination of the network utility.

The operation of the network utility with the above construction will now be described.

In this case, generally, the address solving process is constructed by the server which provides addresses and a client who issues a request to the server and obtain the addresses. In the embodiment, the target node connected to the network correspond to the client in the address solving process.

The address solving process does not normally operate even if only the setting of the client is made and it is also necessary to correctly set the server side. In the embodiment, a functional pattern such that the item in which whether the process is correctly finished or not can be known for the first time when it is operated as mentioned above is actually operated on the network utility side and the set values in which the process normally operates are selected and set every node connected to the network is defined as a pattern "Auto Judge".

A procedure for setting the set items mentioned above will now be described. The 11th embodiment will be described on the assumption that the nodes connected to the network are the printers.

Figure 50:
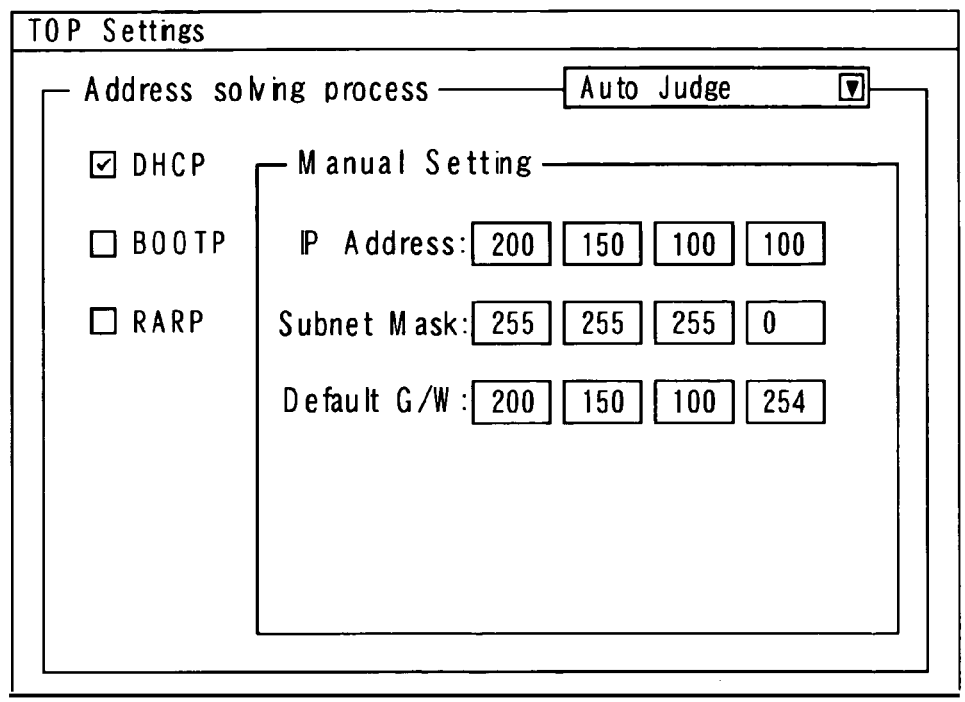
FIG. 50 is a diagram showing a setting display screen of an address solving process in the eleventh embodiment of the invention.

FIG. 50 is a diagram showing a setting display screen of the address solving process in the 11th embodiment of the invention.

In this case, explanation will be made with respect to the case where the nodes connected to the network are replaced with the printers in the 11th embodiment. In FIG. 50, the setting display screen of the address solving process will be explained as an example.

First, the setting of the address solving process is made on a dialog box as shown in FIG. 50. At this time, a check box is provided every protocol for each address solving process. The value "Enable" can be selected by marking the check box.

The value "Disable" can be selected by resetting the check box. When an initial value is set to "Disable", in the case of setting it into all of the printers, the top printer among the printers shown in FIG. 9 is selected, thereby allowing the dialog box shown in FIG. 50 to be displayed.

Subsequently, one or all of the settings of each address solving processing protocol is/are set to "Enable". The processes described so far are substantially the same as those in the conventional setting method.

In the 11th embodiment, one corresponding combo box is provided for each address solving process. There are "No Type", "Auto Judge", and the like as selection elements. In the embodiment, since the user wants to set so that all of the printers can normally complete the address solving processes, "Auto Judge" is selected as a selection element. After that, the "decide (the set values are transmitted to the printer) button" provided for each set page/dialog box is clicked. In FIG. 50, the "decide button" is omitted.

By selecting the setting method of one printer and setting the pattern as mentioned above, all of the printers shown in FIG. 9 can be set.

Explanation will now be made with respect to an example in which the printers are specifically set.

Figure 51:
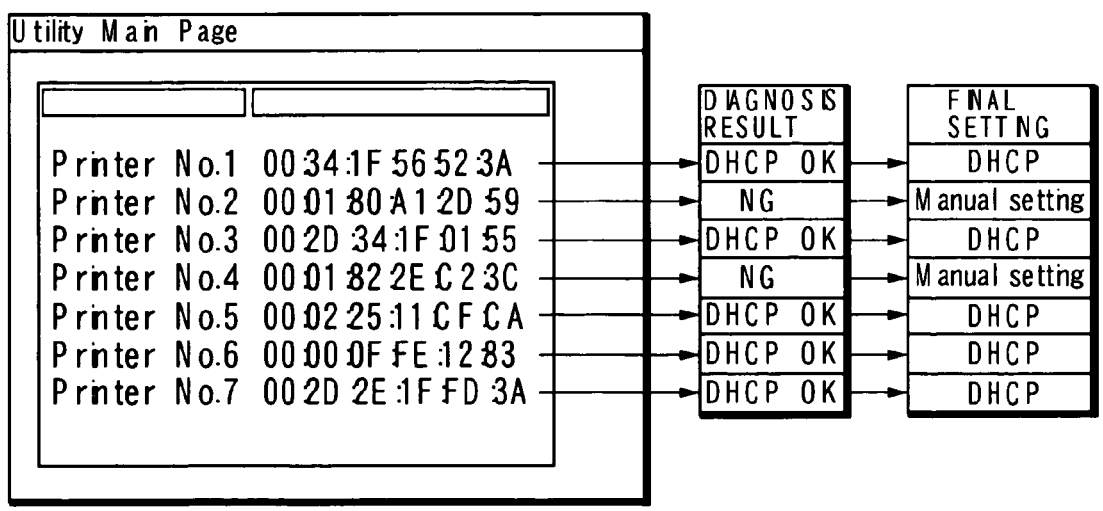
FIG. 51 is a diagram showing an example of settings of printers in the eleventh embodiment of the invention.

FIG. 51 is a diagram showing an example of settings of the printers in the 11th embodiment of the invention.

In FIG. 51, it is assumed that the printer which has actually been set is the top printer (Printer No. 1) on the list. To set the setting of Enable/Disable of "DHCP" as one of the address solving protocols to "Enable", the relevant check box is marked. In consideration of the case where the DHCP server of the network to which the printer to be set has been connected is not normally set, the addresses are written into Manual Settings (manual setting) by the handwork. In the setting example of this printer, the address solution is tried by the DHCP and if it fails, the addresses set by Manual Settings are set to "Enable".

By making such a setting to all of the printers, as shown in FIG. 51, in an environment in which the setting where the DHCP normally operates has been realized, the addresses are allocated from the DHCP. In an environment in which the setting where the DHCP normally operates is not realized, the addresses set in Manual Settings are allocated. Therefore, the addresses are certainly set to Printer No. 1 to Printer No. 7 after completion of the setting and the address solution is successful.

The operation of the network utility at the time of executing the operation will now be described.

Figure 52:
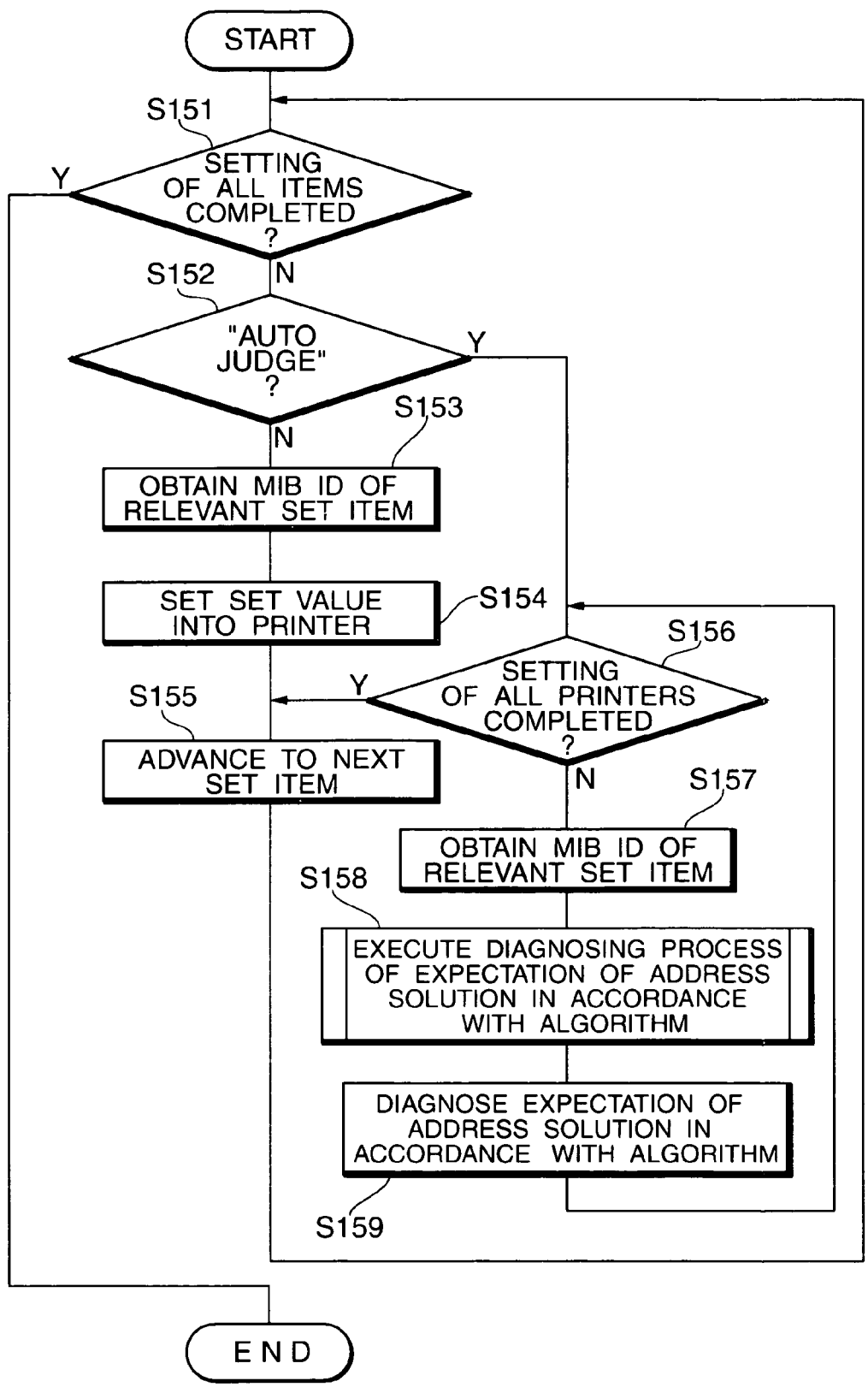
FIG. 52 is a flowchart showing the operation of the network utility in the eleventh embodiment of the invention.

FIG. 52 is a flowchart showing the operation of the network utility in the 11th embodiment of the invention.

First, when the per-pattern processing unit 25 receives the change requests for changing the set values of the set items from the set value writing unit 13 and the per-set-item processing unit 15, the unit 25 confirms whether the setting of all items has been completed or not. If the setting of all items has been completed, the processing routine is finished.

Subsequently, whether the setting of the pattern has been designated or not is discriminated. In the embodiment, "No Type (no pattern designation)" and "Auto Judge (the optimum one of the selected address solving methods is automatically selected)" become the selection elements.

If the pattern designation is "No Type", that is, if it is not "Auto Judge", with respect to the set item whose change request has been designated, the corresponding MIB value (MIB ID) is obtained from the process of the set item—MIB corresponding unit 16.

Subsequently, the set value of the change request and the relevant MIB value are used as arguments and the SNMP communicating unit 17 is requested to change the set value of the set item. Thus, the set value is set into the printer.

The process advances to the next item whose change has been requested as a set item and whether the setting of all items has been completed or not is discriminated.

If the pattern designation is "Auto Judge", first, whether the pattern processes of all of the printers have been finished or not is discriminated. If the pattern processes of all of the printers have been finished, the process advances to the next item whose change has been requested as a set item.

If the pattern processes of all of the printers are not finished yet, with respect to the set item whose change request has been designated, the corresponding MIB value is obtained from the process of the set item—MIB corresponding unit 16.

Subsequently, the operation corresponding to the pattern "Auto Judge" is read out from the pattern information 19 and a process for diagnosing an expectation of the address solution is executed in accordance with an algorithm. When the expectation of the address solution is diagnosed in accordance with the algorithm, whether the pattern processes of all of the printers have been finished or not is discriminated.

In the above processes, if Manual Settings are selected, since the addresses corresponding to the printers displayed on the list of the network utility have to be written, the setting of a plurality of printers cannot be easily made. However, the setting can be certainly made.

Explanation will now be made with reference to the flowchart of FIG. 52.

Step S151: Whether the setting of all items has been completed or not is discriminated. If it has been completed, the processing routine is finished. If it is not completed, step S152 follows.

Step S152: Whether the pattern designation is "Auto Judge" or not is discriminated. If it is "Auto Judge", step S156 follows. If it is "No Type", step S153 follows.

Step S153: The MIB ID of the relevant set item is obtained.

Step S154: The set value is set into the printer.

Step S155: The processing routine advances to the next set item and is returned to step S151.

Step S156: Whether the setting of all of the printers has been completed or not is discriminated. If it has been completed, step S155 follows. If it is not completed, step S157 follows.

Step S157: The MIB ID of the relevant set item is obtained.

Step S158: The process for diagnosing the expectation of the address solution is executed in accordance with the algorithm.

Step S159: The expectation of the address solution is diagnosed in accordance with the algorithm and the processing routine is returned to step S156.

The actual operation of "Auto Judge" will now be described.

Figure 53:
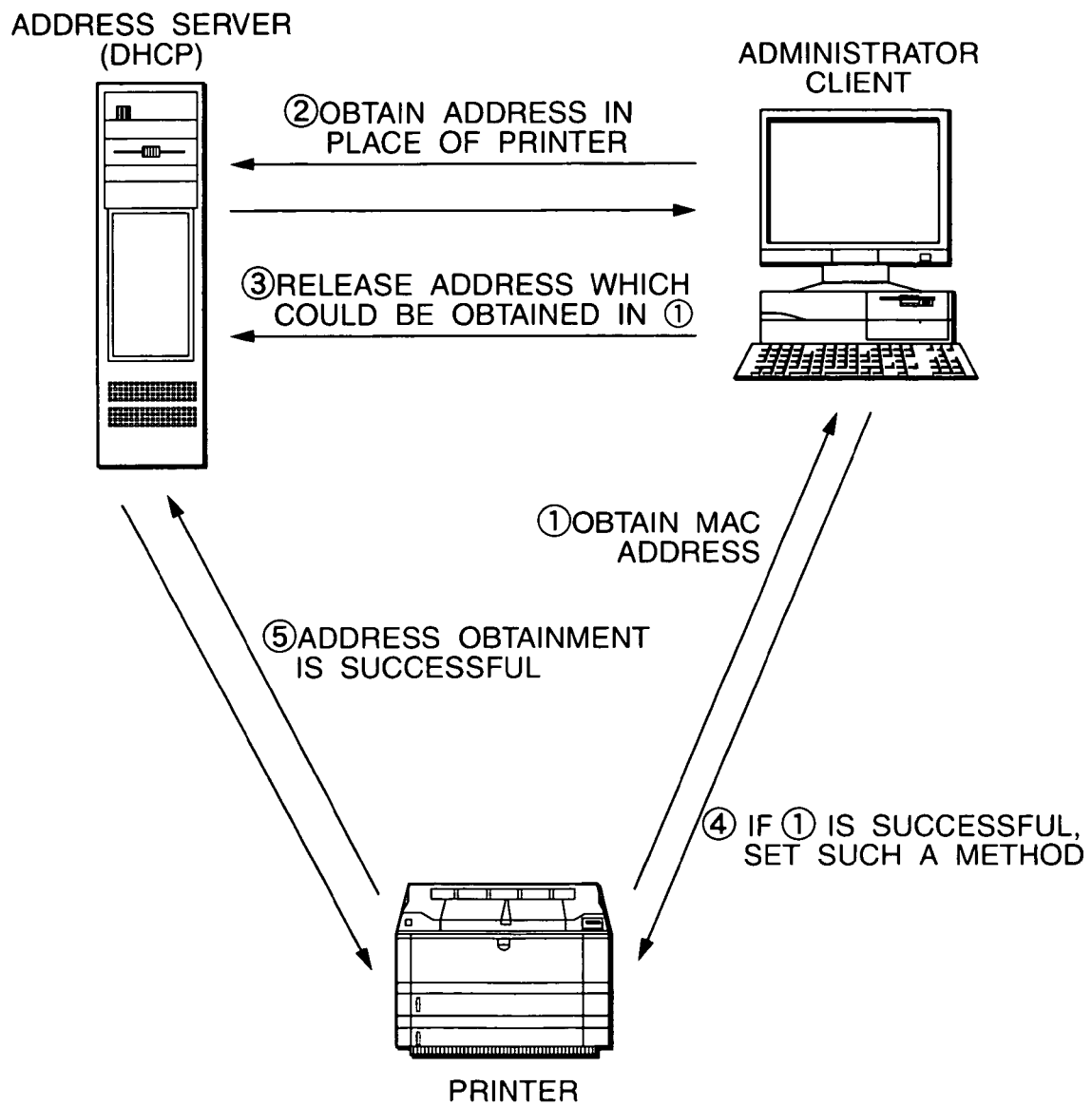
FIG. 53 is a diagram showing an outline of the address solving operation in the eleventh embodiment of the invention.

FIG. 53 is a diagram showing an outline of the address solving operation in the 11th embodiment of the invention.

First, the network utility in the embodiment which operates in the client of the administrator (Administrator Client) obtains an MAC Address of the network from the printer as a setting target as shown by ① in FIG. 53.

As shown by ② in FIG. 53, a request for obtaining the address is issued to the target environment by using the obtained MAC Address. If the address could be obtained, it is judged that the target printer can succeed in the address solution by using the relevant address solving protocol in such an environment. If the address cannot be obtained, it is judged that the target printer cannot succeed in the address solution by using the relevant address solving protocol in such an environment, and another method is confirmed. Further, if all of the address solutions failed, the addresses designated by Manual Settings are unconditionally set.

Subsequently, if the address could be obtained, this address is released as shown by ③ in FIG. 53. Subsequently, the successful address solving method is set into the printer which actually becomes the target as shown by ④ in FIG. 53.

By the above processes, the printer can normally execute the address solving process as shown by ⑤ in FIG. 53.

As mentioned above, in the embodiment, in the case of changing the settings of the nodes connected to the network and when the set values of the nodes are the same, convenience in which the setting of all of the printers to which the user wants to change the settings is completed by the setting process of almost one printer as a node is lower than those in the first to tenth embodiments. However, it is possible to certainly set the set items which depend on the environment of the network to which the printer as a node serving as a target of the address solving process or the like in which whether the address solution is successful or fails can be known only when it is actually operated has been connected.

Thus, the operation time that is required for the setting change can be saved.

The twelfth embodiment of the invention will now be described. Component elements having the same structure as those in the first embodiment are designated by the same reference numerals and their description is omitted.

In the 12th embodiment, in the process for simultaneously making the setting for the printers as a plurality of nodes connected to the network, with respect to an apparatus such as a server or the like which does not normally operate in dependence on the setting situation of the network environment even if the printer setting such as an address solving process or the like is made, the operation is confirmed on the network utility side and the method whose operation guarantee can be obtained is set into the node connected to the network. In such a case, the actual operation result such as address solution result or the like can be displayed.

Figure 54:
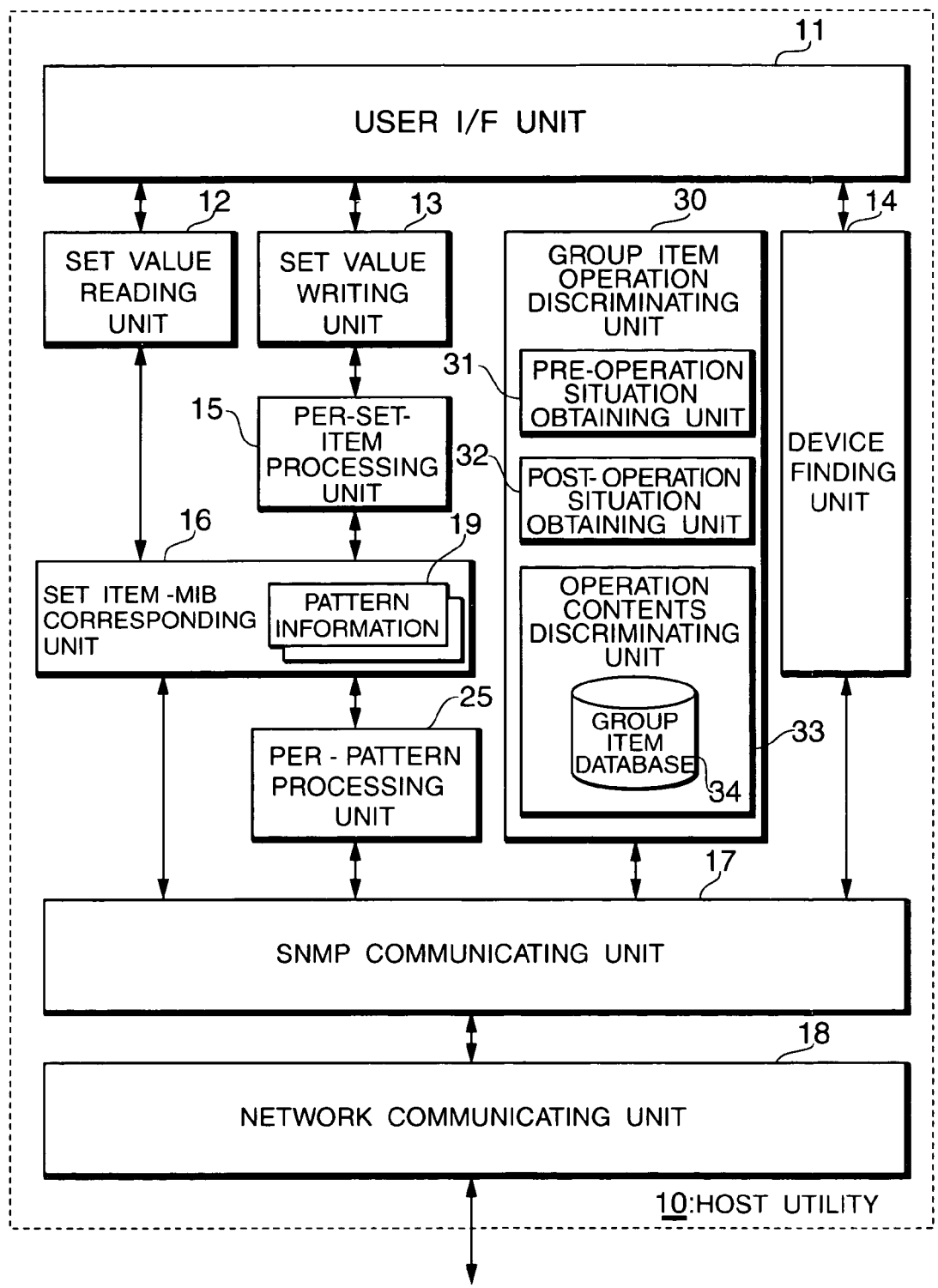
FIG. 54 is a diagram showing a construction of a network utility in the twelfth embodiment of the invention.

FIG. 54 is a diagram showing a construction of the network utility in the 12th embodiment of the invention.

In this case, as shown in FIG. 54, in the host utility 10 as a network utility, a group item operation discriminating unit 30 has a group item database 34 for grouping the related items among the set items of the nodes connected to the network. The host utility 10 has a function such that a situation before the printer operates in accordance with the set contents is confirmed by a pre-operation situation obtaining unit 31 provided for the group item operation discriminating unit 30, a situation after the printer operated in accordance with the set contents is confirmed by a post-operation situation obtaining unit 32, and the contents of the operation are discriminated by an operation contents discriminating unit 33 from the obtained information.

The operation of the network utility with the above construction will now be described.

In this case, generally, the address solving process is constructed by the server which provides the addresses and the client who issues the request to the server and obtain the addresses. In the embodiment, the target node connected to the network correspond to the client in the address solving process.

The address solving process does not normally operate even if only the setting of the client is made and it is necessary to correctly set the server side also. In the embodiment, the result obtained by actually operating the item such that whether the process is correctly finished or not can be known only when it is operated as mentioned above can be displayed.

The process of such a function is defined as a pattern "Result Check". In the case of making the item operative in accordance with the first to eleventh embodiments, it is possible to make it operative when "Same Value", "Auto Judge", or the like is set.

A procedure for setting the set items as mentioned above will now be described. The embodiment will be described on the assumption that the nodes connected to the network are the printers.

Figure 55:
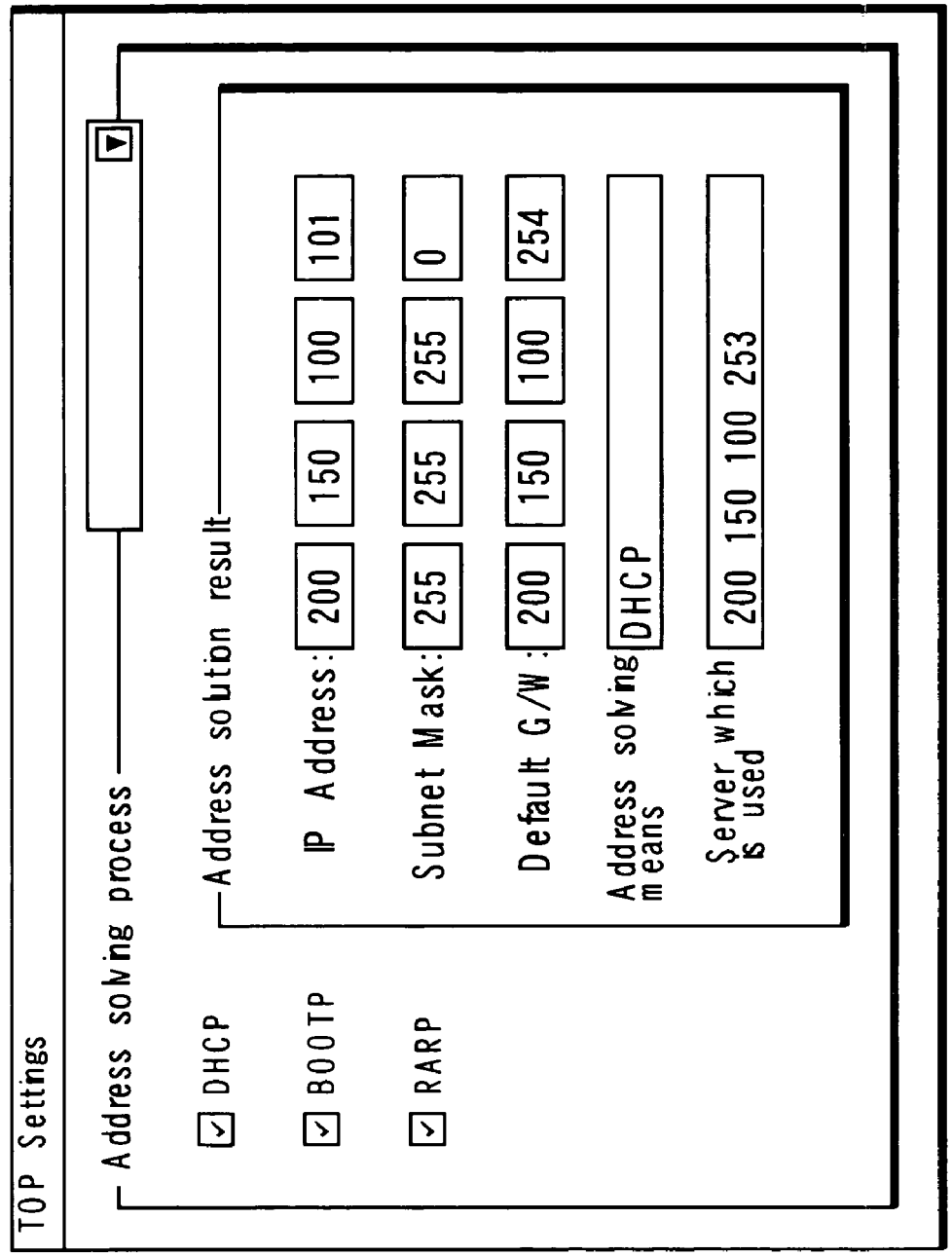
FIG. 55 is a diagram showing a setting display screen of an address solving process in the twelfth embodiment of the invention.

FIG. 55 is a diagram showing a setting display screen of the address solving process in the 12th embodiment of the invention.

In this case, the nodes connected to the network are replaced with the printers in the embodiment and explanation will be made. The setting display screen of the address solving process will be explained as an example in FIG. 55.

First, the setting of the address solving process is made by a dialog box as shown in FIG. 55. A check box is provided every address solving protocol. The value "Enable" can be selected by marking the check box. The value "Disable" can be selected by resetting the check box. When the initial value is set to "Disable", in the case of setting it into all of the printers, the top printer among the printers shown in FIG. 9 is selected, thereby allowing the dialog box shown in FIG. 55 to be displayed.

Subsequently, one of the settings of each address solving processing protocol is set to "Enable". The processes described so far are substantially the same as those in the conventional setting method. Such a setting can be made to all of the printers on the list shown in FIG. 9 by setting "Same Value" in the first embodiment or "Auto Judge" in the 11th embodiment.

In the 12th embodiment, when a plurality of address solving processing protocols are selected and made operative, which one of the address solving processing protocols has actually been selected by the operation of the printer and from which server the address has been obtained are discriminated. Such a process can be set into all of the printers shown on the list by selecting the pattern "Result Check". As mentioned above, if the process is made operative when the pattern "Same Value" or "Auto Judge" is selected, the same values can be set into all of the printers shown on the list and the result obtained by actually operating it can be also displayed.

By selecting the setting method of one printer and setting the pattern mentioned above, all of the printers shown in FIG. 9 can be set and the result of the address solving process can be displayed for all of the printers.

Explanation will now be made with respect to an example of the values which are specifically displayed.

In FIG. 55, the items which are set so as to operate are "DHCP", "BOOTP", and "RARP". The values displayed as results are addresses "IP Address", "Subnet Mask", and "Default Gateway" actually obtained from the server, names of the address solving processing protocols which obtained those addresses, and addresses of the servers which obtained those addresses.

FIG. 55 shows a state where the address solving processing protocol "DHCP" actually obtained the address and the IP Address of the server which obtained the address is "200.150.100.101".

The operation of the network utility at the time of executing the operation will now be explained.

Figure 56:
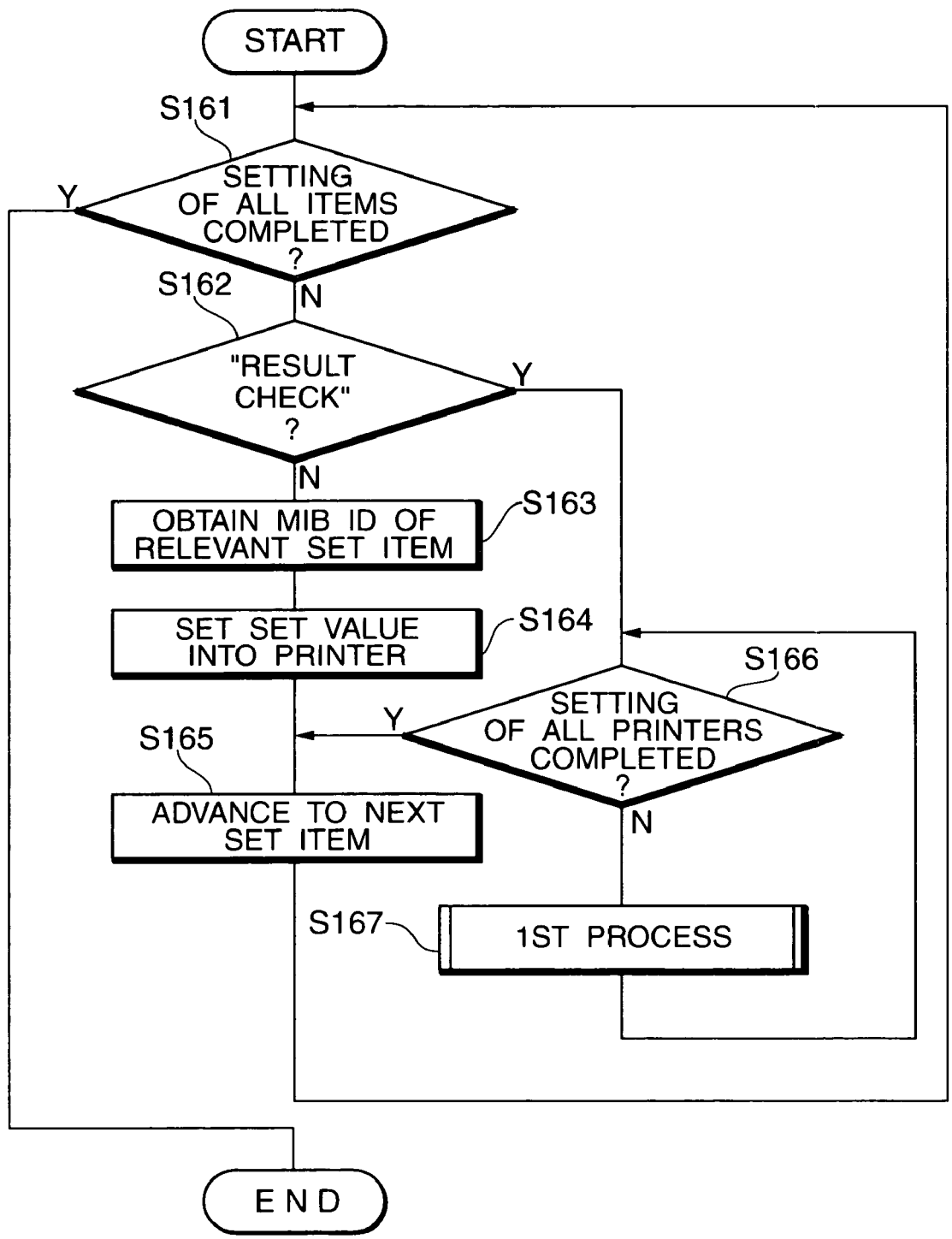
FIG. 56 is a flowchart showing the operation of the network utility in the twelfth embodiment of the invention.

FIG. 56 is a flowchart showing the operation of the network utility in the 12th embodiment of the invention.

First, when the per-pattern processing unit 25 receives the change requests for changing the set values of the set items from the set value writing unit 13 and the per-set-item processing unit 15, the unit 25 confirms whether the setting of all items has been completed or not. If the setting of all items has been completed, the processing routine is finished.

Subsequently, whether the setting of the pattern has been designated or not is discriminated. In the embodiment, "No Type (no pattern designation)" and "Result Check (the optimum one of the selected address solving methods is automatically selected)" become the selection elements.

If the pattern designation is "No Type", that is, if it is not "Result Check", with respect to the set item whose change request has been designated, the corresponding MIB value (MIB ID) is obtained from the process of the set item—MIB corresponding unit 16.

Subsequently, the set value of the change request and the relevant MIB value are used as arguments and the SNMP communicating unit 17 is requested to change the set value of the set item. Thus, the set value is set into the printer.

The process advances to the next item whose change has been requested as a set item and whether the setting of all items has been completed or not is discriminated.

If the pattern designation is "Result Check", first, whether the pattern processes of all of the printers have been finished or not is discriminated. If the pattern processes of all of the printers have been finished, the process advances to the next item whose change has been requested as a set item.

If the pattern processes of all of the printers are not finished yet, a first process, which will be explained hereinlater, is executed.

Explanation will now be made with reference to the flowchart of FIG. 56.

Step S161: Whether the setting of all items has been completed or not is discriminated. If it has been completed, the processing routine is finished. If it is not completed, step S162 follows.

Step S162: Whether the pattern designation is "Result Check" or not is discriminated. If it is "Result Check", step S166 follows. If it is "No Type", step S163 follows.

Step S163: The MIB ID of the relevant set item is obtained.

Step S164: The set value is set into the printer.

Step S165: The processing routine advances to the next set item and is returned to step S161.

Step S166: Whether the setting of all of the printers has been completed or not is discriminated. If it has been completed, step S165 follows. If it is not completed, step S167 follows.

Step S167: A pre-operation situation obtaining process is executed and the processing routine is returned to step S166.

The first process will now be described.

Figure 57:
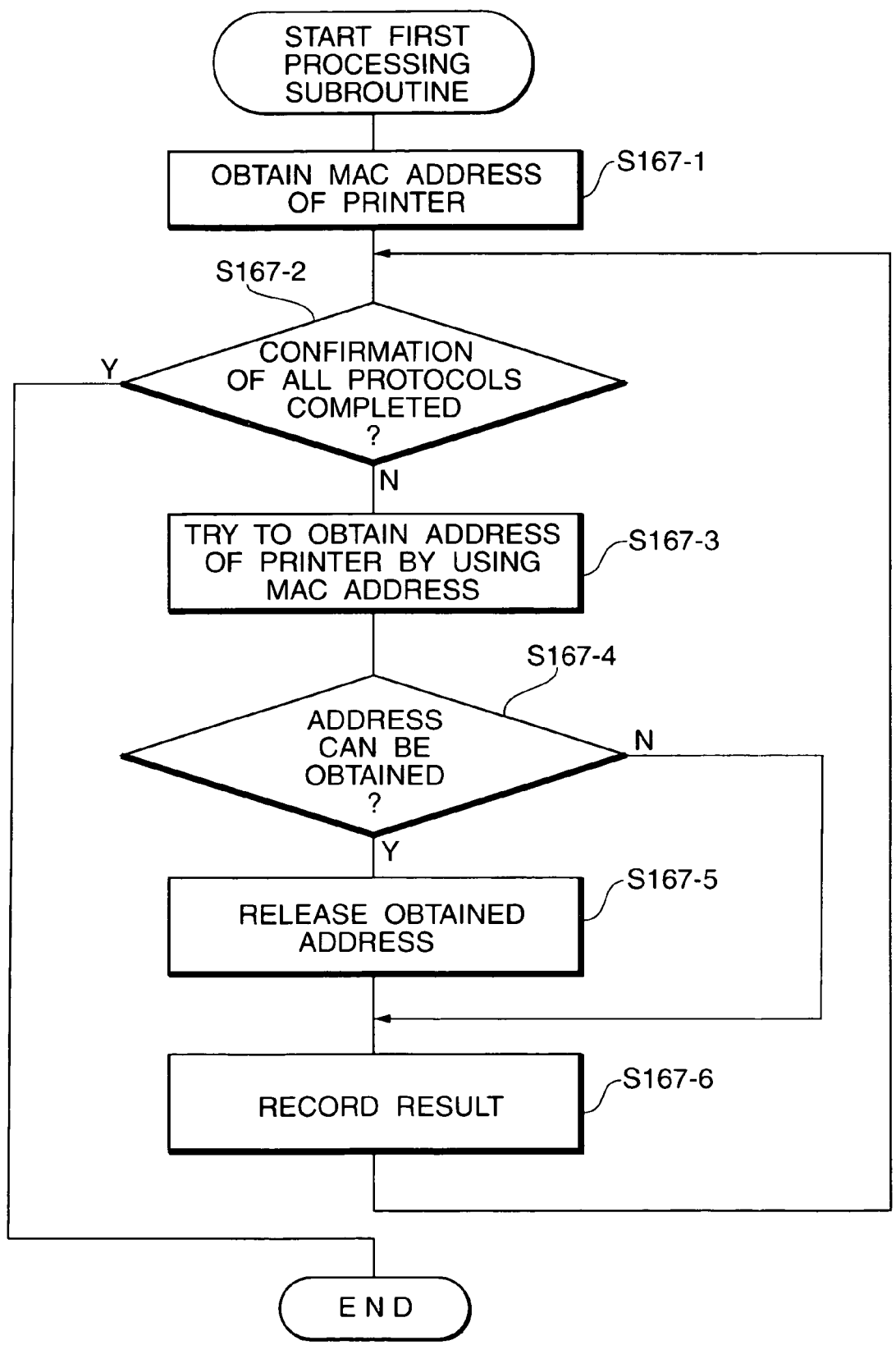
FIG. 57 is a flowchart showing a subroutine for a pre-operation situation obtaining process in the twelfth embodiment of the invention.

FIG. 57 is a flowchart showing a subroutine for the pre-operation situation obtaining process in the 12th embodiment of the invention.

First, the host utility 10 as a network utility obtains the MAC Address of the printer from the MIB of the printer and discriminates whether the confirmation has been finished with respect to all of the address solving processing protocols which have been set to "Enable" or not. If the confirmation has been finished with respect to all of the address solving processing protocols which have been set to "Enable", the processing routine is finished.

If the confirmation is not finished with respect to all of the address solving processing protocols which have been set to "Enable", it is tried to obtain the address of the printer by using the obtained MAC Address of the relevant printer as a key. For example, if the address solving processing protocols are "Enable" in order of "DHCP", "BOOTP", and "RARP", first, the network utility in the embodiment tries to obtain the address by using the DHCP protocol, subsequently tries to obtain the address by using the BOOTP protocol, and finally tries to obtain the address by using the RARP protocol.

In those cases, since the address requesting source uses the MAC Address obtained from the printer, it executes the operation which makes a model of the operation such that the printer obtains its own address by using the DHCP protocol.

If the address of the printer can be obtained, the address of the printer obtained by the network utility in the embodiment is released and returned to the server lest there is a possibility that the printer cannot obtain the address when the printer actually obtains it.

If the address for the printer cannot be obtained, the result of each address solving processing protocol is recorded and whether the confirmation has been finished with respect to all of the address solving processing protocols which have been set to "Enable" or not is discriminated.

By those processes, the information by which whether the address could be obtained or not when the printer operates by using each address solving processing protocol can be discriminated can be obtained.

After that the printer operates by using the address solving processing protocols which have actually been set.

Explanation will now be made with reference to the flowchart of FIG. 57.

Step S167-1: The MAC Address of the printer is obtained.

Step S167-2: Whether the confirmation has been finished with respect to all of the protocols or not is discriminated. If the confirmation has been finished with respect to all of the protocols, the processing routine is finished. If the confirmation is not finished with respect to all of the protocols, step S167-3 follows.

Step S167-3: It is tried to obtain the address of the printer by using the MAC Address.

Step S167-4: Whether the address could be obtained or not is discriminated. If the address could be obtained, step S167-5 follows. If the address cannot be obtained, step S167-6 follows.

Step S167-5: The obtained address is released.

Step S167-6: The result is recorded and the processing routine is returned to step S167-2.

The operation of the post-operation situation obtaining unit 32 will now be described.

Figure 58:
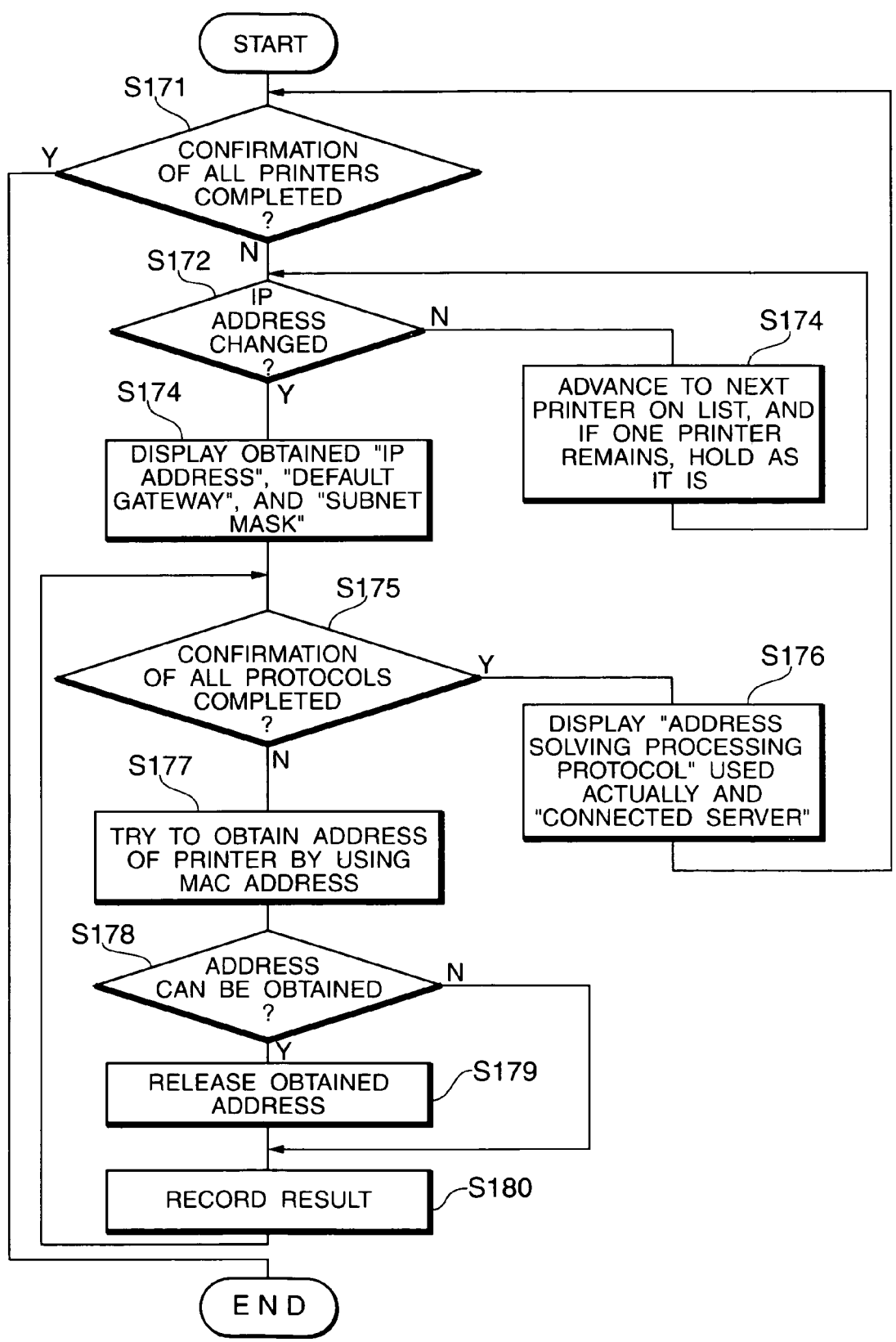
FIG. 58 is a flowchart showing the operation of a post-operation situation obtaining unit in the twelfth embodiment of the invention.

FIG. 58 is a flowchart showing the operation of the post-operation situation obtaining unit in the 12th embodiment of the invention.

First, whether the setting of all items has been completed or not is discriminated. If the setting of all items has been completed, the processing routine is finished. If the setting of all items is not completed, the host utility 10 as a network utility in the embodiment periodically discriminates whether the IP Addresses of the printers shown on the list are changed by the address solving processing protocols or not by using the MIBs of the printers.

In the case where the IP Addresses are not changed, if the IP Address of one printer is confirmed, the processing routine advances to the next printer on the list so that the printers which are subjected to the process for discriminating whether the IP Addresses of the printers shown on the list are changed by the address solving processing protocols or not are not concentrated on one printer. Whether the IP Addresses of the printers shown on the list are changed by the address solving processing protocols or not is periodically discriminated by using the MIBs of the printers in such a manner. If only one printer remains, it is held as it is.

If the IP Address has been changed, the values of "Subnet Mask" and "Default Gateway" are simultaneously obtained also by using the MIB of the printer. The obtained three addresses are displayed as shown in FIG. 55.

Subsequently, whether the processes have been finished with respect to all of the address solving processing protocols or not is discriminated. If the processes are not finished with respect to all of the address solving processing protocols, it is tried to obtain the address of the relevant printer by using the MAC Address of the printer as a key. For example, if the address solving processing protocols are "Enable" in order of "DHCP", "BOOTP", and "RARP", first, the network utility in the embodiment tries to obtain the address by using the DHCP protocol, subsequently tries to obtain the address by using the BOOTP protocol, and finally tries to obtain the address by using the RARP protocol.

In those cases, since the address requesting source uses the MAC Address obtained from the printer, it executes the operation which makes a model of the operation such that the printer obtains its own address by using the DHCP protocol.

If the address of the printer can be obtained, the address of the printer obtained by the network utility in the embodiment is released and returned to the server lest there is a possibility that the printer cannot obtain the address when the printer actually obtains it.

If the address for the printer cannot be obtained, the result of each address solving processing protocol is recorded and whether the confirmation has been finished with respect to all of the address solving processing protocols which have been set to "Enable" or not is discriminated.

If the processes have been finished with respect to all of the address solving processing protocols, the "address solving processing protocol" which was actually used and the "connected server" are specified and displayed.

Explanation will now be made with reference to the flowchart of FIG. 58.

Step S171: Whether the confirmation has been finished with respect to all of the printers or not is discriminated. If the confirmation has been finished with respect to all of the printers, the processing routine is finished. If the confirmation is not finished with respect to all of the printers, step S172 follows.

Step S172: Whether the IPAddresses have been changed or not is discriminated. If they have been changed, step S174 follows. If they are not changed, step S173 follows.

Step S173: The processing routine advances to the next printer on the list. If only one printer remains, the processing routine is returned to step S172.

Step S174: The obtained values "IPAddress", "Subnet Mask", and "Default Gateway" are displayed.

Step S175: Whether the confirmation has been finished by all of the protocols or not is discriminated. If the confirmation has been finished by all of the protocols, step S176 follows. If the confirmation is not finished by all of the protocols, step S177 follows.

Step S176: The "address solving processing protocol" which has actually been used and the "connected server" are displayed and the processing routine is returned to step S171.

Step S177: It is tried to obtain the address of the printer by using the MAC Address.

Step S178: Whether the address could be obtained or not is discriminated. If the address could be obtained, step S179 follows. If the address cannot be obtained, step S180 follows.

Step S179: The obtained address is released.

Step S180: The result is recorded and the processing routine is returned to step S175.

The actual operation will now be described.

Figure 59:
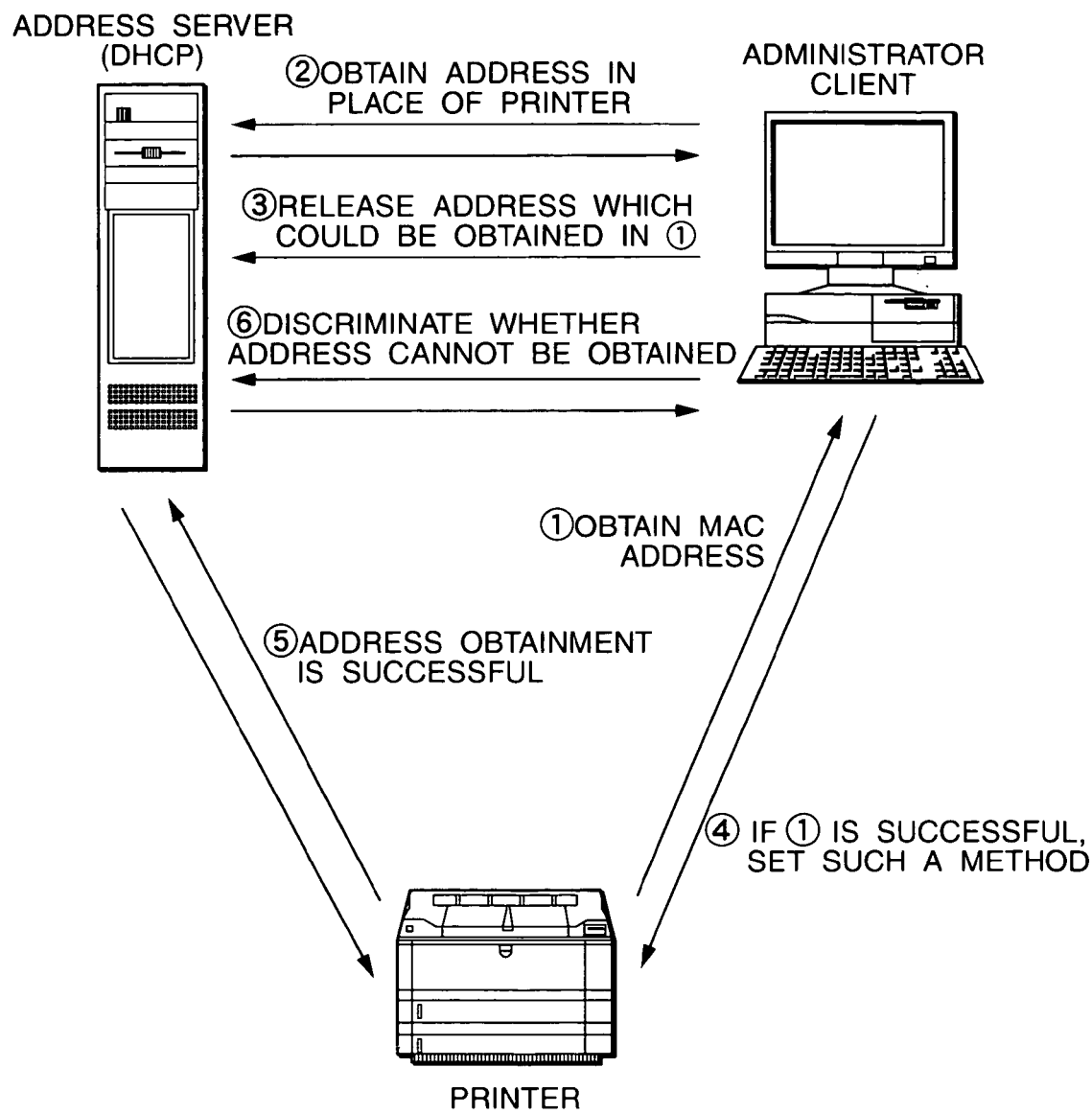
FIG. 59 is a diagram showing an outline of the address solving operation in the twelfth embodiment of the invention.

FIG. 59 is a diagram showing an outline of the address solving operation in the 12th embodiment of the invention. FIG. 60 is a table showing an example of discriminating algorithms in the 12th embodiment of the invention.

First, the network utility in the embodiment which operates in the client of the administrator (Administrator Client) obtains an MAC Address of the network from the printer as a setting target as shown by ① in FIG. 59.

As shown by ② in FIG. 59, the request for obtaining the address is issued to the target environment by using the obtained MAC Address in place of the printer.

If the address could be obtained, this address is released as shown by ③ in FIG. 59. Subsequently, the successful address solving method is set into the printer which actually becomes the target as shown by ④ in FIG. 59.

By the above processes, the printer can normally execute the address solving process as shown by ⑤ in FIG. 59. Further, whether the address cannot be obtained or not is discriminated as shown by ⑥ in FIG. 59.

As a discriminating algorithm in the embodiment, for example, there are algorithms as shown in FIG. 60.

As mentioned above, in the embodiment, since there is provided the means for confirming the result obtained after the printer as a target node executed the address solving process at the time when a plurality of address solving processes are enabled, which address solving processing protocol is actually "Enable" and which server is "Enable" can be confirmed.

Therefore, the operation time that is required for the setting change can be shortened and the operation mistakes in the setting change can be prevented.

The invention is not limited to the foregoing embodiments but many modifications and variations are possible on the basis of the spirit of the invention and they are not excluded from the scope of the invention.

As described in detail above, according to the invention, in the parameter setting method via the network for the nodes connected to the network, the peculiar information and set items of a plurality of nodes are read out, the common set items are selected, and the parameters are transmitted.

In this case, the setting changing operation of the network utility can be lightened, the time that is required for the setting changing operation can be shortened, and the operation mistakes can be prevented.

What is claimed is:

1. An apparatus for setting a parameter via a network, comprising:
   a computer coupled to a memory, said computer comprising:
      (a) a device finding unit that finds nodes connected with the network;
      (b) a setting value reading unit that reads out setting values of the found nodes;
      (c) a user I/F unit that displays a common setting item possessed by plural ones of the nodes found by the device finding unit, and inputs a setting value of the common setting item;
      (d) a per-pattern processing unit that performs a calculation with respect to the setting value inputted by the user I/F unit; and
      (e) a setting value writing unit that writes the setting value into nodes connected with the network on the basis of the setting value inputted by the user I/F unit, wherein,
         (i) the device finding unit finds a first node and a second node that are connected with the network;

(ii) the setting value reading unit respectively reads out setting values of the first node and the second node;

(iii) the user I/F unit: (1) displays a common setting item possessed by the first node and the second node, (2) displays a control code pair that bounds first character information that is a target of incrementing, and (3) displays second character information that does not belong to the target of incrementing, the first character information, and the second character information being displayed simultaneously on the same line, and inputs and displays a first setting value including the first character information being the target of incrementing;

(iv) the per-pattern processing unit receives the value of the first character information being the target of incrementing from the inputted first setting value and, on the basis of the control code, changes the value of the first character information being the target of incrementing in the first setting value into a value which is obtained by performing a predetermined calculation with respect to the received value of the character information so as to seek a second setting value; and (v) the setting value writing unit writes the first setting value inputted by the user I/F unit into the first node and writes the second setting value calculated by the per-pattern processing unit into the second node.

2. The computer for setting parameter via network, according to claim 1, further comprising:

a setting item-MIB value corresponding unit that obtains a scope of setting values to correspond to MIB values, and respectively sets setting values according to the MIB values.

3. The computer for setting parameter via the network, according to claim 1, wherein the node is a printer and the setting item includes print resolution, and wherein when a maximum is selected for the print resolution, a biggest value of the print resolution supported by the printer is set.

4. The computer for setting parameter via the network, according to claim 1, wherein the node is a printer and the setting item includes a setting of a timer, and wherein when a minimum is selected for the setting of the timer, a smallest value supported by printer is set.

5. The computer for setting parameter via the network, according to claim 1, wherein the user I/F unit inputs the first setting value and fixed character string; the setting value writing unit relates the first setting value to the fixed character string inputted by the user I/F unit and writes the first setting value, further writes the second setting value sought by the per-pattern processing unit together with the fixed character string.

6. The computer for setting parameter via the network, according to claim 5, wherein the fixed character string inputted by the user I/F unit is searched from a lowest figure toward an upper figure, a numerical value which is first found is set as the first setting value.

7. The computer for setting parameter via the network, according to claim 5, wherein the fixed character string inputted by the user I/F unit is searched from a lowest figure toward an upper figure, if a numerical value is not found, the lowest figure is set as the first setting value.

8. The computer for setting parameter via network, according to claim 5, wherein a control code is judged from the fixed character string inputted by the user I/F unit, the character string decided by the control code is set as the first setting value.

* * * * *